United States Patent
Lee et al.

(10) Patent No.: US 9,910,832 B2
(45) Date of Patent: Mar. 6, 2018

(54) SELECTING USER INTERFACE ELEMENTS TO DISPLAY LINKED DOCUMENTS WITH A LINKING DOCUMENT

(71) Applicant: Samsung Electronics Co., Ltd., Suwon-si, Gyeonggi-do (KR)

(72) Inventors: Jungjik Lee, Daejeon (KR); Kyungtae Kim, Suwon-si (KR); Hyerim Bae, Suwon-si (KR); Changhyup Jwa, Jeju-si (KR); Sunkee Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 14/621,655

(22) Filed: Feb. 13, 2015

(65) Prior Publication Data
US 2015/0234794 A1   Aug. 20, 2015

(30) Foreign Application Priority Data

Feb. 18, 2014 (KR) .................. 10-2014-0018393

(51) Int. Cl.
*G06F 17/00* (2006.01)
*G06F 17/22* (2006.01)
(Continued)

(52) U.S. Cl.
CPC ........ *G06F 17/2235* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 6,643,824 B1 * 11/2003 Bates .................... G06F 3/0488
715/205
2002/0010707 A1 * 1/2002 Chang .................... G06F 17/211
715/205
(Continued)

FOREIGN PATENT DOCUMENTS

EP         0 965 925 A2    12/1999
WO         01/57643 A1      8/2001
(Continued)

OTHER PUBLICATIONS

Zellweger et al., "Fluid Links for Informed and Incremental Link Transitions," Proceedings of Hypertext '98, Jun. 20-24, 1998, pp. 1-8, XP-00235865.

(Continued)

*Primary Examiner* — Asher Kells
(74) *Attorney, Agent, or Firm* — Jefferson IP Law, LLP

(57) ABSTRACT

An electronic device and a method of displaying electronic documents linked with link objects therefor are provided. The method includes displaying a first electronic document having at least one link object on the screen of an electronic device, receiving an input signal for selecting a link object, determining the position on the screen at which a second electronic document linked with the selected link object is to be displayed, changing the layout of the first electronic document according to the determined position, and displaying the first electronic document and the second electronic document together on the screen according to the changed layout and the determined position.

18 Claims, 46 Drawing Sheets

(51) Int. Cl.
*G06F 17/21* (2006.01)
*G06F 3/0482* (2013.01)
*G06F 3/0484* (2013.01)
*G06F 3/0488* (2013.01)
*G06F 17/30* (2006.01)

(52) U.S. Cl.
CPC ........ *G06F 3/04842* (2013.01); *G06F 17/212* (2013.01); *G06F 17/30882* (2013.01)

(56) References Cited

U.S. PATENT DOCUMENTS

| | | |
|---|---|---|
| 2002/0054114 A1 | 5/2002 | Shuping et al. |
| 2004/0141016 A1* | 7/2004 | Fukatsu ............ G06F 17/30873 715/856 |
| 2005/0235203 A1 | 10/2005 | Undasan |
| 2005/0235220 A1 | 10/2005 | Duperrouzel et al. |
| 2006/0031404 A1 | 2/2006 | Kassab |
| 2008/0115047 A1 | 5/2008 | Petri |
| 2009/0019383 A1* | 1/2009 | Riley .................... G06Q 10/10 715/764 |
| 2011/0072357 A1 | 3/2011 | Arnstein |
| 2012/0254733 A1 | 10/2012 | Tucovic |
| 2012/0278704 A1 | 11/2012 | Ying et al. |
| 2012/0317468 A1 | 12/2012 | Duquene et al. |
| 2013/0024757 A1 | 1/2013 | Doll et al. |
| 2013/0305174 A1 | 11/2013 | Kim et al. |

FOREIGN PATENT DOCUMENTS

| | | |
|---|---|---|
| WO | 03/079133 A2 | 9/2003 |
| WO | 2013/169262 A1 | 11/2013 |

OTHER PUBLICATIONS

Kopetzky et al., "Visual preview for link traversal on the World Wide Web," Computer Networks, May 17, 1999, pp. 1525-1532, vol. 31, No. 11-16, XP004304571, Elsevier Science Publishers B.V., Amsterdam, Netherlands.

* cited by examiner

SELECTING USER INTERFACE ELEMENTS TO DISPLAY LINKED DOCUMENTS WITH A LINKING DOCUMENT

CROSS-REFERENCE TO RELATED APPLICATION(S)

This application claims the benefit under 35 U.S.C. §119(a) of a Korean patent application filed on Feb. 18, 2014 in the Korean Intellectual Property Office and assigned Serial number 10-2014-0018393, the entire disclosure of which is hereby incorporated by reference.

TECHNICAL FIELD

The present disclosure relates to a method of displaying electronic documents for an electronic device.

BACKGROUND

Electronic documents are information that may be created, sent, received and stored by electronic means. Electronic documents may include structured documents such as webpages, and documents created by word processors. An electronic document may include at least one link object containing a link address indicating another electronic document. When the user selects a link object contained in a first electronic document, a second electronic document linked with the link object may be displayed on the screen instead of the first electronic document. For example, instead of an existing webpage of the root node being displayed, a new webpage of a child node linked with the link object may be displayed on the screen.

The above information is presented as background information only to assist with an understanding of the present disclosure. No determination has been made, and no assertion is made, as to whether any of the above might be applicable as prior art with regard to the present disclosure.

SUMMARY

When the second electronic document linked with a first link object is being displayed on the screen, the user may wish to view another electronic document linked with a second link object contained in the first electronic document. In this case, the user may have to close the second electronic document being displayed and reopen the first electronic document. For example, the user may select a virtual or physical back button, or may browse the history of electronic documents viewed and select an entry corresponding to the first electronic document from the history.

In addition, when a new electronic document linked with a link object is displayed, the user may find difficulty in maintaining reading consistency. For example, as the new electronic document is displayed on the screen while the user is viewing the old electronic document, the reading activity of the user may be disrupted.

Aspects of the present disclosure are to address at least the above-mentioned problems and/or disadvantages and to provide at least the advantages described below. Accordingly, an aspect of the present disclosure is to provide a method that, when the user views electronic documents liked with link objects, enables the user to read a first electronic document and a second electronic document in a consistent manner and to readily return to the first electronic document from the second electronic document. Other aspects and advantages of the present disclosure will become apparent to those skilled in the art from the following detailed description.

In accordance with an aspect of the present disclosure, a method of displaying electronic documents for an electronic device is provided. The method includes displaying a first electronic document having at least one link object on the screen of the electronic device, receiving an input signal for selecting a link object, determining the position on the screen at which a second electronic document linked with the selected link object is to be displayed at least partially, changing, at least partially, the layout of the first electronic document according to the determined position, and displaying at least a part of the first electronic document and at least a part of the second electronic document together on the screen according to the changed layout and the determined position.

In accordance with another aspect of the present disclosure, an electronic device capable of displaying electronic documents is provided. The electronic device includes a display unit configured to display a first electronic document having at least one link object on the screen and a control unit configured to control a process of determining, upon reception of an input signal for selecting a link object on the screen, the position on the screen at which a second electronic document linked with the selected link object is to be displayed, to change, at least partially, the layout of the first electronic document according to the determined position, and to display at least a part of the first electronic document and at least a part of the second electronic document together on the screen according to the changed layout and the determined position.

In accordance with another aspect of the present disclosure, a non-transitory storage medium storing a program thereon is provided. The program executed by at least one processor performs a method of displaying electronic documents for an electronic device, the method includes displaying a first electronic document having at least one link object on the screen of an electronic device, receiving an input signal for selecting a link object, determining the position on the screen at which a second electronic document linked with the selected link object is to be displayed at least partially, changing, at least partially, the layout of the first electronic document according to the determined position, and displaying at least a part of the first electronic document and at least a part of the second electronic document together on the screen according to the changed layout and the determined position.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
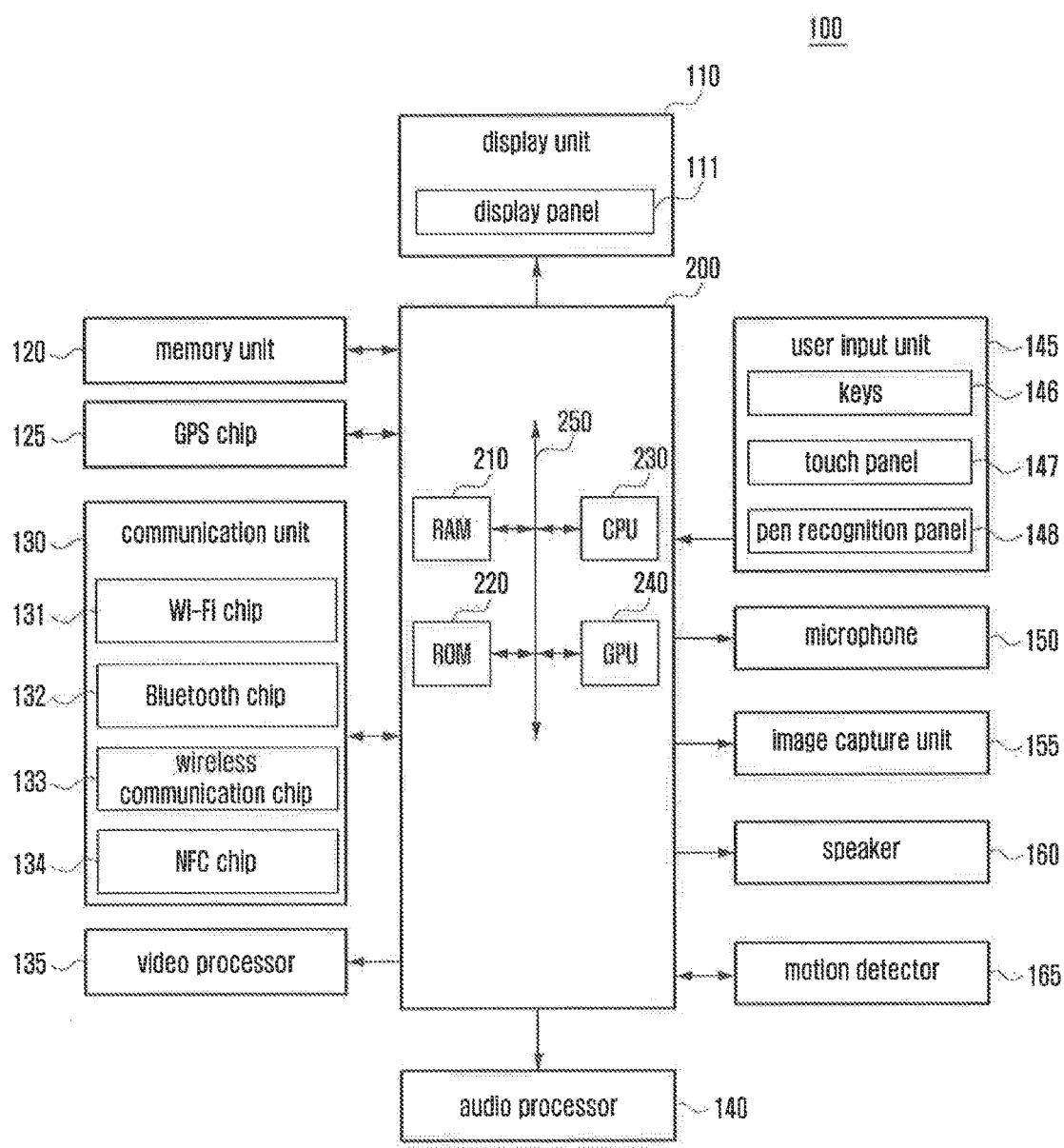
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, some elements are exaggerated, omitted or only outlined in brief, and thus may be not drawn to scale. The present disclosure is not limited by relative sizes of objects and intervals between objects in the drawings.

It will be further understood that the terms "comprising", "including", "having" and variants thereof specify the presence of stated operations and/or components, but do not preclude the presence or addition of one or more other operations, components, and/or groups thereof.

In the description, a "module" refers to a software component, a hardware component, a firmware component or a combination thereof, which is capable of carrying out a function or an operation. "Module" may be used interchangeably with "unit", "block", "circuit" or the like.

Next, the present disclosure is described with reference to the accompanying drawings.

FIG. 1 is a block diagram of an electronic device according to an embodiment of the present disclosure.

The configuration of the electronic device shown in FIG. 1 may be applied to various types of devices such as a mobile phone, a tablet computer, a Personal Digital Assistant (PDA), a Moving Picture Experts Group (MPEG) Audio Layer 3 (MP3) player, a kiosk, an electronic picture frame, a navigation aid, and a wearable device like a wrist watch or a head-mounted display (HMD).

Referring to FIG. 1, an electronic device 100 may include a display unit 110, a control unit 200, a memory unit 120, a Global Positioning System (GPS) chip 125, a communication unit 130, a video processor 135, an audio processor 140, a user input unit 145, a microphone 150, an image capture unit 155, a speaker 160, and a motion detector 165.

The display unit 110 may include a display panel 111 and a controller (not shown) controlling the display panel 111. The display panel 111 may be realized in various forms of display based on a liquid-crystal display (LCD), organic light-emitting diodes (OLED), active-matrix organic light-emitting diodes (AMOLED), and a plasma display panel (PDP). The display panel 111 may be configured to be flexible, transparent or wearable. The display unit 110 may be combined with a touch panel 147 of the user input unit 145 to form a touchscreen (not shown). For example, the touchscreen may have a layered structure of the display panel 111 and the touch panel 147 as a single entity.

The memory unit 120 may include at least one of an internal memory (not shown) and an external memory (not shown).

The internal memory may include at least one of a volatile memory (e.g., a dynamic random access memory (DRAM), a static RAM (SRAM), a synchronous DRAM (SDRAM)), a nonvolatile memory (e.g., a programmable read-only memory (PROM), a one time programmable ROM (OTPROM), an erasable programmable ROM (EPROM), an electrically erasable programmable ROM (EEPROM), a mask ROM, a flash ROM), a hard disk drive (HDD), and a solid state drive (SSD). The control unit 200 may load instructions and data from the nonvolatile memory or another component onto the volatile memory for processing. The control unit 200 may save data created or received from another component in the nonvolatile memory.

The external memory may include at least one of compact flash (CF), secure digital (SD), Micro-SD, Mini-SD, xD (extreme digital), and Memory Stick.

The memory unit 120 may store various programs and data used for operation of the electronic device 100. The memory unit 120 may temporarily or semi-permanently store electronic documents created by word processors or received from an external server (not shown).

The control unit 200 may control the display unit 110 to display an electronic document by use of a program and data stored in the memory unit 120. That is, the control unit 200 may use a program and data stored in the memory unit 120 to display an electronic document on the display unit 110. When a user gesture is made in a region of the display unit 110, the control unit 200 may perform a control operation corresponding to the user gesture.

The control unit 200 may include a RAM 210, ROM 220, central processing unit (CPU) 230, graphics processing unit (GPU) 240, and bus 250. The RAM 210, ROM 220, CPU 230, and GPU 240 may be interconnected through the bus 250.

The CPU 230 may access the memory unit 120 to boot the operating system stored in the memory unit 120 and to perform various operations using programs, content and data stored therein.

The ROM 220 may store a set of instructions for system booting. For example, when the electronic device 100 is turned on and power is supplied, the CPU 230 may load the operating system from the memory unit 120 onto the RAM 210 and execute the operating system according to the instructions stored in the ROM 220. After booting, the CPU 230 may load a program stored in the memory unit 120 onto the RAM 210 and execute the loaded program to thereby perform requested operations. The GPU 240 displays a UI screen on the display unit 110 after booting. Specifically, the GPU 240 may render a screen on which an electronic document containing various objects such as content, icons and menu items is displayed. For each object, the GPU 240 may compute values of attributes such as coordinates, shape, size and color according to the screen layout. The GPU 240 may render various screens of different layouts based on computed attribute values. The screens rendered by the GPU 240 may be delivered to the display unit 110 and be output in corresponding regions of the display unit 110.

The GPS chip 125 may receive signals from GPS satellites to identify the current location of the electronic device 100. When a navigation program is executed or it is necessary to identify the current location of the user, the control unit 200 may control the GPS chip 125 to output the current location of the user.

The communication unit 130 may perform communication with various types of external devices according to various communication schemes. The communication unit 130 may include at least one of a wireless fidelity (Wi-Fi) chip 131, a Bluetooth (BT) chip 132, a wireless communication chip 133, and a Near Field Communication (NFC) chip 134. The control unit 200 may communicate with various types of external devices through the communication unit 130.

The Wi-Fi chip 131 may support Wi-Fi communication, and the BT chip 132 may support BT communication. When the Wi-Fi chip 131 or the BT chip 132 is used, connection setup information such as SSID or session keys is exchanged first to establish a communication connection and other information may be exchanged through the connection. The wireless communication chip 133 may perform communication according to various communication protocols including Institute of Electrical and Electronics Engineers (IEEE), ZigBee, 3rd Generation Partnership Project (3GPP) 3G, and Long Term Evolution (LTE). The NFC chip 134 may support NFC operating in the 13.56 MHz frequency band among various Radio-Frequency IDentification (RFID) frequency bands such as 135 kHz, 13.56 MHz, 433 MHz, 860-960 MHz and 2.45 GHz.

The video processor 135 may process video data contained in content received through the communication unit 130 or stored in the memory unit 120. The video processor 135 may perform various image processing operations such as decoding, scaling, noise filtering, frame rate conversion and resolution conversion on the video data.

The audio processor 140 may process audio data contained in content received through the communication unit 130 or stored in the memory unit 120. The audio processor 140 may perform various operations such as decoding, amplification, and noise filtering on the audio data.

When a player program for multimedia content is executed, the control unit 200 may start the video processor 135 and the audio processor 140 to play back the multimedia content. The speaker 160 may output audio data produced by the audio processor 140.

The user input unit 145 may receive various commands from the user. The user input unit 145 may include at least one of keys 146, a touch panel 147, and a pen recognition panel 148.

The keys 146 may include a variety of keys formed at various sites on the front, side and back of the external body of the electronic device 100, such as mechanical buttons and wheels.

The touch panel 147 may sense user touch input and output a touch event value corresponding to the user touch input. When the touch panel 147 is combined with the display panel 111 to form a touchscreen, the touchscreen may be realized using capacitive, resistive or piezoelectric touch sensors. In a capacitive touchscreen, touch coordinates are computed by sensing a small amount of electricity induced on a dielectric coated on the surface of the touchscreen when the body or finger of the user touches the surface of the touchscreen. In a resistive touchscreen embedding two electrode plates, touch coordinates are computed by sensing a current flowing through the contact between the electrode plates when the user touches the touchscreen. Although a human finger is mainly used to generate a touch event on the touchscreen, a conductive object capable of making a capacitance change may also be used to generate a touch event on the touchscreen.

The pen recognition panel 148 may sense touch input or proximity input of a touch pen such as a stylus pen or digitizer pen manipulated by the user and output a corresponding pen touch or proximity event. The pen recognition panel 148 may be realized using, for example, electromagnetic resonance (EMR), and may sense touch or proximity input according to changes in electromagnetic field strength caused by contact or proximity of the pen. Specifically, the pen recognition panel 148 may be configured to include an electronic induction coil sensor (not shown) having a grid structure, and an electronic signal processor (not shown) supplying an alternating current (AC) signal of a given frequency to each loop coil of the electronic induction coil sensor in sequence. When a pen containing a resonant circuit is present in the vicinity of the loop coils of the pen recognition panel 148, the magnetic field transmitted from the loop coils generates an electric current in the resonant circuit of the pen through mutual electromagnetic induction. Based on the electric current, an inductive magnetic field is generated from the coil constituting the resonant circuit of the pen, and the pen recognition panel 148 detects the inductive magnetic field at the loop coils in signal reception state, sensing the proximity or touch point of the pen. The pen recognition panel 148 may be arranged under the display panel 111 so as to have an area sufficient to cover the display area of the display panel 111.

The microphone 150 may pick up the voice of the user or other sound and convert the picked-up voice to audio data. The control unit 200 may utilize the voice of the user picked up by the microphone 150 for a call, or convert the picked-up voice into audio data and store the audio data in the memory unit 120.

The image capture unit 155 may capture a still or moving image according to user control. The image capture unit 155 may be composed of multiple cameras including a front camera and a rear camera. When the image capture unit 155 and the microphone 150 are included, the control unit 200 may perform a control operation according to the user voice picked up by the microphone 150 or the user motion recognized through the image capture unit 155. For example, the electronic device 100 may operate in motion control mode or voice control mode. In motion control mode, the control unit 200 may activate the image capture unit 155 and control the image capture unit 155 to take images of the user and track changes in motion of the user, and may perform a control operation accordingly. In voice control mode, the control unit 200 may analyze the user voice picked up by the microphone 150 and perform a control operation according to the analysis result.

The motion detector 165 may sense the motion of the body of the electronic device 100. The electronic device 100 may be rotated or tilted in various directions. The motion detector 165 may use at least one of various sensors including a geomagnetic sensor, gyro sensor and acceleration sensor to sense motion attributes such as rotation direction, rotation angle and slope.

Although not shown in FIG. 1, according to various embodiments of the present disclosure, the electronic device 100 may further include a universal serial bus (USB) port connectable with a USB connector, various external input ports connectable with various external devices such as a headset, mouse and local area network (LAN), a Digital Multimedia Broadcasting (DMB) chip to receive and process a DMB signal, and various other sensors.

Names of the components of the electronic device 100 may be changed. The electronic device 100 may be configured to include at least one of the components described above, and a new component may be added or an existing component may be omitted.

Figure 2:
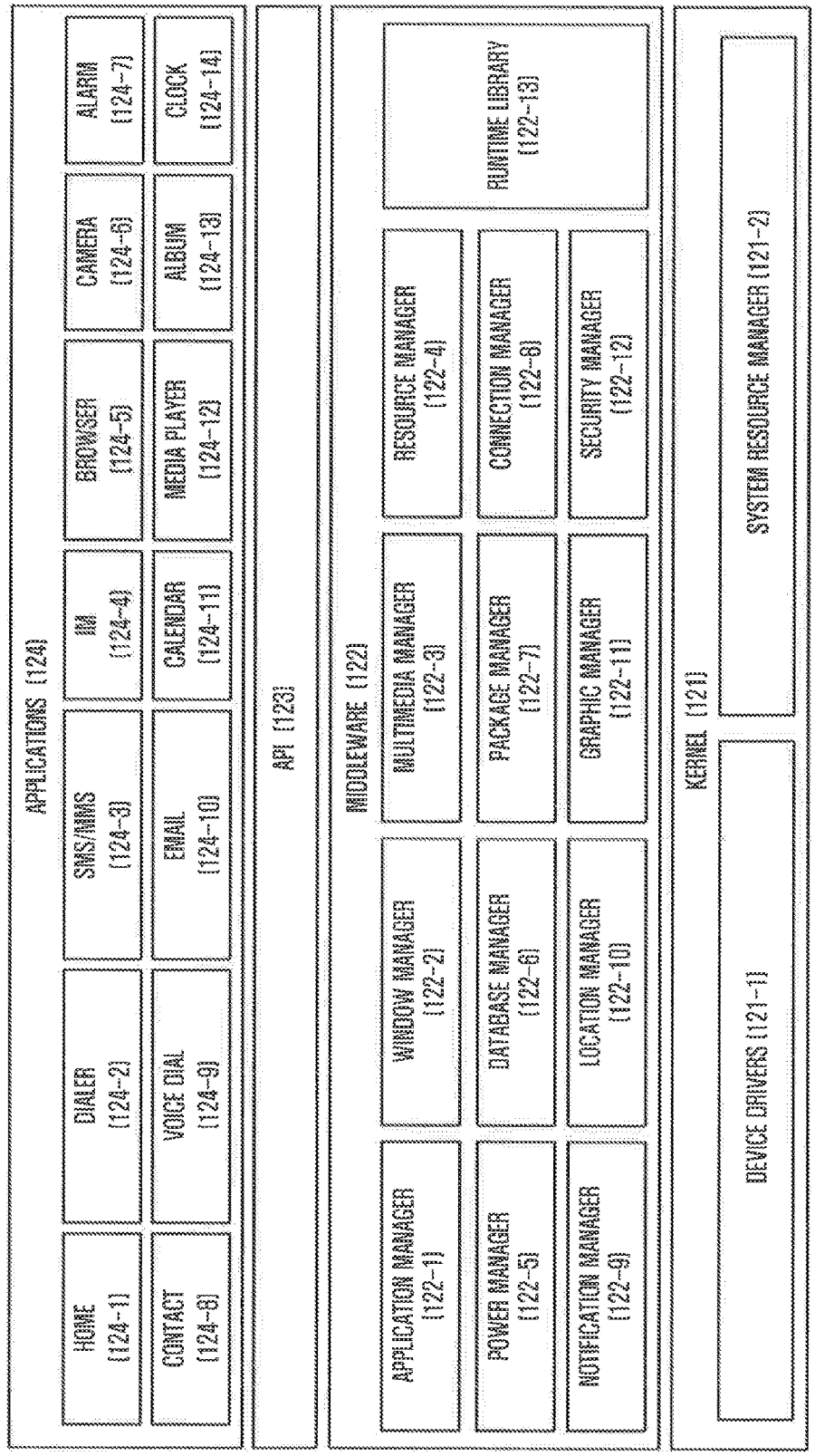
FIG. 2 illustrates a software configuration of the electronic device according to an embodiment of the present disclosure.

FIG. 2 illustrates a software configuration of an electronic device according to an embodiment of the present disclosure.

Referring to FIG. 2, the memory unit 120 may store an operating system controlling resources of the electronic device 100, and application programs to support various applications. The operating system may include a kernel 121, middleware 122, and application programming interfaces (APIs) 123. For example, the operating system (OS) may be Android, iPhone OS (iOS), Windows, Symbian, Tizen, or Bada.

The kernel 121 may include at least one of device drivers 121-1 and a system resource manager 121-2. The device drivers 121-1 enable application programs to access and control pieces of hardware of the electronic device 100. To this end, each device driver 121-1 may include an interface and a driver module developed by a hardware provider. The device drivers 121-1 may include at least one of a display driver, camera driver, BT driver, shared memory driver, USB driver, keypad driver, Wi-Fi driver, audio driver, and inter-process communication (IPC) driver. The system resource manager 121-2 may include at least one of a process manager, a memory manager, and a file system manager. The system resource manager 121-2 may control, allocate and release system resources.

The middleware 122 may include a plurality of modules developed to provide common functions needed by various applications. The middleware 122 may provide functions through the APIs 123 so that the applications 124 may efficiently utilize internal resources of the electronic device 100. The middleware 122 may include at least one of multiple modules, such as an application manager 122-1, window manager 122-2, multimedia manager 122-3, resource manager 122-4, power manager 122-5, database manager 122-6, package manager 122-7, connectivity manager 122-8, notification manager 122-9, location manager 122-10, graphics manager 122-11, and security manager 122-12.

The application manager 122-1 may manage lifecycles of the applications 124. The window manager 122-2 may manage graphical user interface (GUI) resources for screen display. The multimedia manager 122-3 may identify the format of a media file to be played and perform encoding and decoding of the media file using a codec matching the identified format. The resource manager 122-4 may manage resources, such as source codes, memory space and storage space, needed to execute the applications 124. The power manager 122-5 may operate in cooperation with the basic input/output system (BIOS) to manage the power source and provide information on operating power. The database manager 122-6 may permit one of the applications 124 to create, search and update a database. The package manager 122-7 may manage installation and update of applications distributed in a package file format. The connectivity manager 122-8 may manage wireless links based on, for example, Wi-Fi or BT. The notification manager 122-9 may notify the user of events such as message reception, appointment arrival and proximity in a non-disruptive manner. The location manager 122-10 may manage location information of the electronic device 100. The graphics manager 122-11 may manage graphical effects for the user and manage user interfaces related thereto. The security manager 122-12 may provide various security functions needed for system security or user authentication. When the electronic device 100 supports telephony functionality, the middleware 122 may further include a telephony manager (not shown) to manage voice or video call functions.

The middleware 122 may further include a runtime library 122-13 and other library modules (not shown). The runtime library 122-13 may include library modules that are usable by compilers to add new functions via programming languages during application execution. The runtime library 122-13 may provide functions related to, for example, input/output, memory management, and arithmetic computation. In the middleware 122, existing modules may be combined in various ways to form new modules providing new functions. To provide differentiated functions, modules of the middleware 122 may be reconfigured according to the types of operating systems. In a dynamic manner, an existing component of the middleware 122 may be removed or a new component may be added to the middleware 122. According to various embodiments of the present disclosure, an existing component may be omitted, a new component may be added, or an existing component may be replaced by a similar component with a different name.

The APIs 123 are sets of API functions and may be configured differently according to the operating systems. For example, Android and iOS may provide one API set for each platform, and Tizen may provide two or more API sets.

The applications 124 may include a preloaded application installed by default, and a third party application installable by the user during usage. For example, the applications 124 may include at least one of a home application 124-1 for returning to the home screen, a dialer application 124-2 for placing a call to the other party, a text message application 124-3 for receiving a message from a sender identified by a phone number, an instant messaging application 124-4, a browser application 124-5, a camera application 124-6, an alarm application 124-7, a phonebook application 124-8 for managing phone numbers and addresses of counterparts, a call log application 124-9 for managing logs of calls, messages and missed calls, an email application 124-10 for receiving an email message from a sender, a calendar application 124-11, a media player application 124-12, an album application 124-13, and a clock application 124-14. Component names of the software configuration may be varied according to types of operating systems. The software configuration may include one or more of the components described above, and an existing component may be omitted or removed or a new component may be added.

Figure 3:
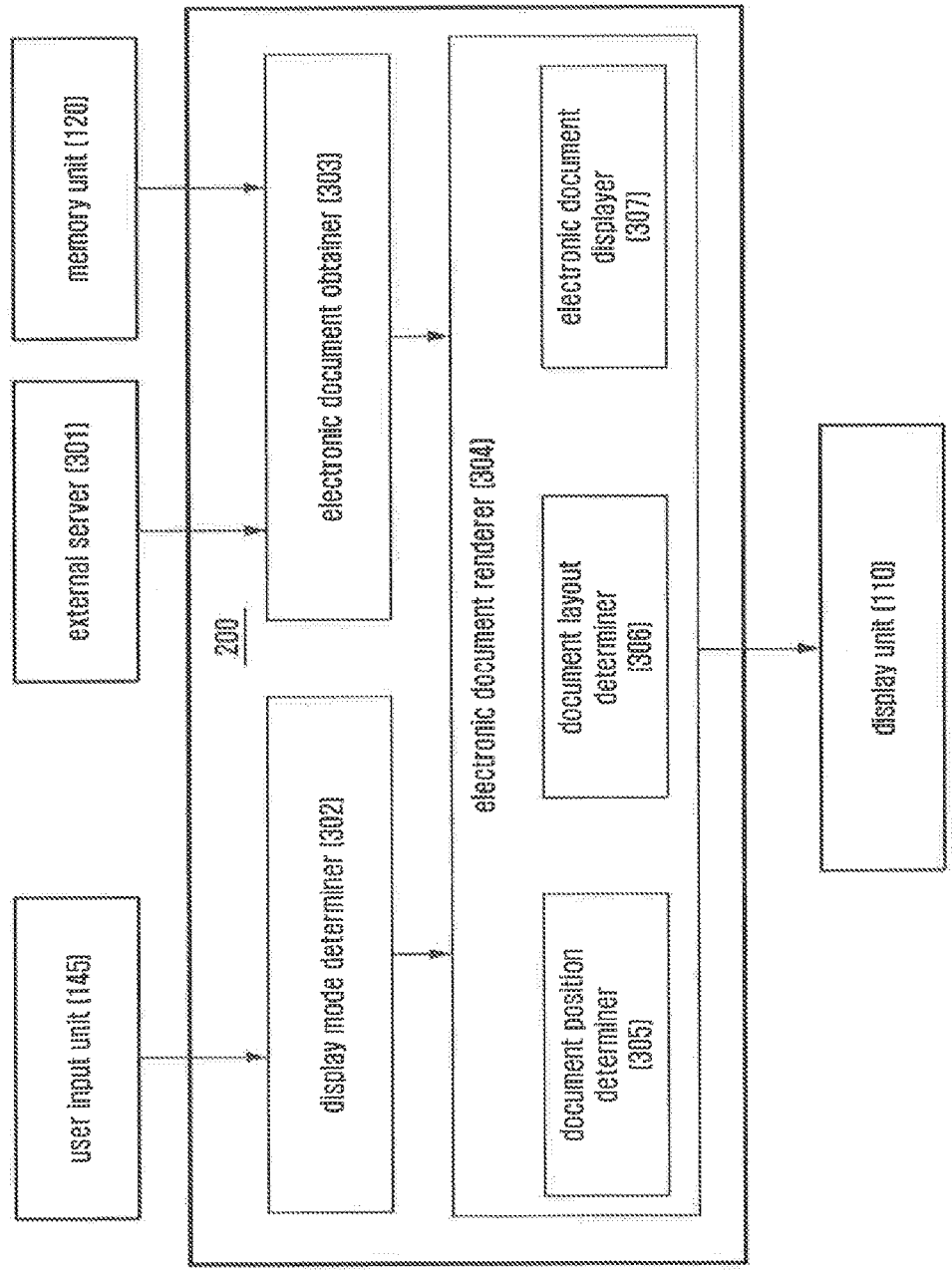
FIG. 3 illustrates components of the control unit in the electronic device according to an embodiment of the present disclosure.

FIG. 3 illustrates components of a control unit in an electronic device according to an embodiment of the present disclosure.

Referring to FIG. 3, the control unit 200 may include a display mode determiner 302, an electronic document obtainer 303, and an electronic document renderer 304.

The electronic document obtainer 303 may obtain an electronic document from an external server 301 (e.g., external web server) or from the memory unit 120 of the electronic device 100. For example, the electronic document obtainer 303 may obtain a first electronic document from the external server 301 and obtain a second electronic document linked with a link object contained in the first electronic document.

The display mode determiner 302 may determine display mode of a second electronic document linked with a link object. For example, when displaying the second electronic document, the display mode determiner 302 may determine whether to display only the second electronic document without the first electronic document on the screen or to display the first electronic document and the second electronic document together on the screen according to user settings through the user input unit 145 or default settings.

The electronic document renderer 304 may display an electronic document obtained by the electronic document obtainer 303 on the screen according to the result of determination of the display mode determiner 302. The electronic document renderer 304 may include a document position determiner 305, a document layout determiner 306, and an electronic document displayer 307.

The document position determiner 305 may determine the position at which the first electronic document or the second electronic document is to be displayed. For example, the document position determiner 305 may determine the position on the screen at which the first electronic document or the second electronic document is to be redisplayed according to an input signal (e.g., a drag gesture). To display the first electronic document and second electronic document together, the document position determiner 305 may determine the position at which the second electronic document is to be displayed based on the position of a link object contained in the first electronic document.

The document layout determiner 306 may determine the layout of the first electronic document or second electronic document based on the position of the first electronic document or second electronic document determined by the document position determiner 305. For example, the document layout determiner 306 may change the layout of the first electronic document so that the second electronic document is displayed as being inserted in the first electronic document. Here, that the second electronic document is displayed as being inserted in the first electronic document may indicate any screen composition wherein the second electronic document appears to the user as being inserted in the first electronic document. For instance, the document layout determiner 306 may combine the layout of the first electronic document with that of the second electronic document to form a single electronic document. The document layout determiner 306 may also change the layout of the first electronic document so that the second electronic document is displayed as an overlay on an empty region created by extending a part of the first electronic document.

The electronic document displayer 307 may display data elements related to the first electronic document and second electronic document according to the layout of the first electronic document and second electronic document determined by the document layout determiner 306. For example, the electronic document displayer 307 may retrieve pieces of content linked with at least one layout component and display the retrieved pieces of content at corresponding positions of the layout components. Here, the pieces of content may be processed, removed, or complemented according to resolution, size, network state and resources before display.

Figure 4:
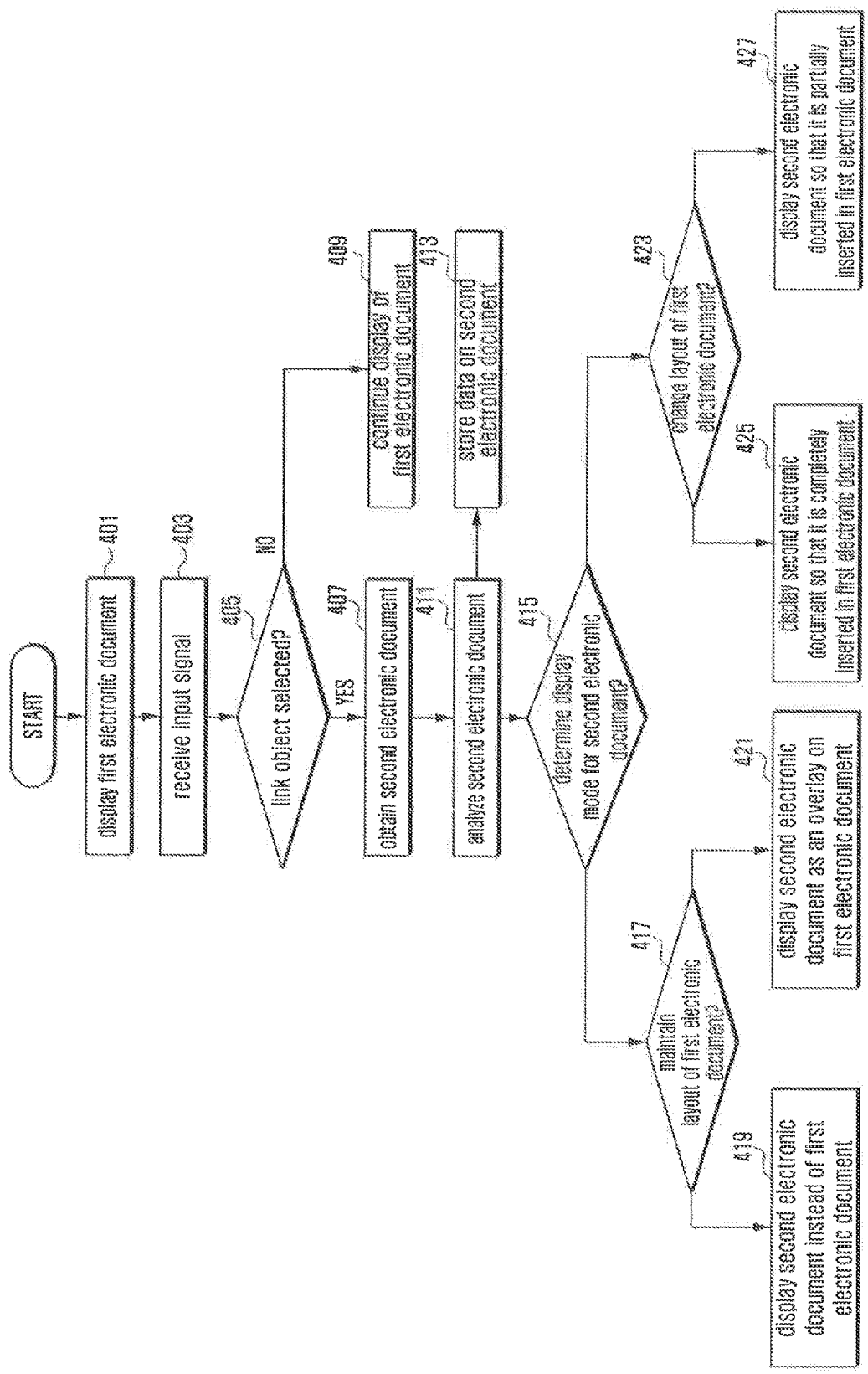
FIGS. 4 and 5 are flowcharts describing processing operations of the control unit in the electronic device according to various embodiments of the present disclosure.

FIG. 4 is a flowchart describing processing operations of a control unit in an electronic device according to an embodiment of the present disclosure.

Referring to FIG. 4, at operation 401, the control unit 200 displays a first electronic document on the display unit 110. Here, the first electronic document may include at least one link object. The link object is an object having a link address, and may be a content item such as a text, an image or a moving image, a button, or a menu item. At operation 403, the control unit 200 receives an input signal (e.g., touch gesture) on the first electronic document. Upon reception of the input signal, at operation 405, the control unit 200 determines whether a link object is selected by the user. For example, when the input signal is received at a position where a link object is displayed, the control unit 200 may determine that a link object is selected. Upon determining that a link object is selected, at operation 407, the control unit 200 obtains a second electronic document linked with the link object from an external device or the memory unit 120. Upon determining that a link object is not selected, at operation 409, the control unit 200 may continue to display the first electronic document on the screen. For example, according to the input signal, the control unit 200 may shift, enlarge or reduce the first electronic document or may display the same screen as before.

At operation 411, the control unit 200 analyzes the obtained second electronic document. At operation 413, the control unit 200 may store the analysis result and data on the second electronic document in the memory unit 120. Here, the data on the second electronic document may include at least one of objects constituting the second electronic document such as pieces of content, buttons and menus, link address information of sources of the objects, link information of other electronic documents linked with the objects, information regarding sizes, colors, positions of the objects, and information regarding relations between the objects.

At operation 415, the control unit 200 determines display mode for the second electronic document to be displayed on the screen. To maintain the layout of the first electronic document, the procedure proceeds to operation 417. To change the layout of the first electronic document, the procedure proceeds to operation 423.

To maintain the layout of the first electronic document, at operation 419, the control unit 200 may display the second electronic document on the screen instead of the first electronic document being displayed. Alternatively, the control unit 200 may discontinue display of the first electronic document and display the second electronic document on the screen, or may display the second electronic document in a full screen format while leaving the first electronic document active in the background.

To maintain the layout of the first electronic document, at operation 421, the control unit 200 may display the second electronic document as an overlay on the first electronic document being displayed on the screen. For example, the second electronic document may be displayed as a popup on top of the first electronic document. Here, the second electronic document may be displayed together with a part of the first electronic document.

To change the layout of the first electronic document, at operation 425, the control unit 200 may display the second electronic document so that the second electronic document is completely inserted in the first electronic document. Alternatively, at operation 427, the control unit 200 may display the second electronic document so that the second electronic document is partially inserted in the first electronic document. Change of the layout of the first electronic document is described further in connection with FIG. 5.

Figure 5:
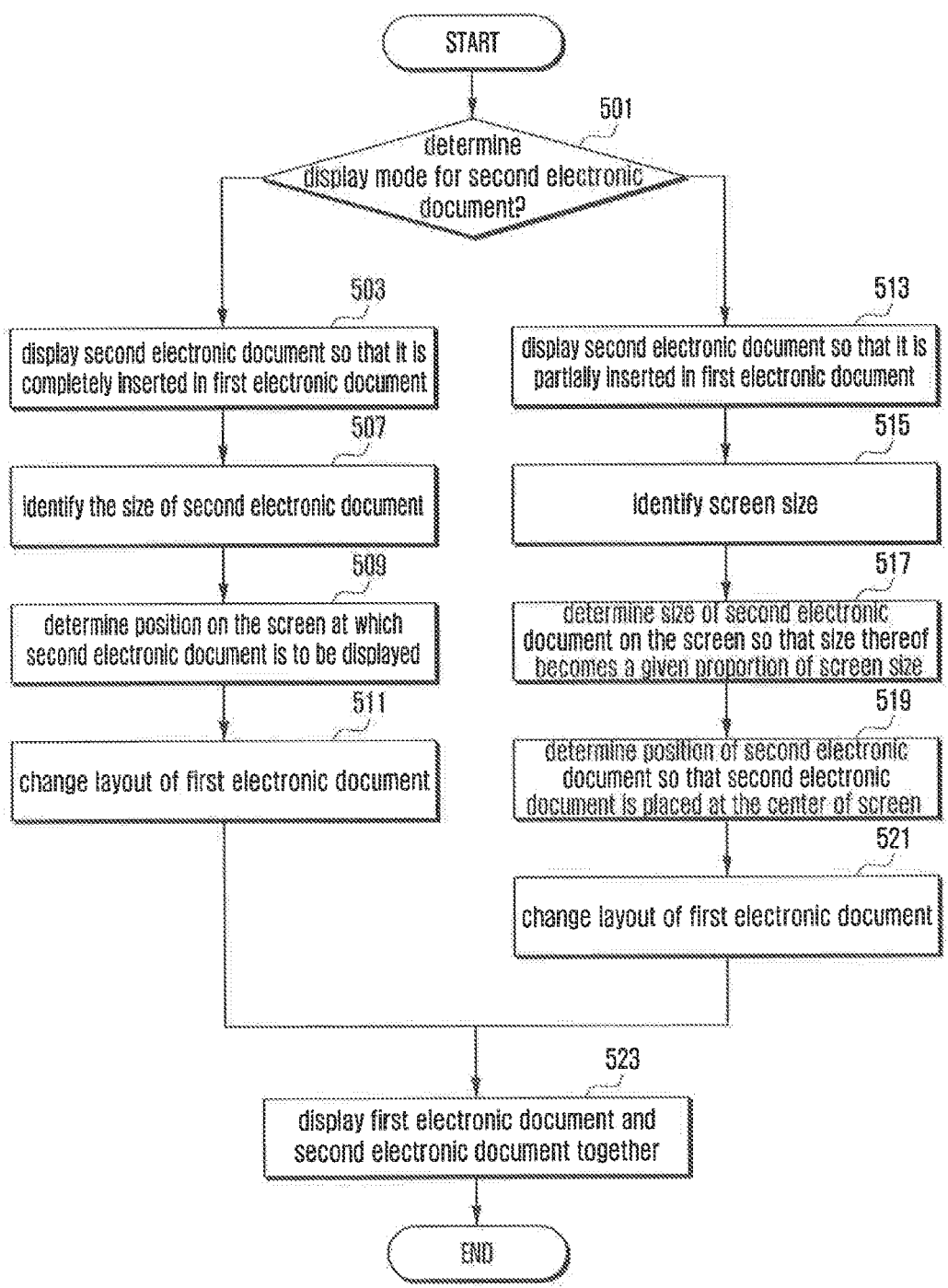

FIG. 5 is a flowchart describing processing operations of a control unit in an electronic device according to an embodiment of the present disclosure.

Referring to FIG. 5, at operation 501, the control unit 200 determines display mode for the second electronic document. At operation 503, the second electronic document may be displayed so that the second electronic document is completely inserted in the first electronic document. At operation 513, the second electronic document may be displayed so that the second electronic document is partially inserted in the first electronic document.

To display the second electronic document so that the second electronic document is completely inserted in the first electronic document, at operation 507, the control unit 200 identifies the size (width or height) of the second electronic document. At operation 509, the control unit 200 determines the position on the screen at which the second electronic document is to be displayed in consideration of the size of the second electronic document. At operation 511, the control unit 200 changes the layout of the first electronic document in consideration of the position on the screen at which the second electronic document is to be displayed. Here, the first electronic document may be divided into an upper section and a lower section with respect to the position of the link object of the first electronic document linking the second electronic document.

For example, assume that the screen is rectangular and is represented by the upper left vertex (0, 0) and the lower right vertex (screen height, screen width), and the electronic document is also rectangular and is represented by the upper left vertex and the lower right vertex. Then, the area on the screen in which the electronic document is displayed may be given by (0, 0) and (electronic document height, electronic document width). The upper section of the first electronic document split on the screen may be in the range given by (0, 0) and (height of link object, width of first electronic document). The lower section of the first electronic document split on the screen may be in the range given by (height of link object+height of second electronic document, width of second electronic document) and (screen height, screen width). The position of the second electronic document inserted in the first electronic document on the screen may be given by (height of link object, 0) and (height of link object+height of second electronic document, width of second electronic document).

As another example, assume that the electronic device 100 has a screen size of 1280×720 pixels, the first electronic document has a size of 1400×720 pixels, the second electronic document has a size of 1000×720 pixels, and the link object is in the range given by (200, 0) and (220, 500). Then, the upper section of the first electronic document split on the screen may be in the range given by (0, 0) and (220, 720). The position of the second electronic document on the screen may be in the range given by (220, 0) and (1220, 720). The lower section of the first electronic document split on the screen may be in the range given by (1220, 0) and (1280, 720).

To display the second electronic document so that the second electronic document is partially inserted in the first electronic document, at operation 515, the control unit 200 identifies the screen size (width or height) of the electronic device 100. At operation 517, the control unit 200 determines the size of the second electronic document on the screen so that the size of the second electronic document becomes a given proportion of the screen size. For example, the control unit 200 may set the size of the second electronic document on the screen to about one-half (½) to two-thirds (⅔) of the screen size. At operation 519, the control unit 200 determines the position of the second electronic document on the screen so that the second electronic document is placed at the center of the screen. At operation 521, the control unit 200 changes the layout of the first electronic document in accordance with the determined position of the second electronic document. Here, the first electronic document may be split into an upper section and lower section with respect to the position of the second electronic document. For example, assume that the second electronic document covers one-half of the screen at the center. Then, the upper section of the first electronic document split on the screen may be in the range given by (0, 0) and (¼ of screen height, width of first electronic document). The lower section of the first electronic document split on the screen may be in the range given by (¾ of screen height, 0) and (screen height, screen width). The position of the second electronic document inserted in the first electronic document may be in the range given by (¼ of screen height, 0) and (¾ of screen height, width of second electronic document).

As another example, assume that the electronic device 100 has a screen size of 1280×720 pixels, the first electronic document has a size of 1400×720 pixels, and the second electronic document has a size of 1000×720 pixels. Then, the upper section of the first electronic document may be in the range given by (0, 0) and (320, 720). The position of the second electronic document inserted between the upper and lower sections of the first electronic document may be in the range given by (321, 0) and (960, 720). The lower section of the first electronic document may be in the range given by (961, 0) and (1280, 720) on the screen.

At operation 523, the control unit 200 displays the first electronic document and second electronic document together according to the determined layouts of the first electronic document and second electronic document. As described above, the second electronic document may be displayed as being inserted in the first electronic document on the screen.

The control unit 200 may support user interactions in various ways based on the above embodiment. Next, a description is given of user interactions according to various embodiments of the present disclosure.

Figure 6A:
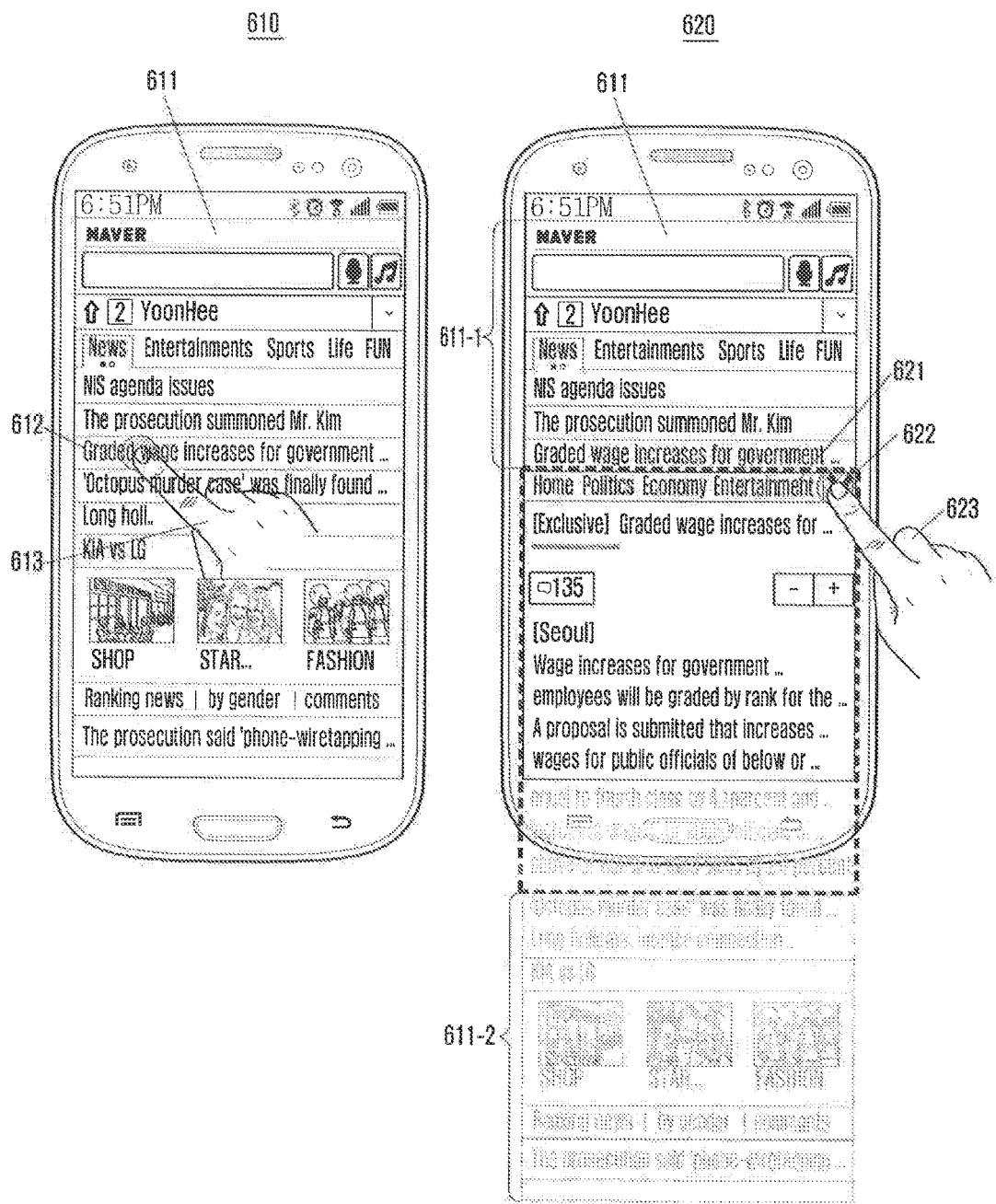
FIGS. 6A, 6B, 7A, 7B, 8A, 8B, 9A, 9B, 10A, 10B, 11A, 11B, 12A, 12B, 13A, 13B, 13C, 14A, 14B, 14C, 15A, 15B, 15C, 16A, 16B, 17A, 17B, 18A, 18B, and 18C are screen representations for displaying electronic documents linked with link objects according to various embodiments of the present disclosure.
Figure 6B:
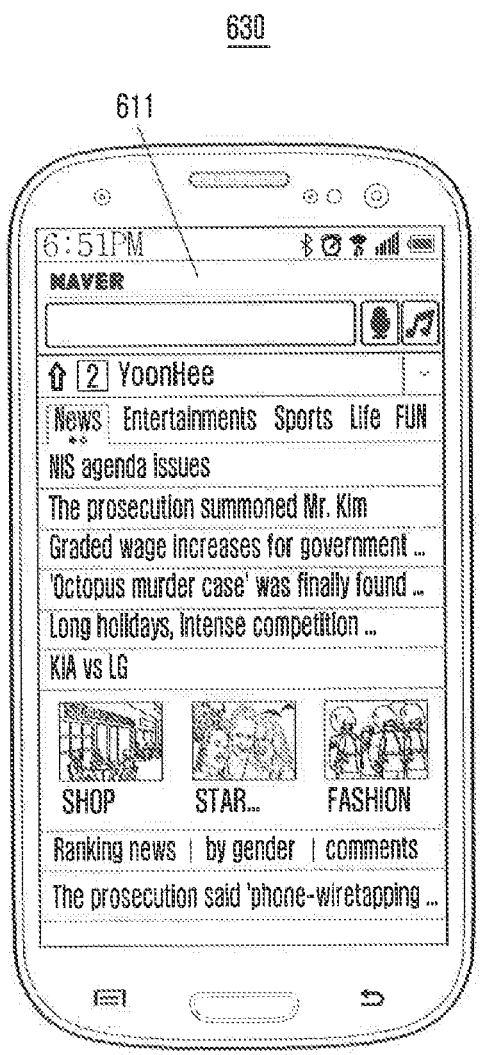

FIGS. 6A and 6B are screen representations for displaying electronic documents linked with link objects according to various embodiments of the present disclosure.

Referring to FIG. 6A, as indicated by indicia 610, the control unit 200 may display a first electronic document 611 having at least one link object 612 on the screen. Here, the link object 612 may be text. The control unit 200 may receive an input signal for selecting the link object 612 on the screen. Here, the input signal may correspond to a user touch gesture 613 on the link object 612 detected by the touch panel 147.

In response to the input signal, as indicated by indicia 620, the control unit 200 may display a second electronic document 621 linked with the link object so that the second electronic document 621 is inserted in the first electronic document 611. For example, the control unit 200 may display the second electronic document 621 below the link object contained in the first electronic document 611. The second electronic document 621 may be inserted below the upper section 611-1 of the first electronic document 611 and above the lower section 611-2 thereof with respect to the position of the link object of the first electronic document 611. When the sum of the heights of the first electronic document 611 and second electronic document 621 is greater than the screen height, at least a part of the lower section 611-2 of the first electronic document 611 may be not shown on the screen. When the sum of the heights of the first electronic document 611 and second electronic document 621 is less than the screen height, the first electronic document 611 and second electronic document 621 may be displayed in full on the screen.

The control unit 200 may receive an input signal for selecting the close button 622 for closing the second electronic document 621 displayed on the screen. Here, the input signal may correspond to a user touch gesture 623 on the close button 622 detected by the touch panel 147. Alternatively, an input signal for selecting a site outside the second electronic document 621 may be used to close the second electronic document 621 displayed on the screen. For example, the input signal may correspond to a touch gesture selecting the first electronic document 611 outside the second electronic document 621.

The control unit 200 may provide various visual effects in the process of closing the second electronic document 621. For example, the second electronic document 621 may fade out; the second electronic document 621 may disappear while shrinking gradually from the bottom of the screen; the second electronic document 621 may disappear while shrinking; or the second electronic document 621 may disappear while being folded up.

Referring to FIG. 6B, in response to the input signal, as indicated by indicia 630, the control unit 200 may close the second electronic document 621 being displayed and redisplay the first electronic document 611.

Figure 7A:
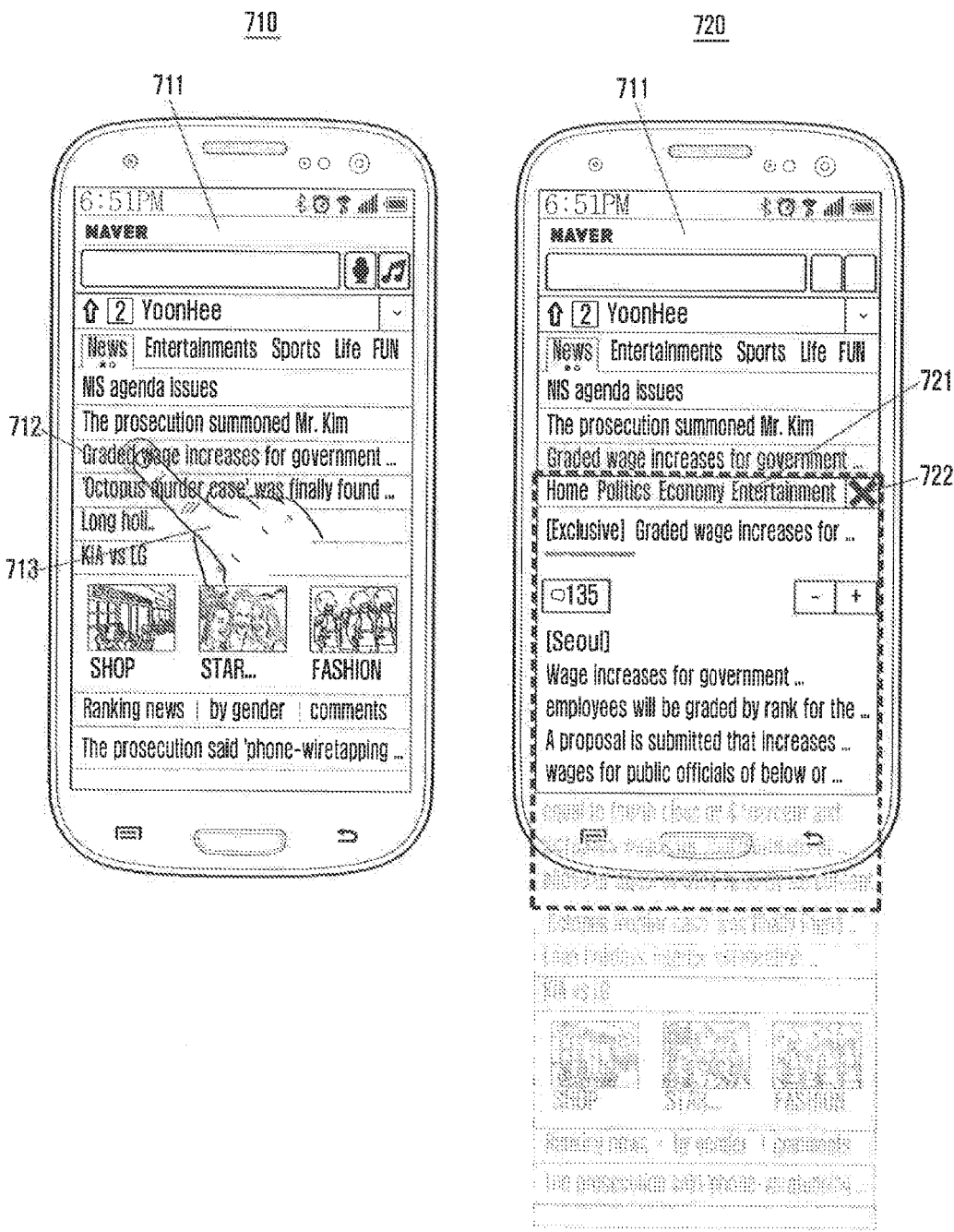
Figure 7B:
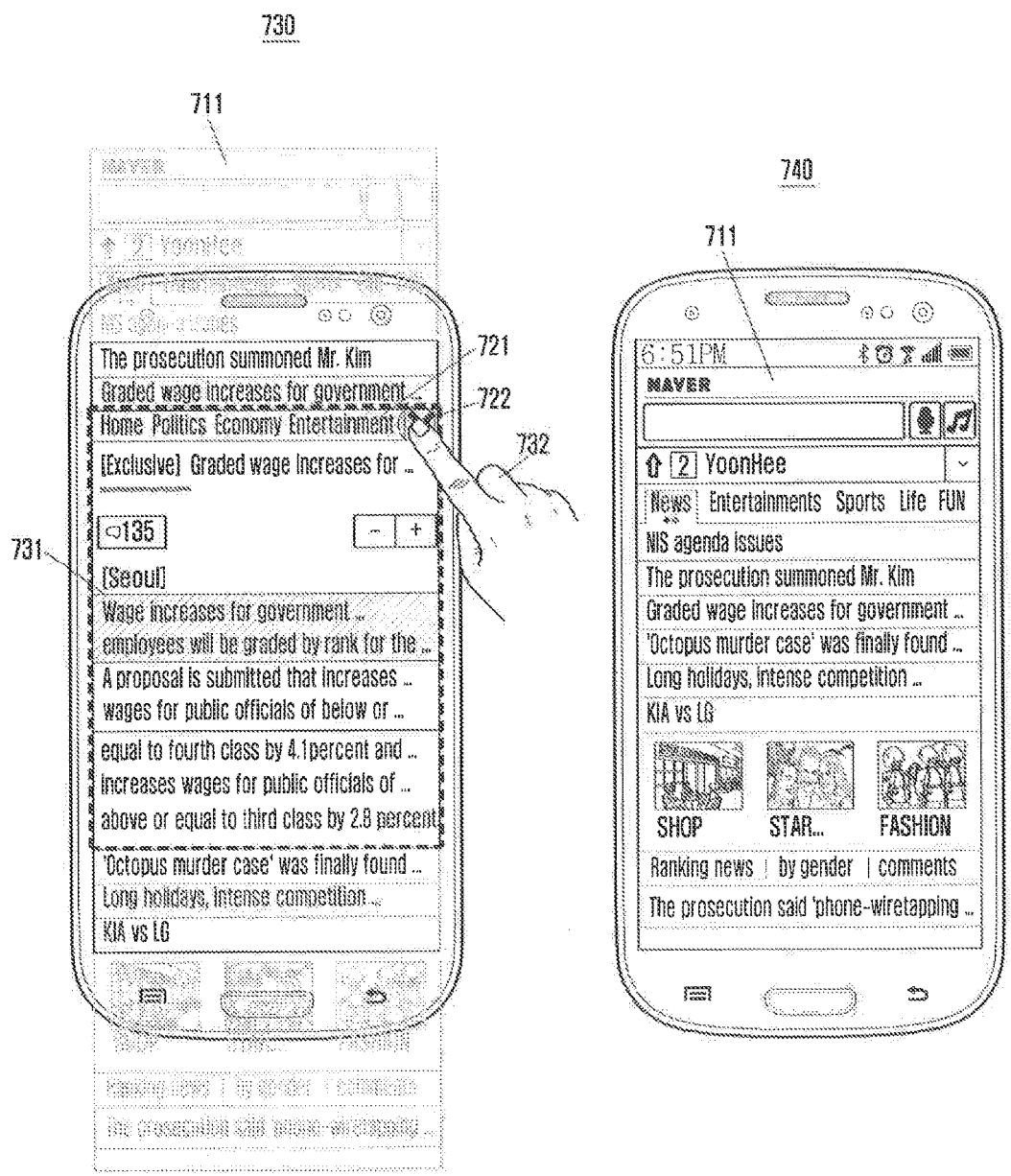

FIGS. 7A and 7B are screen representations for displaying electronic documents linked with link objects according to various embodiments of the present disclosure.

Referring to FIG. 7A, as indicated by indicia 710, the control unit 200 may display a first electronic document 711 having at least one link object 712 on the screen. The control unit 200 may receive an input signal corresponding to a touch gesture 713 for selecting the link object 712 on the screen.

In response to the input signal, as indicated by indicia 720, the control unit 200 may display a second electronic document 721 linked with the link object 712 so that the second electronic document 721 is inserted in the first electronic document 711. Here, the control unit 200 may determine the positions of the first electronic document 711 and second electronic document 721 so that the second electronic document 721 is effectively centered on the screen. The control unit 200 may also determine the positions of the first electronic document 711 and second electronic document 721 on the screen so that the displayed part of the second electronic document 721 is larger than that of the first electronic document 711. The control unit 200 may also adjust the positions of the first electronic document 711 and second electronic document 721 on the screen so that the second electronic document 721 is displayed from the top of the screen except for the status bar.

For example, the control unit 200 may determine the position of the second electronic document 721 with respect to the position of the link object 712 so that the second electronic document 721 is effectively centered on the screen. In the event that the second electronic document is displayed below the link object, when the link object 712 is placed at a lower portion of the screen, only a small part of the second electronic document 721 may be displayed. In this case, the control unit 200 may adjust the position of the second electronic document 721 so that the second electronic document 721 is effectively centered on the screen.

Figure 9A:
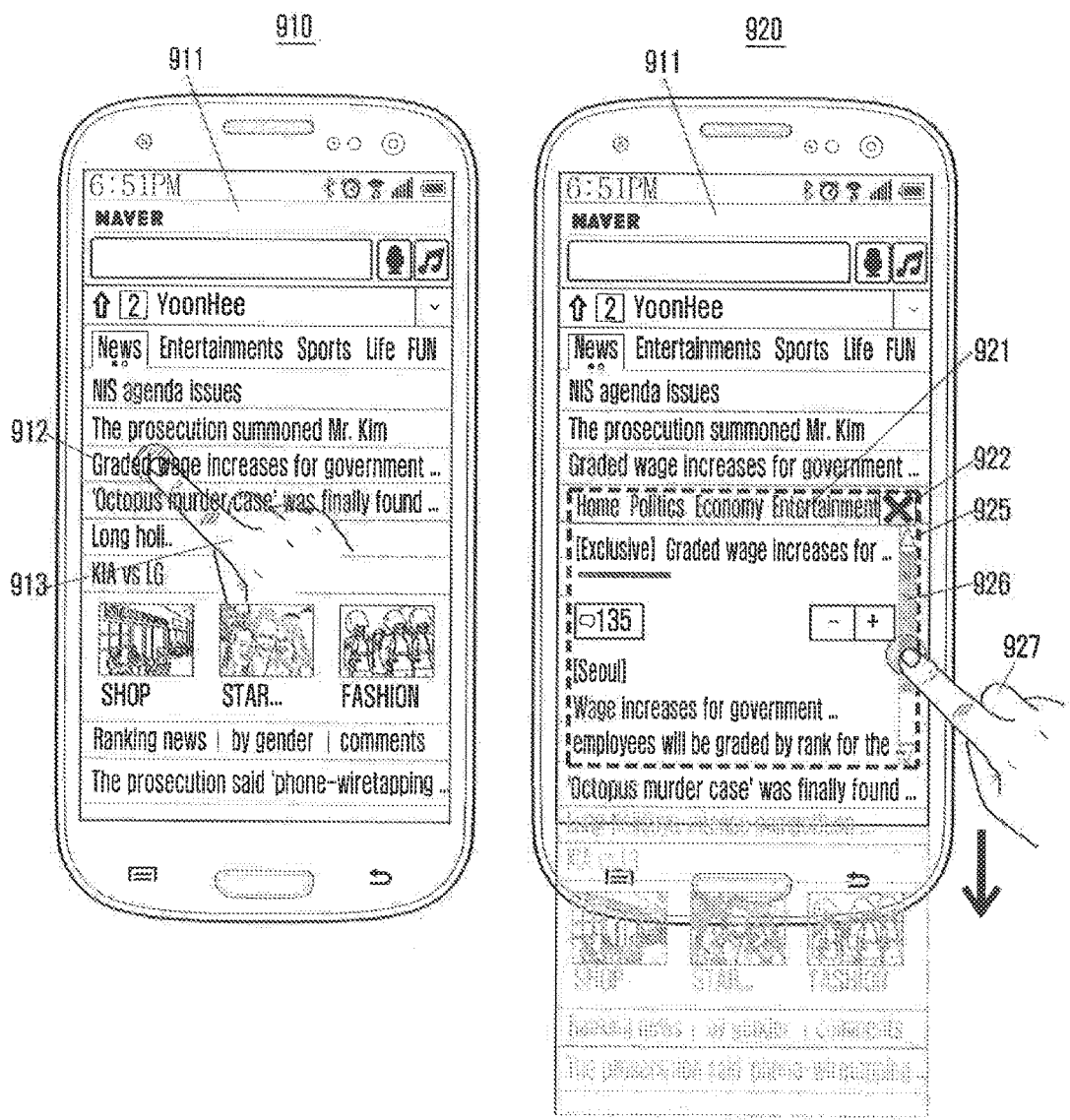

Referring to FIG. 9A, as indicated by indicia 730, the control unit 200 may display the second electronic document 721 so that the second electronic document 721 is effectively centered on the screen. For example, the control unit 200 may display the second electronic document 721 so that the center of the second electronic document 721 is placed at or near the center of the screen (shaded region 731). Meanwhile, in response to the input signal generated in the state indicated by indicia 710, the second electronic document 721 may be directly displayed at the center of the screen without transitioning to the state indicated by indicia 720. The control unit 200 may receive an input signal for selecting the close button 722 for closing the second electronic document 721 displayed on the screen. Here, the input signal may correspond to a user touch gesture 732 on the close button 722 detected by the touch panel 147.

In response to the input signal, as indicated by indicia 740, the control unit 200 may close the second electronic document 721 being displayed and redisplay the first electronic document 711.

Figure 8A:
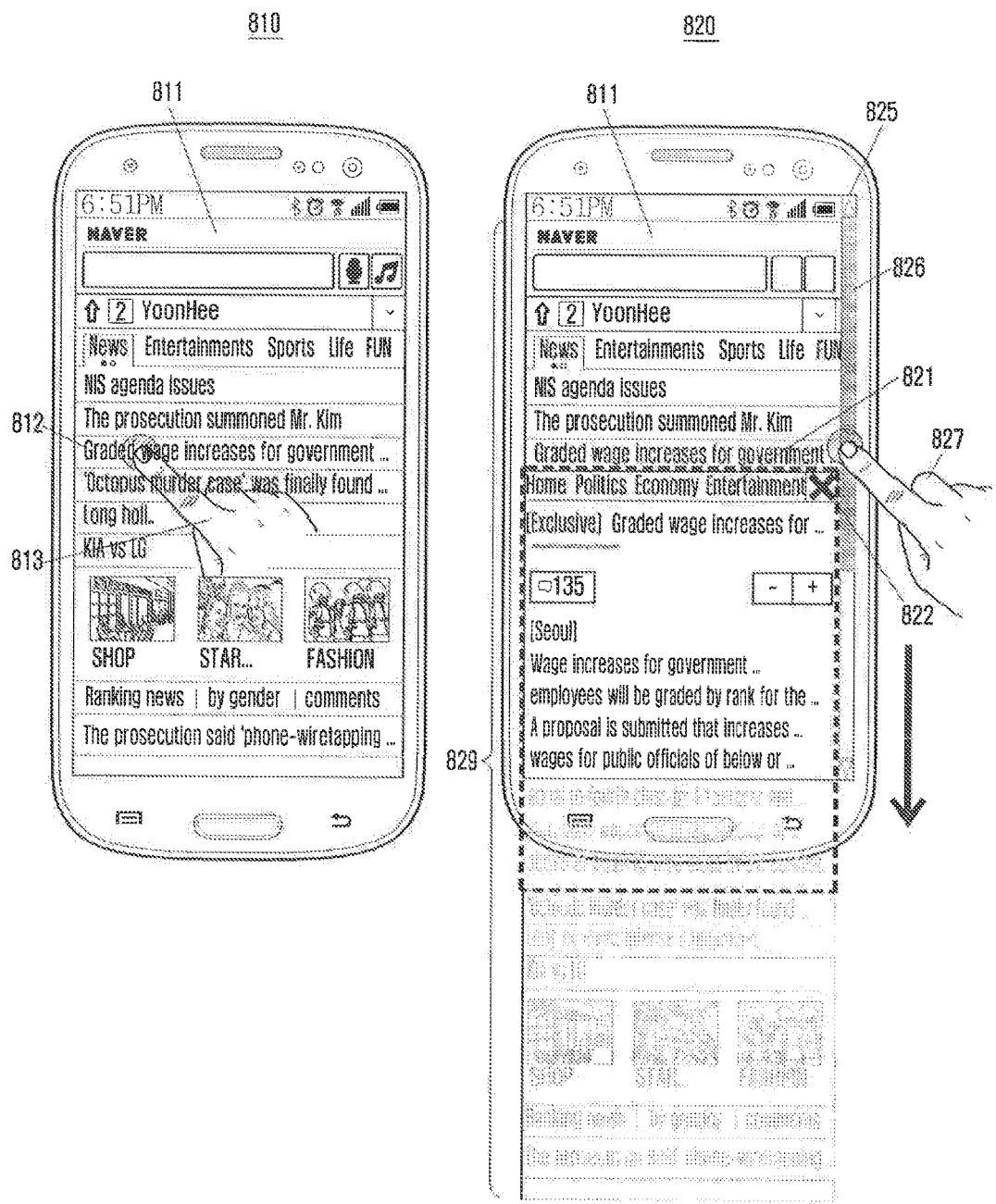
Figure 8B:
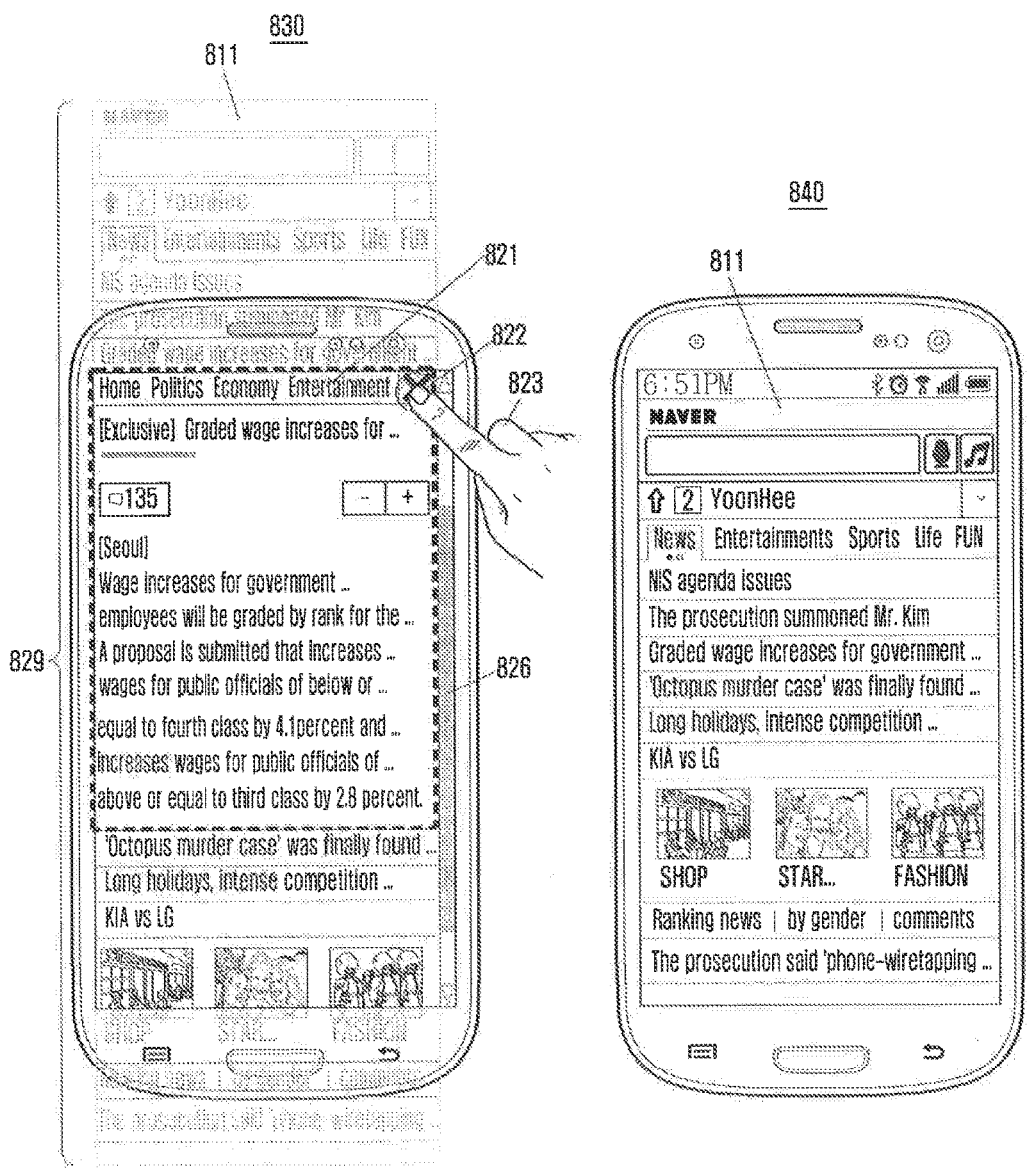

FIGS. 8A and 8B are screen representations for displaying electronic documents linked with link objects according to various embodiments of the present disclosure.

Referring to FIG. 8A, as indicated by indicia 810, the control unit 200 may display a first electronic document 811 having at least one link object 812 on the screen. The control unit 200 may receive an input signal corresponding to a touch gesture 813 for selecting the link object 812 on the screen.

In response to the input signal, as indicated by indicia 820, the control unit 200 may display a second electronic document 821 linked with the link object so that it is inserted in the first electronic document 811. Here, the control unit 200 may display a scroll bar 825 for scrolling the first electronic document 811 and second electronic document 821. At the scroll bar 825, a scroller 826 may be displayed to indicate the position or amount of the first electronic document 811 or the second electronic document 821 being displayed relative to the total length 829 of the first electronic document 811 and second electronic document 821. The control unit 200 may receive an input signal for moving the scroller 826 in a direction. Here, the input signal may correspond to a user drag gesture 827 on the scroller 826 detected by the touch panel 147.

Referring to FIG. 8B, in response to the input signal, as indicated by indicia 830, the control unit 200 may scroll the first electronic document 811 and second electronic document 821 in consideration of the total length 829. Here, the first electronic document 811 and the second electronic document 821 may be scrolled together at the same speed and in the same direction according to the input signal. For example, when the user drags the scroller 826 in a downward direction, the first electronic document 811 and the second electronic document 821 may be scrolled in a downward direction with respect to the total length 829. The control unit 200 may receive an input signal for selecting the close button 822 for closing the second electronic document 821 displayed on the screen. Here, the input signal may correspond to a user touch gesture 823 on the close button 822 detected by the touch panel 147.

In response to the input signal, as indicated by indicia 840, the control unit 200 may close the second electronic document 821 being displayed and redisplay the first electronic document 811.

Figure 9B:
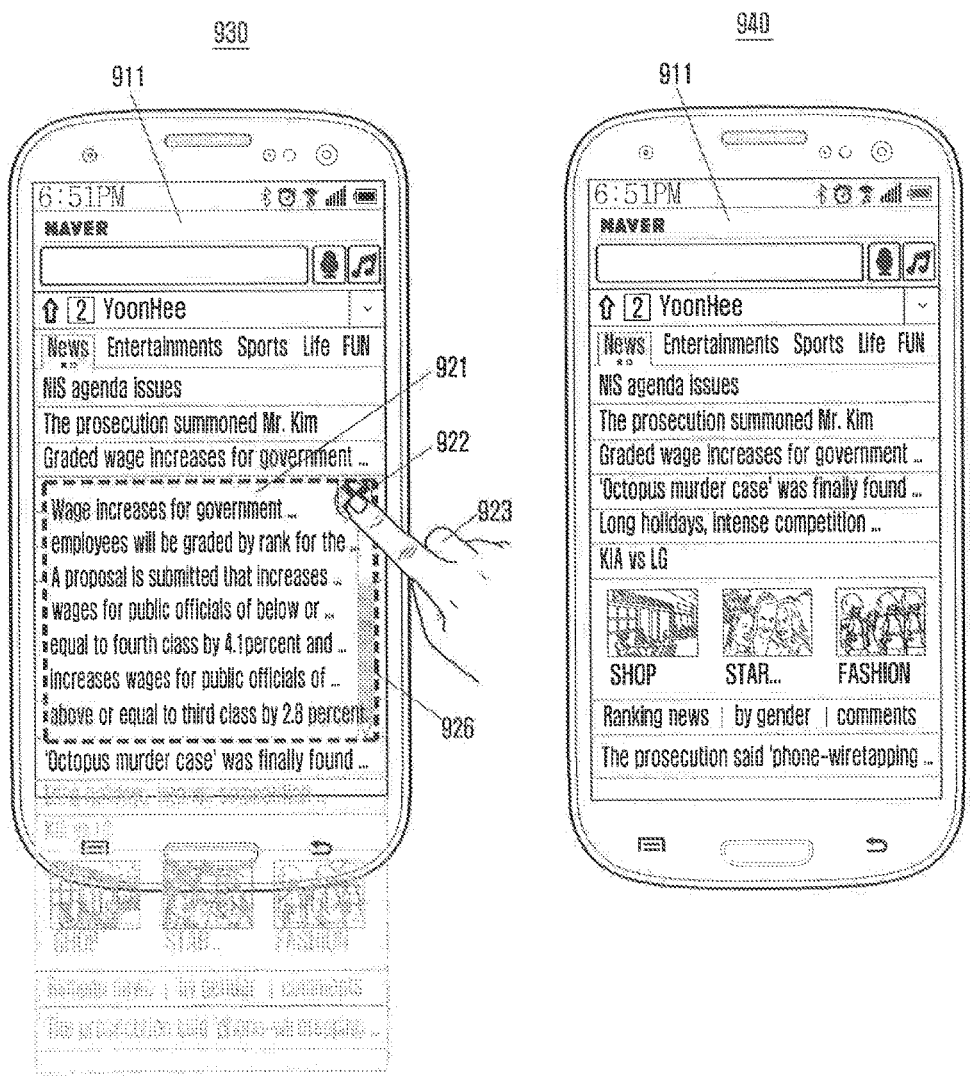

FIGS. 9A and 9B are screen representations for displaying electronic documents linked with link objects according to various embodiments of the present disclosure.

Referring to FIG. 9A, as indicated by indicia 910, the control unit 200 may display a first electronic document 911 having at least one link object 912 on the screen. The control unit 200 may receive an input signal corresponding to a touch gesture 913 for selecting the link object 912 on the screen.

In response to the input signal, as indicated by indicia 920, the control unit 200 may display a second electronic document 921 linked with the link object so that it is inserted in the first electronic document 911. Here, the control unit 200 may display a scroll bar 925 for scrolling the second electronic document 921 at a side of the electronic document 921. At the scroll bar 925, a scroller 926 may be displayed to indicate the position or amount of the second electronic document 921 being displayed relative to the total length of the second electronic document 921. The control unit 200 may receive an input signal for moving the scroller 926 in a direction. Here, the input signal may correspond to a user drag gesture 927 on the scroller 926 detected by the touch panel 147.

Referring to FIG. 9B, in response to the input signal, as indicated by indicia 930, the control unit 200 may scroll the second electronic document 921 in consideration of the total length of the second electronic document 921. Here, the second electronic document 921 may be scrolled according to the input signal independently of the first electronic document 911. For example, when the user drags the scroller 926 in a downward direction, the second electronic document 921 may be scrolled in a downward direction with respect to the total length thereof without scrolling of the first electronic document 911. The control unit 200 may receive an input signal for selecting the close button 922 for closing the second electronic document 921 displayed on the screen. Here, the input signal may correspond to a user touch gesture 923 on the close button 922 detected by the touch panel 147.

In response to the input signal, as indicated by indicia 940, the control unit 200 may close the second electronic document 921 being displayed and redisplay the first electronic document 911.

Figure 10A:
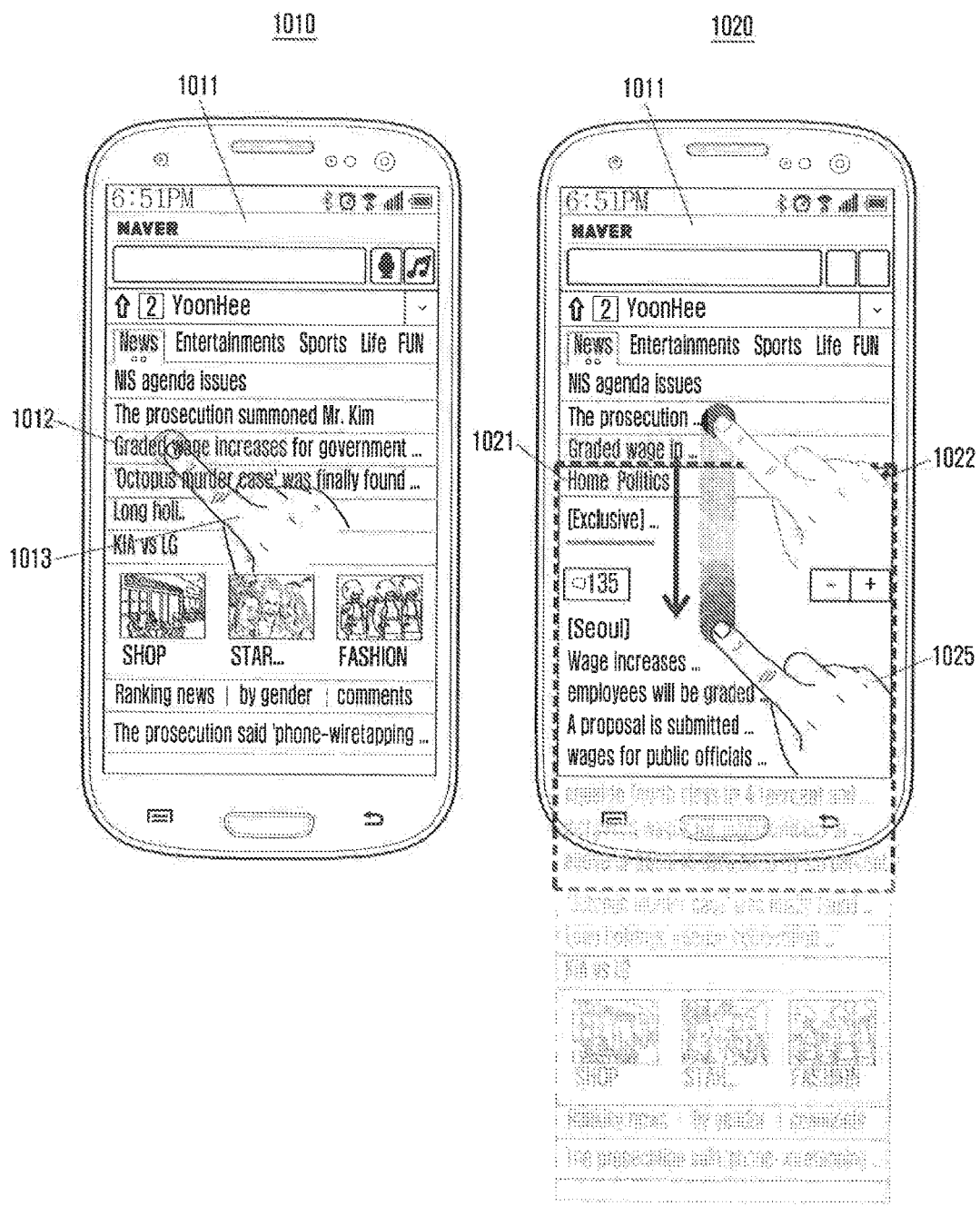
Figure 10B:
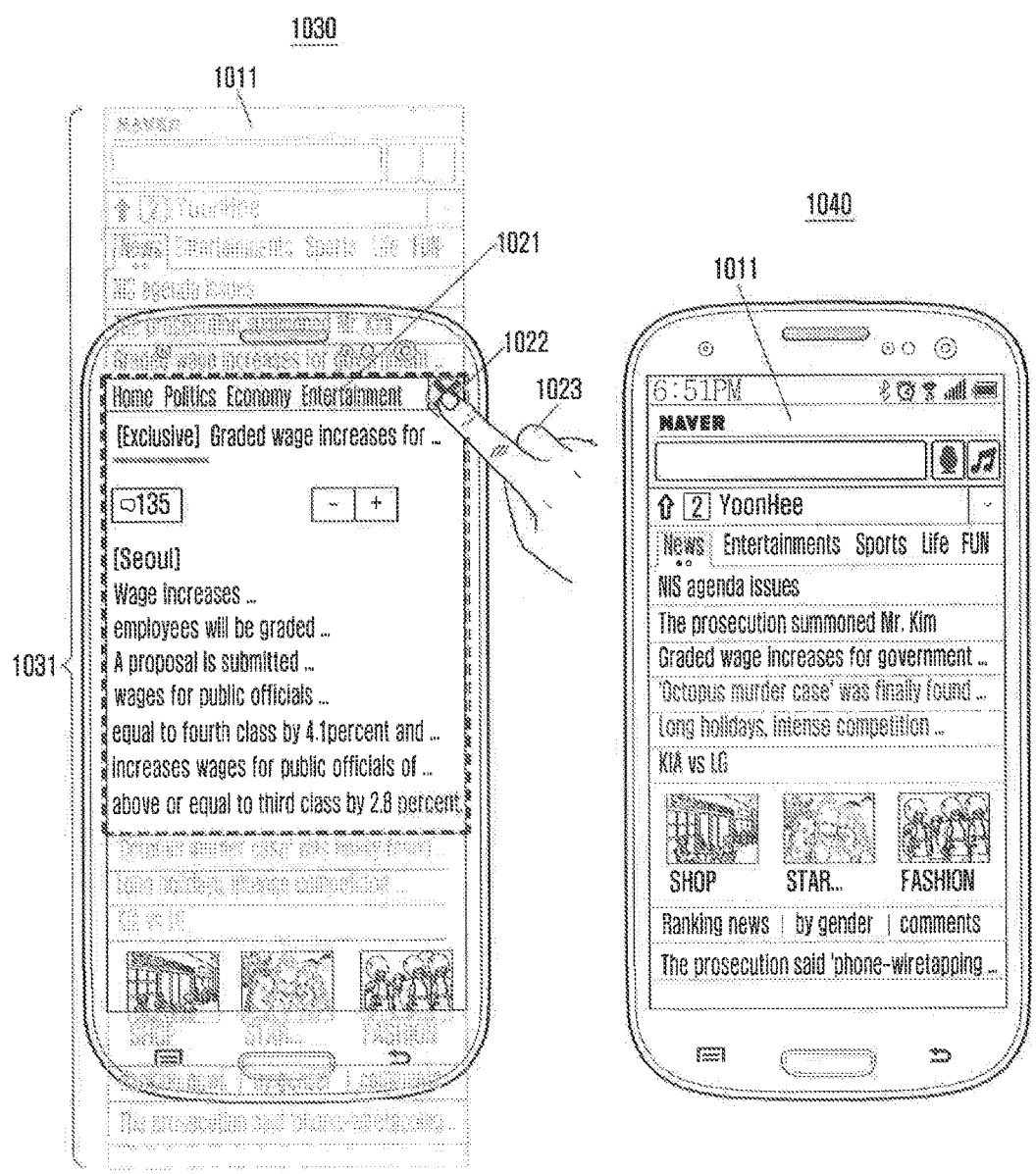

FIGS. 10A and 10B are screen representations for displaying electronic documents linked with link objects according to various embodiments of the present disclosure.

Referring to FIG. 10A, as indicated by indicia 1010, the control unit 200 may display a first electronic document 1011 having at least one link object 1012 on the screen. The control unit 200 may receive an input signal corresponding to a touch gesture 1013 for selecting the link object 1012 on the screen.

In response to the input signal, as indicated by indicia 1020, the control unit 200 may display a second electronic document 1021 linked with the link object so that it is inserted in the first electronic document 1011. The control unit 200 may receive an input signal for moving the first electronic document 1011 and the second electronic document 1021. Here, the input signal may correspond to a user flick gesture 1025 in a direction on the screen detected by the touch panel 147.

Referring to FIG. 10B, in response to the input signal, as indicated by indicia 1030, the control unit 200 may move the positions of the first electronic document 1011 and second electronic document 1021 on the screen in consideration of the total length 1031. Here, the first electronic document 1011 and the second electronic document 1021 may be moved together at the same speed and in the same direction according to the input signal. For example, when the user makes a flick gesture 1025 in a downward direction, the first electronic document 1011 and the second electronic document 1021 may be moved on the screen in a downward direction with respect to the total length 1031. The control unit 200 may receive an input signal for selecting the close button 1022 for closing the second electronic document 1021 displayed on the screen.

In response to the input signal, as indicated by indicia 1040, the control unit 200 may close the second electronic document 1021 being displayed and redisplay the first electronic document 1011.

Figure 11A:
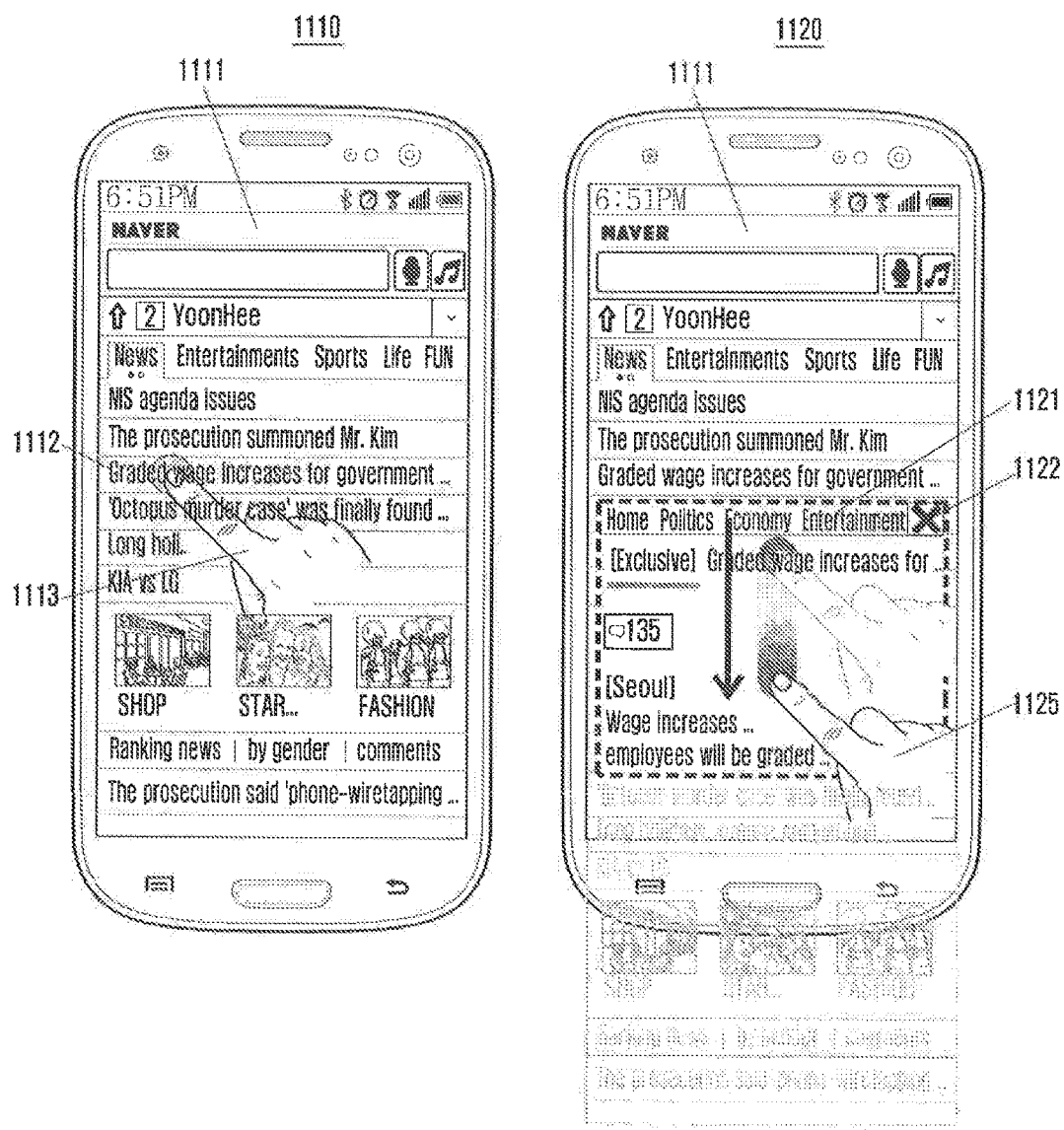
Figure 11B:
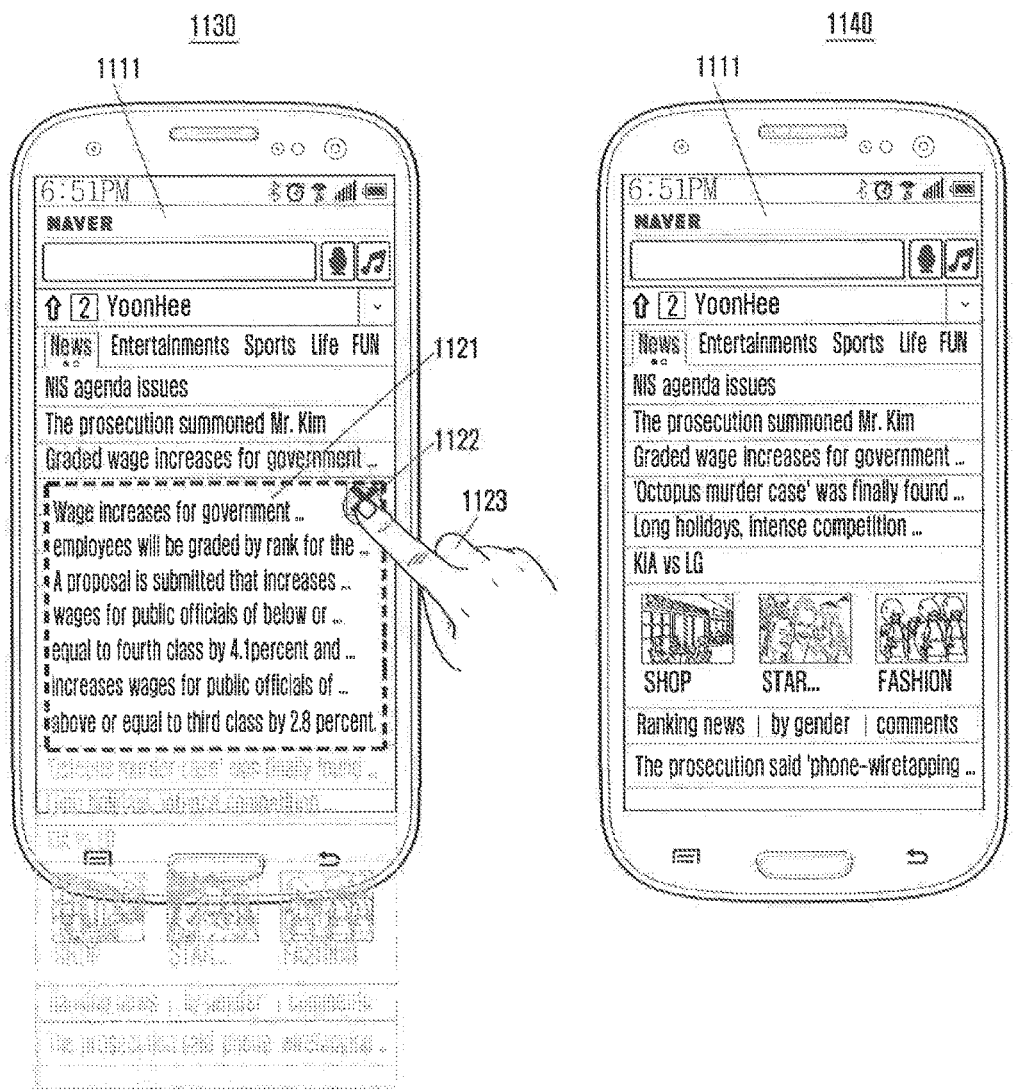

FIGS. 11A and 11B are screen representations for displaying electronic documents linked with link objects according to various embodiments of the present disclosure.

Referring to FIG. 11A, as indicated by indicia 1110, the control unit 200 may display a first electronic document 1111 having at least one link object 1112 on the screen. The control unit 200 may receive an input signal corresponding to a touch gesture 1113 for selecting the link object 1112 on the screen.

In response to the input signal, as indicated by indicia 1120, the control unit 200 may display a second electronic document 1121 linked with the link object so that it is inserted in the first electronic document 1111. The control unit 200 may receive an input signal for moving the second electronic document 1121 on the second electronic document 1121. Here, the input signal may correspond to a user flick gesture 1125 in a direction on the second electronic document 1121 detected by the touch panel 147.

Referring to FIG. 11B, in response to the input signal, as indicated by indicia 1130, the control unit 200 may move the position of the second electronic document 1121 in consideration of the total length of the second electronic document 1121. Here, the second electronic document 1121 may be moved according to the input signal independently of the first electronic document 1111. For example, when the user makes a flick gesture 1125 in a downward direction, the second electronic document 1121 may be moved in a downward direction with respect to the total length thereof. The control unit 200 may receive an input signal for selecting the close button 1122 for closing the second electronic document 1121 displayed on the screen. Here, the input signal may correspond to a user touch gesture 1123 on the close button 1122 detected by the touch panel 147.

In response to the input signal, as indicated by indicia 1140, the control unit 200 may close the second electronic document 1121 being displayed and redisplay the first electronic document 1111.

Figure 12A:
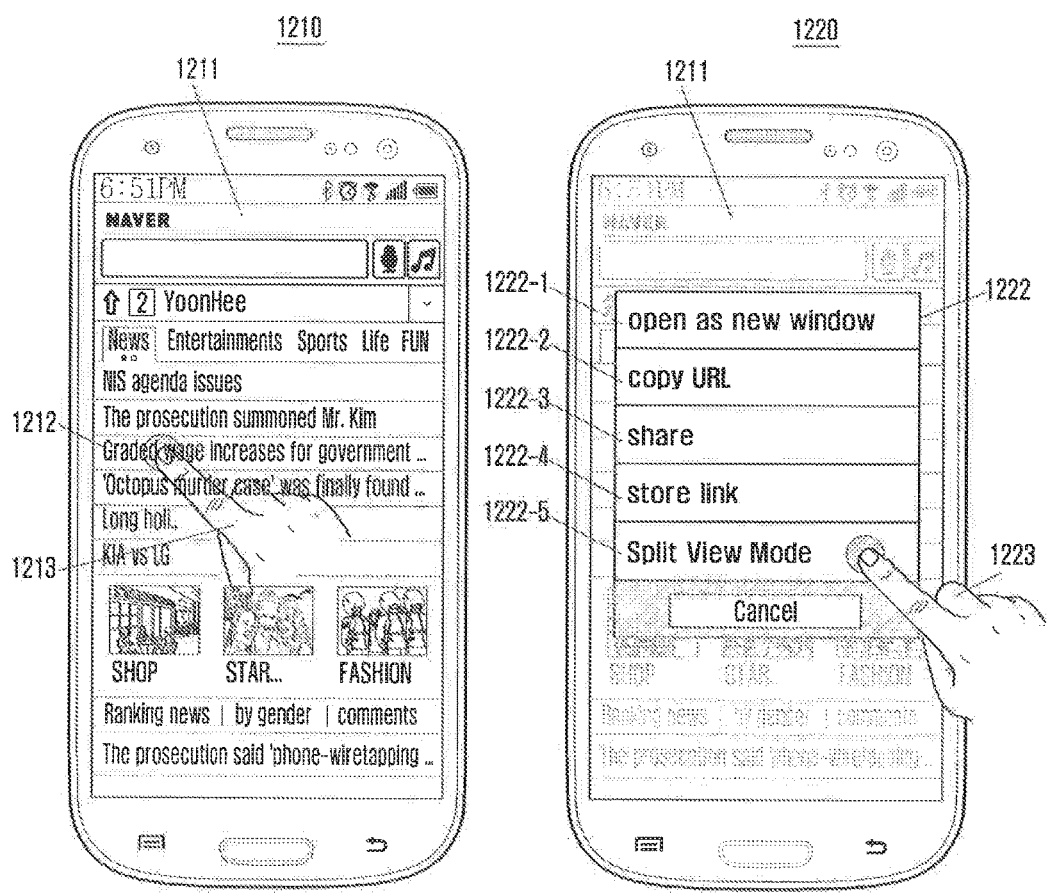
Figure 12B:
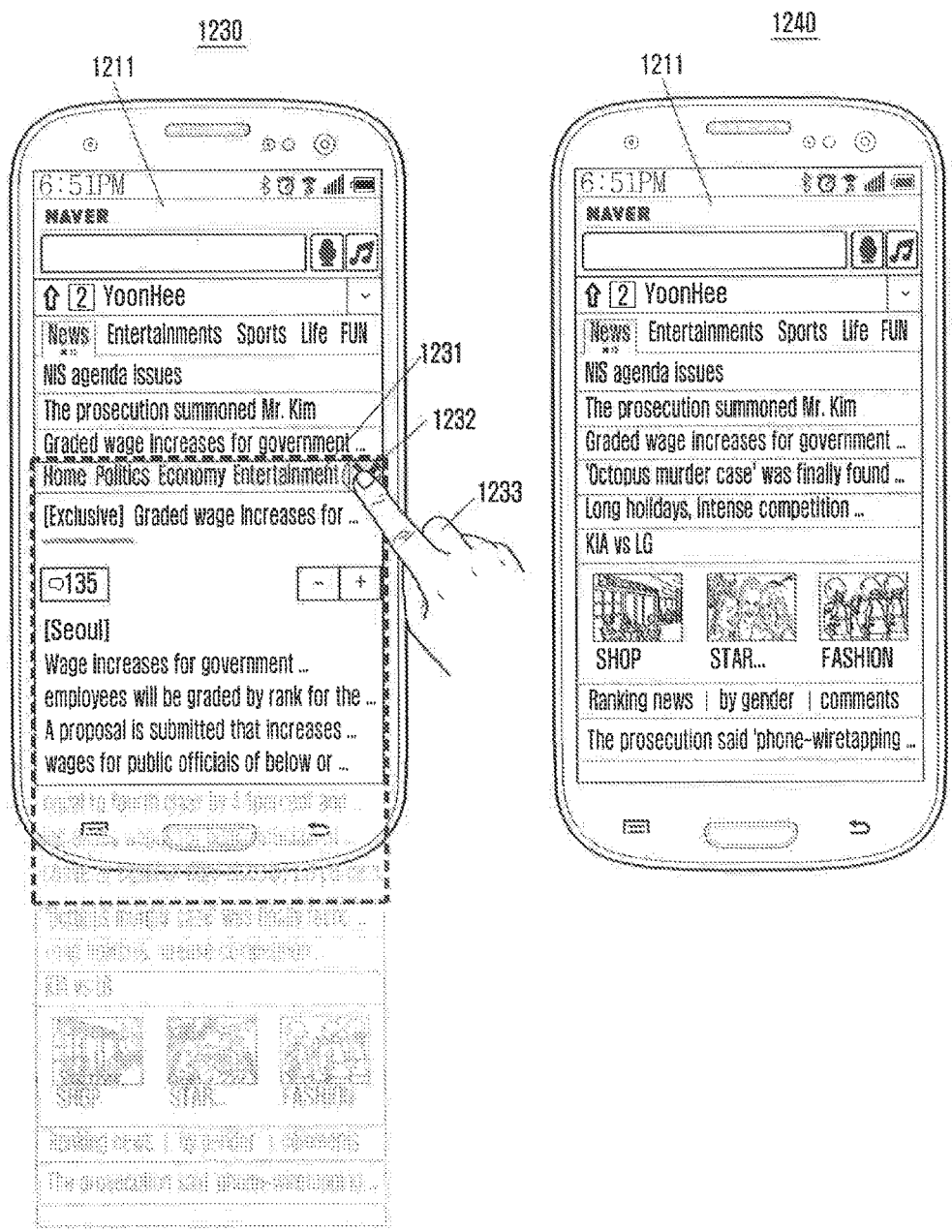

FIGS. 12A and 12B are screen representations for displaying electronic documents linked with link objects according to various embodiments of the present disclosure.

Referring to FIG. 12A, as indicated by indicia 1210, the control unit 200 may display a first electronic document 1211 having at least one link object 1212 on the screen. The control unit 200 may receive an input signal for selecting the link object 1212 on the screen. Here, the input signal may correspond to a user touch gesture 1213 sustained for a while on the link object 1212 detected by the touch panel 147.

In response to the input signal, as indicated by indicia 1220, the control unit 200 may display a menu 1222 for handling a second electronic document linked with the link object. The menu 1222 may include at least one of an item 1222-1 to open a new window for the second electronic document, an item 1222-2 to copy the link address of the link object, an item 1222-3 to share the link address of the link object with a third party, an item 1222-4 to save the link address of the link object, and an item 1222-5 to display the second electronic document in split view mode. In split view mode, as described in connection with FIGS. 6 to 11, the first electronic document and second electronic document may be displayed together on the screen in a manner that the second electronic document is inserted in the first electronic document.

The control unit 200 may receive an input signal for selecting the item 1222-5 causing the second electronic document to be displayed in split view mode from the menu 1222. Here, the input signal may correspond to a user touch gesture 1223 on the item 1222-5 for split view mode detected by the touch panel 147.

Referring to FIG. 12B, in response to the input signal, as indicated by indicia 1230, the control unit 200 may display a second electronic document 1231 linked with the link object so that it is inserted in the first electronic document 1211. The control unit 200 may receive an input signal for selecting the close button 1232 for closing the second electronic document 1231 displayed on the screen. Here, the input signal may correspond to a user touch gesture 1233 on the close button 1232 detected by the touch panel 147.

In response to the input signal, as indicated by indicia 1240, the control unit 200 may close the second electronic document 1231 being displayed and redisplay the first electronic document 1211.

Figure 13A:
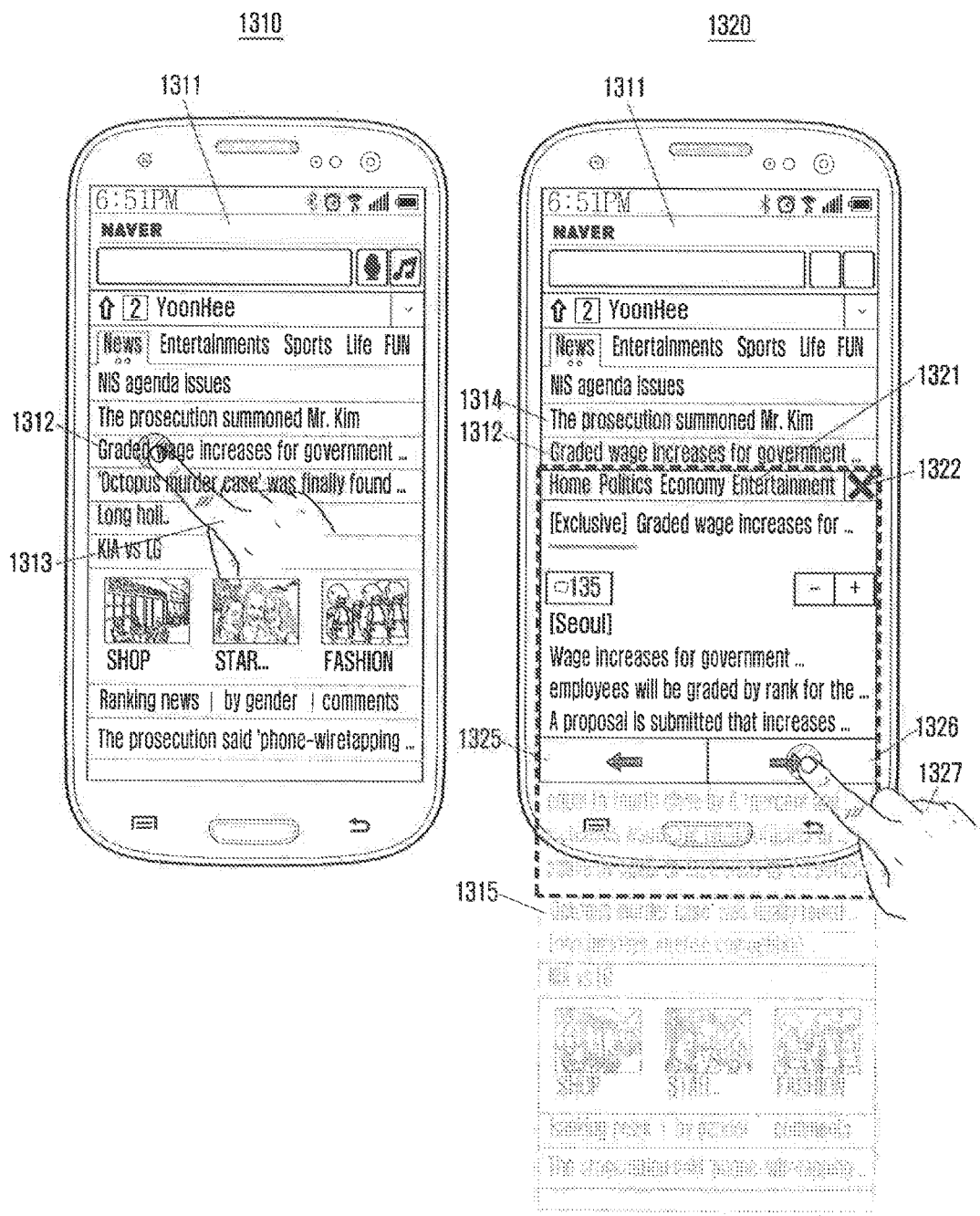
Figure 13B:
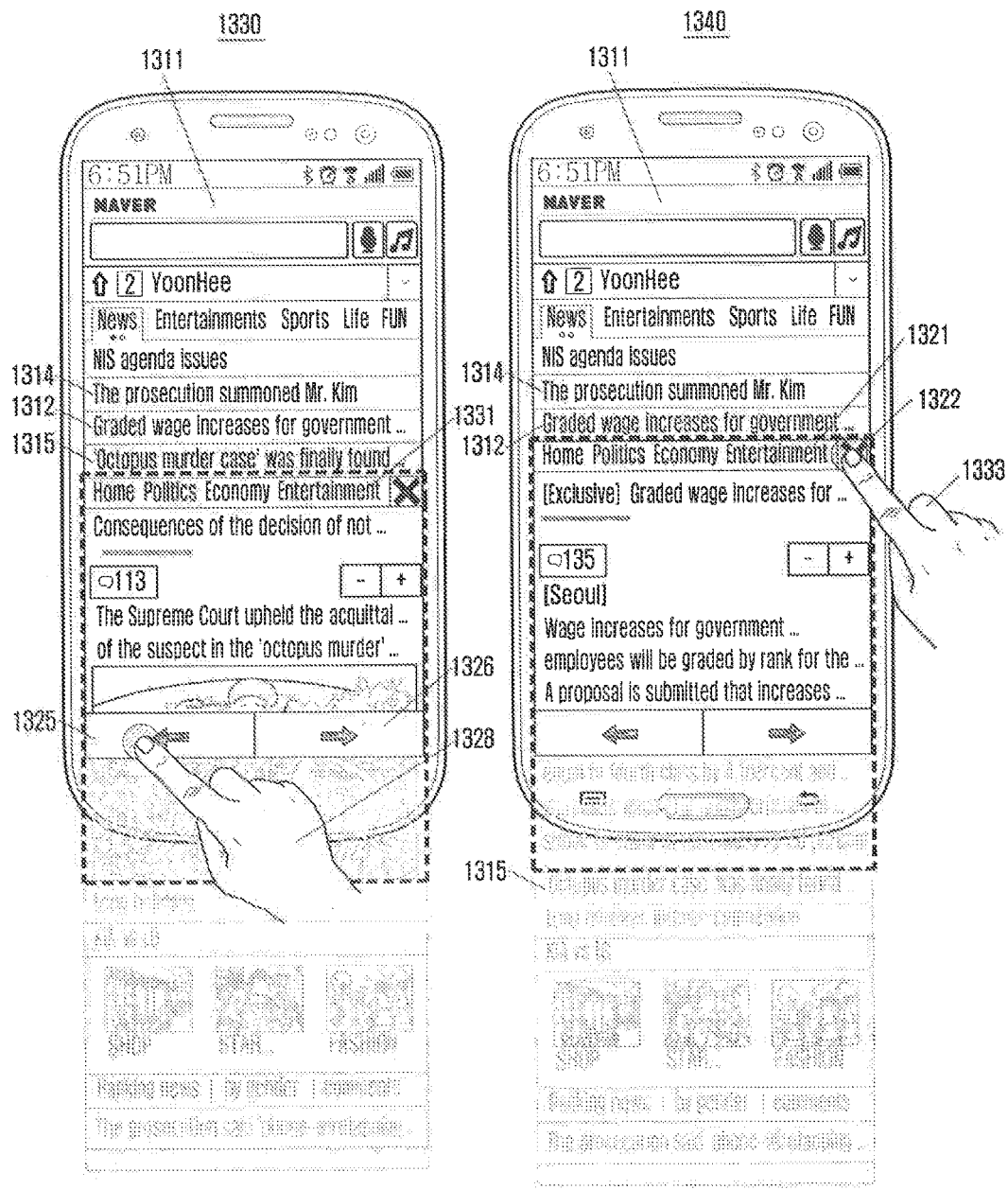
Figure 13C:
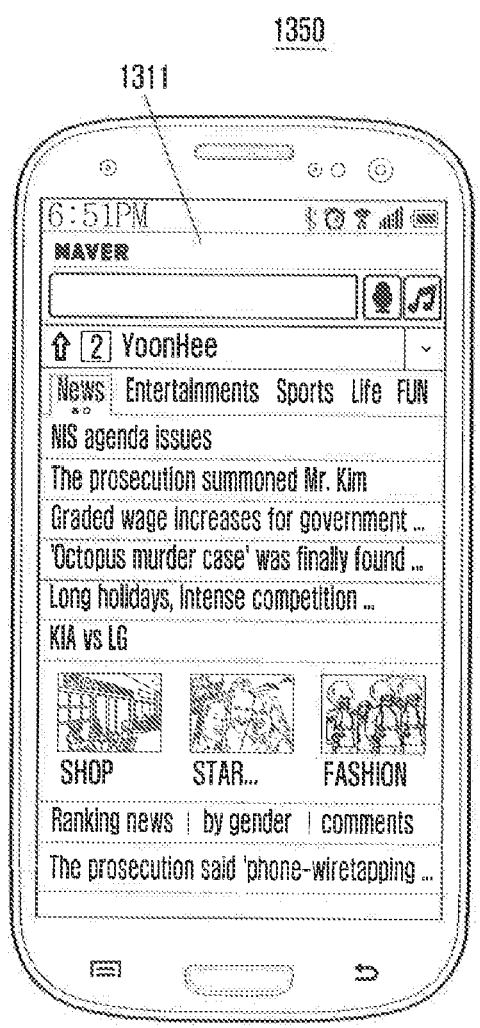

FIGS. 13A to 13C are screen representations for displaying electronic documents linked with link objects according to various embodiments of the present disclosure.

Referring to FIG. 13A, as indicated by indicia 1310, the control unit 200 may display a first electronic document 1311 having at least one link object 1312 on the screen. The control unit 200 may receive an input signal for selecting the link object 1312 on the screen. Here, the input signal may correspond to a user touch gesture 1313 on the link object 1312 detected by the touch panel 147.

In response to the input signal, as indicated by indicia 1320, the control unit 200 may display a second electronic document 1321 linked with the link object 1312 so that it is inserted in the first electronic document 1311. Here, the control unit 200 may display link buttons 1325 and 1326 for displaying electronic documents linked with other link objects 1314 and 1315 contained in the first electronic document 1311. The link buttons 1325 and 1326 may be placed on the second electronic document 1321 or at a lower or other portion of the screen. The link button 1325 represented by '←' is used to display an electronic document linked with a link object 1314 immediately before the selected link object 1312, and the link button 1326 represented by '→' is used to display an electronic document linked with a link object 1315 immediately after the selected link object 1312. When link objects are arranged in an up/down direction, the link button represented by '←' may be associated with a link object immediately above the selected link object, and the link button represented by '→' may be associated with a link object immediately below the selected link object. Similarly, when link objects are arranged in a left/right direction, the link button represented by '←' may be associated with a link object immediately on the left of the selected link object, and the link button represented by '→' may be associated with a link object immediately on the right of the selected link object.

The control unit 200 may receive an input signal selecting the link button 1326 represented by '→'. Here, the input signal may correspond to a user touch gesture 1327 on the link button 1326 represented by '→' detected by the touch panel 147.

In response to the input signal, as indicated by indicia 1330, the control unit 200 may display a third electronic document 1331 linked with a link object 1315 immediately after the link object 1312 so that the third electronic document 1331 is inserted in the first electronic document 1311. Here, the control unit 200 may display the third electronic document 1331 below the corresponding link object 1315. That is, the displayed position of an electronic document may be altered according to the position of a link object linked with the electronic document. Thereafter, the control unit 200 may receive an input signal selecting the link button 1325 represented by '←'. Here, the input signal may correspond to a user touch gesture 1328 on the link button 1325 represented by '←' detected by the touch panel 147.

In response to the input signal, as indicated by indicia 1340, the control unit 200 may redisplay the second electronic document 1321 linked with the link object 1312 immediately before the link object 1315 so that the second electronic document 1321 is inserted in the first electronic document 1311. Here, the control unit 200 may display the second electronic document 1321 below the corresponding link object 1312. In this case, the control unit 200 may skip changing of the layout of the first electronic document 1311 to insert the second electronic document 1321, and return to the state indicated by indicia 1320 by obtaining the first electronic document 1311 with a changed layout and the second electronic document 1321.

The control unit 200 may receive an input signal for selecting the close button 1332 for closing the second electronic document 1321 displayed on the screen. Here, the input signal may correspond to a user touch gesture 1333 on the close button 1322 detected by the touch panel 147.

Referring to FIG. 13C, in response to the input signal, as indicated by indicia 1350, the control unit 200 may close the second electronic document 1321 being displayed and redisplay the first electronic document 1311.

Figure 14A:
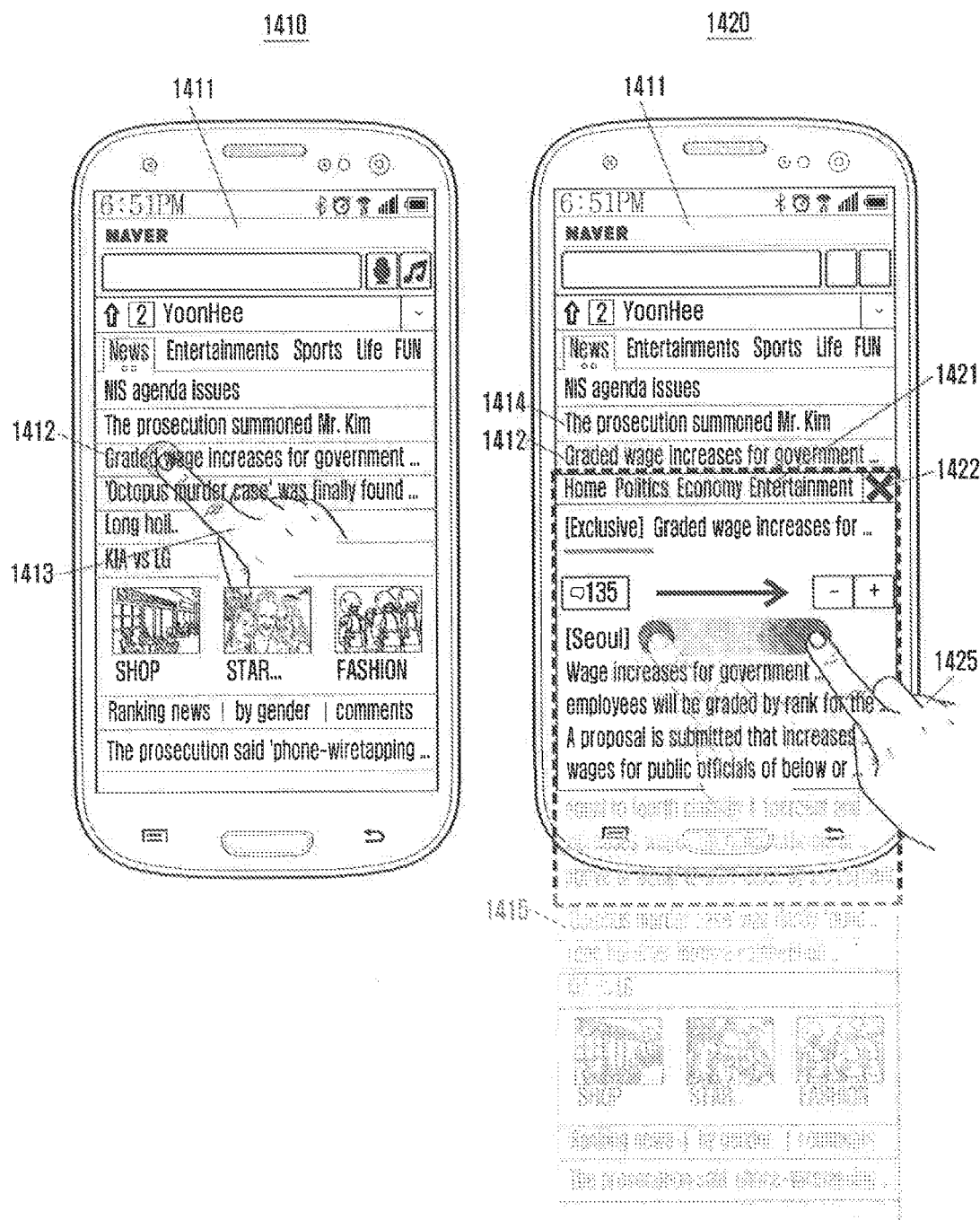
Figure 14B:
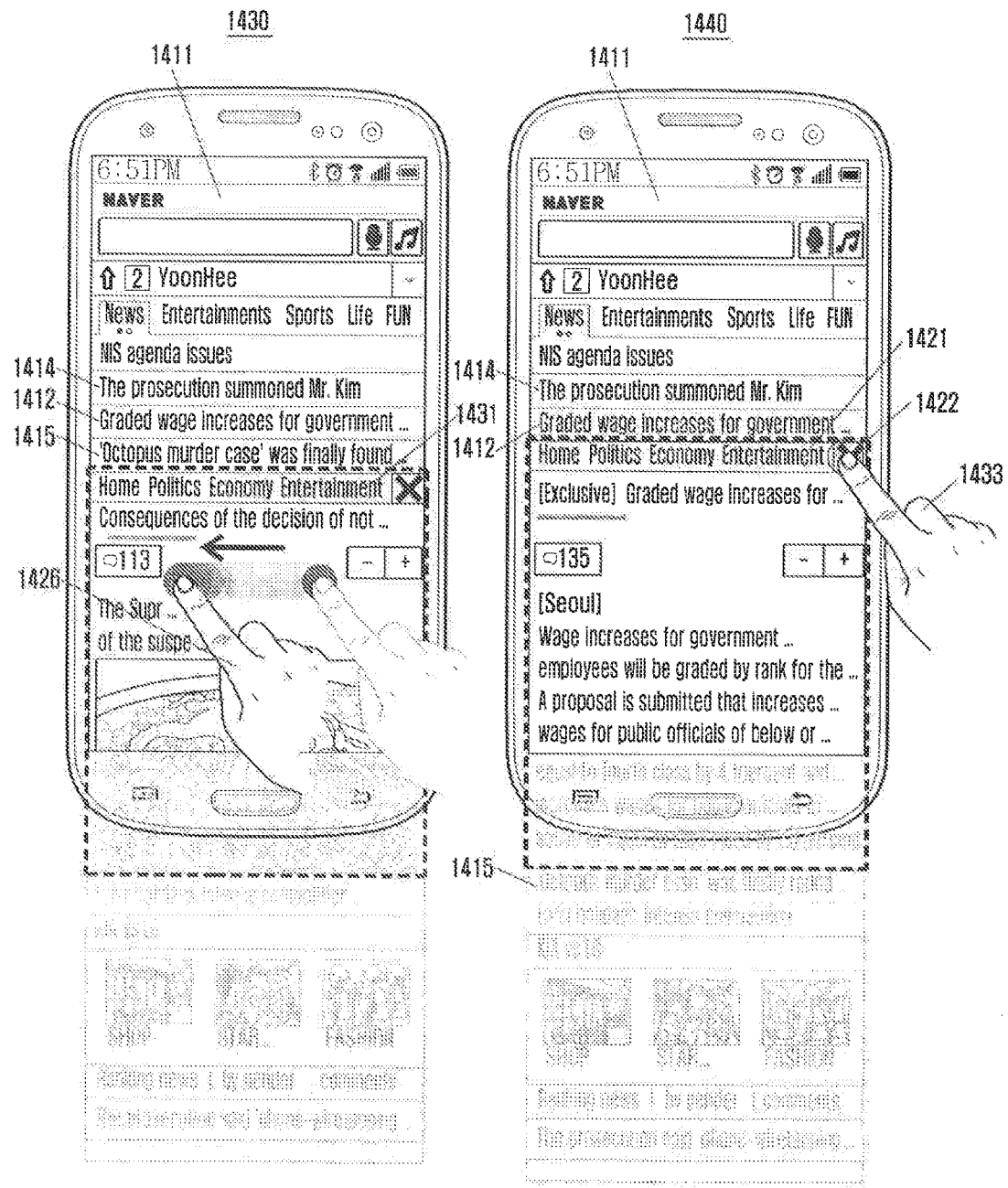
Figure 14C:
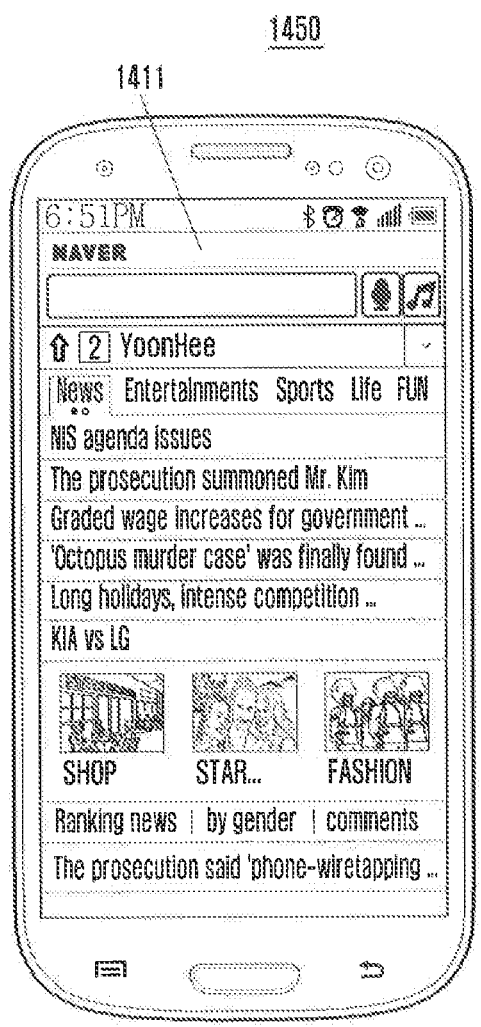

FIGS. 14A to 14C are screen representations for displaying electronic documents linked with link objects according to various embodiments of the present disclosure.

Referring to FIG. 14A, as indicated by indicia 1410, the control unit 200 may display a first electronic document 1411 having at least one link object 1412 on the screen. The control unit 200 may receive an input signal for selecting the link object 1412 on the screen. Here, the input signal may correspond to a user touch gesture 1413 on the link object 1412 detected by the touch panel 147.

In response to the input signal, as indicated by indicia 1420, the control unit 200 may display a second electronic document 1421 linked with the link object 1412 so that the second electronic document 1421 is inserted in the first electronic document 1411. The control unit 200 may receive an input signal on the second electronic document 1421 for displaying an electronic document linked with another link object. Here, the input signal may correspond to a user flick gesture 1425 in a direction detected by the touch panel 147. For example, when the user makes a flick gesture 1425 in a right direction, the control unit 200 may display an electronic document linked with a link object 1415 immediately after the link object 1412. When the user makes a flick gesture 1425 in a left direction, the control unit 200 may display an electronic document linked with a link object 1414 immediately before the link object 1412. In the state indicated by indicia 1420, the control unit 200 may receive an input signal on the second electronic document 1421 for displaying an electronic document linked with a link object 1415 immediately after the link object 1412. Here, the input signal may correspond to a user flick gesture 1425 in a right direction detected by the touch panel 147.

Referring to FIG. 14B, in response to the input signal, indicated by indicia 1430, the control unit 200 may display a third electronic document 1431 linked with a link object 1415 immediately after the link object 1412 so that the third electronic document 1431 is inserted in the first electronic document 1411. The control unit 200 may receive an input signal on the third electronic document 1431 for displaying an electronic document linked with a link object 1414 immediately before the link object 1412. Here, the input signal may correspond to a user flick gesture 1426 in a left direction detected by the touch panel 147.

In response to the input signal, as indicated by indicia 1440, the control unit 200 may redisplay the second electronic document 1421 linked with the link object 1412 immediately before the link object 1415 so that the second electronic document 1421 is inserted in the first electronic document 1411. The control unit 200 may receive an input signal for selecting the close button 1422 for closing the second electronic document 1421 displayed on the screen. Here, the input signal may correspond to a user touch gesture 1433 on the close button 1422 detected by the touch panel 147.

Referring to FIG. 14C, in response to the input signal, as indicated by indicia 1450, the control unit 200 may close the second electronic document 1421 being displayed and redisplay the first electronic document 1411.

Figure 15A:
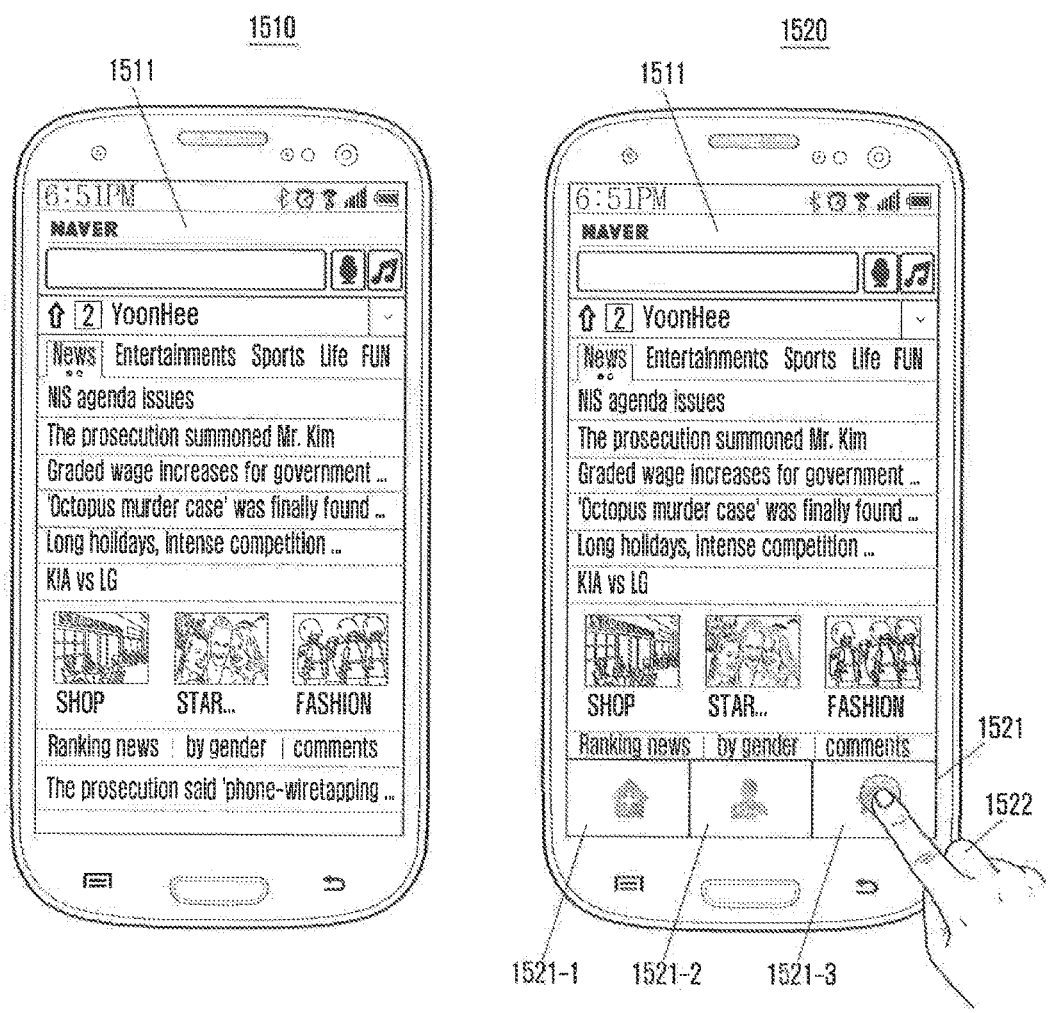
Figure 15B:
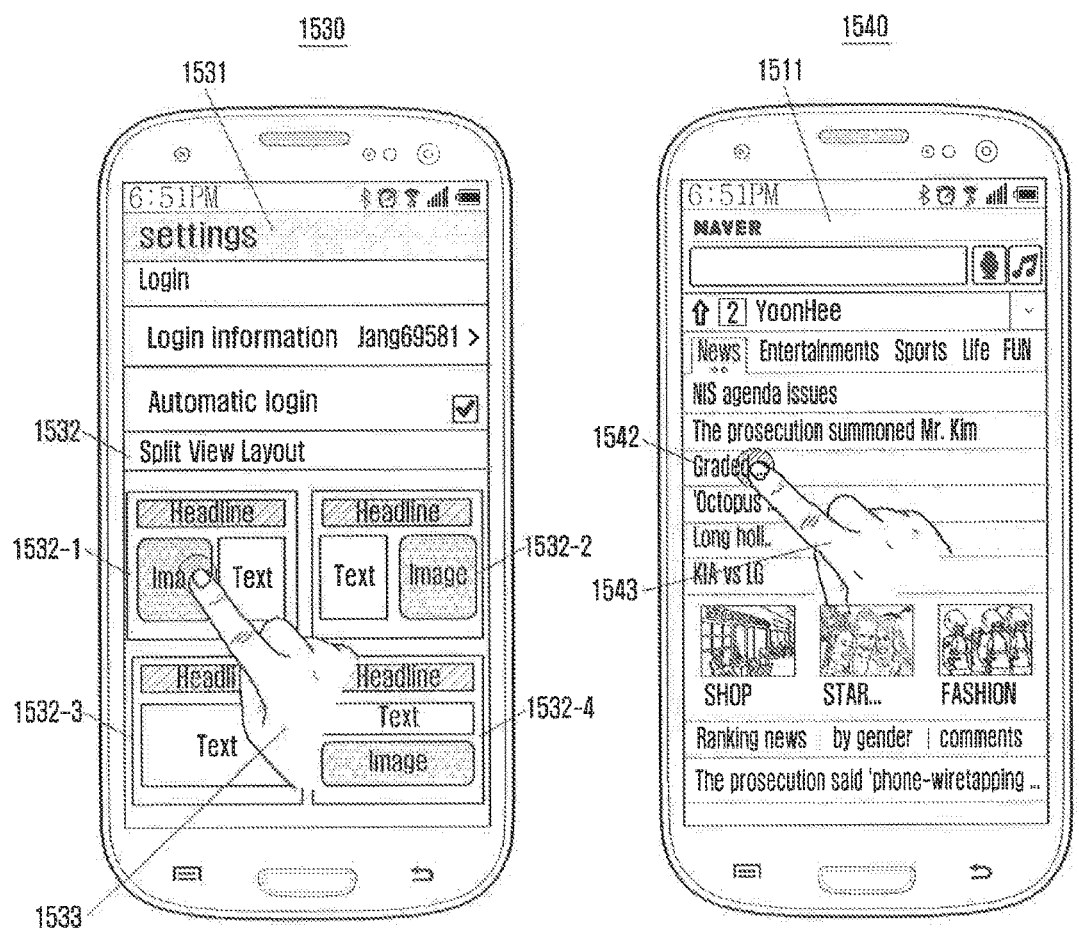
Figure 15C:
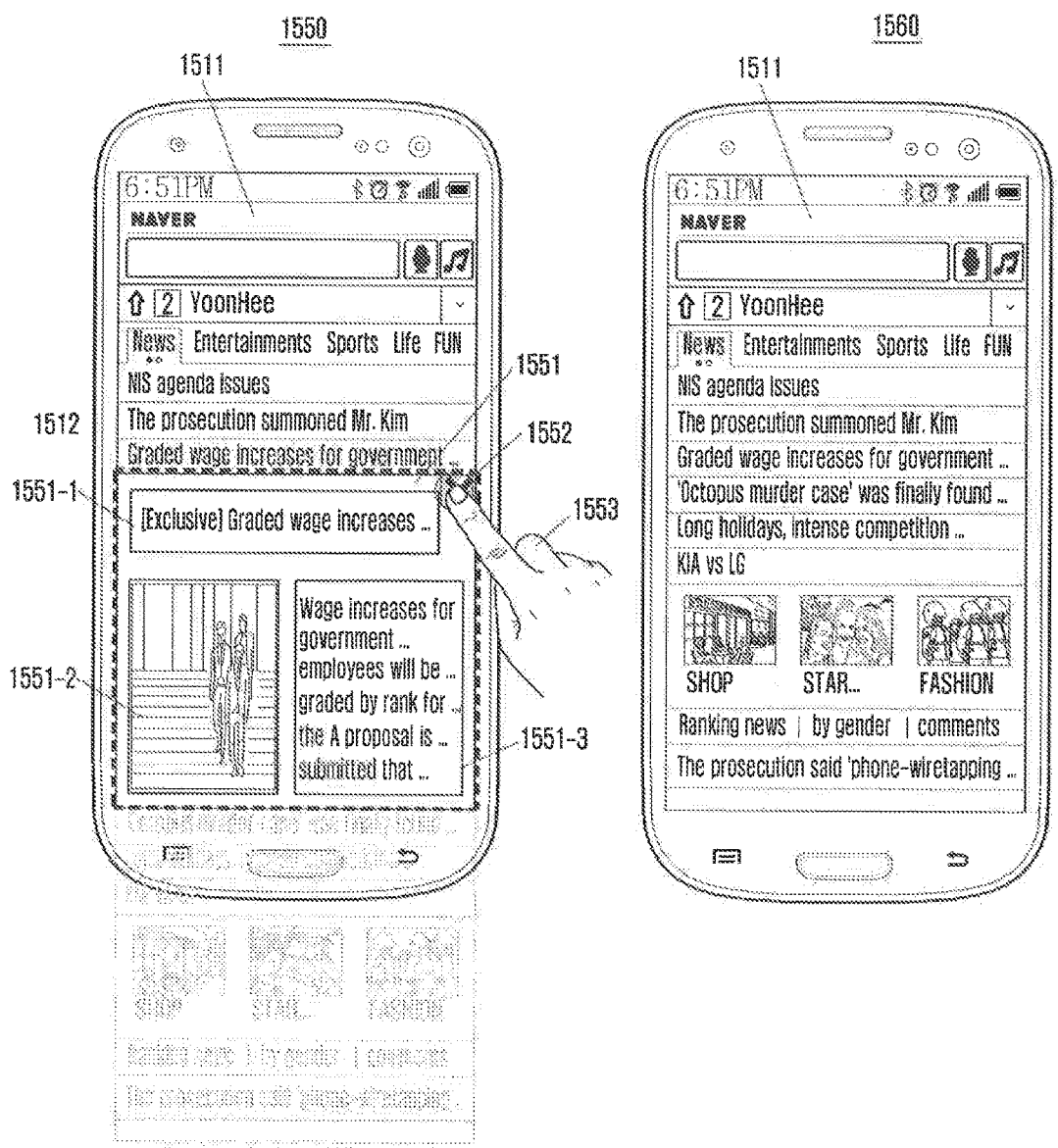

FIGS. 15A to 15C are screen representations for determining layouts of electronic documents linked with link objects according to various embodiments of the present disclosure.

Referring to FIG. 15A, as indicated by indicia 1510, the control unit 200 may display a first electronic document 1511 having at least one link object on the screen. The control unit 200 may receive an input signal for invoking a document management menu. Here, the input signal may correspond to a user gesture, such as touching a touch pad, pressing the home button for a given time or more, or flicking in an upward direction.

In response to the input signal, as indicated by indicia 1520, the control unit 200 may display a document management menu 1521 on the screen. For example, in the case of a structured electronic document such as a webpage obtained from a server, the document management menu 1521 may include a home item 1521-1 to transfer to the home screen provided by the server, a logout item 1521-2 to log out from the server, and a settings item 1521-3 to configure settings for access to the server and display of electronic documents. The control unit 200 may receive an input signal for selecting the settings item 1521-3. Here, the input signal may correspond to a user touch gesture 1522 on the settings item 1521-3 detected by the touch panel 147.

Referring to FIG. 15B, in response to the input signal, as indicated by indicia 1530, the control unit 200 may display a settings window 1531 including one or more layouts 1532-1, 1532-2, 1532-3 and 1532-4 pertaining to a split view mode layout 1532. The layouts 1532-1, 1532-2, 1532-3 and 1532-4 may each include at least one of a headline region, an image region, a text region, and a moving image region. These regions may be arranged in various ways in the individual layouts 1532-1, 1532-2, 1532-3 and 1532-4. For example, the layout 1532-1 may be composed of an image region (left) and a text region (right). The layout 1532-2 may be composed of a text region (left) and an image region (right). The layout 1532-3 may be composed of a text region only. The layout 1532-4 may be composed of a text region (upper) and an image region (lower). The control unit 200 may receive an input signal for selecting the layout 1532-1 as the display layout of a second electronic document among the multiple layouts 1532-1, 1532-2, 1532-3 and 1532-4. Here, the input signal may correspond to a user touch gesture 1533 on the layout 1532-1 detected by the touch panel 147.

In response to the input signal, as indicated by indicia 1540, the control unit 200 may close the settings window 1531 and redisplay the first electronic document 1511 having at least one link object 1542 on the screen. The control unit 200 may receive an input signal for selecting the link object 1542 on the screen. Here, the input signal may correspond to a user touch gesture 1543 on the link object 1542 detected by the touch panel 147.

Referring to FIG. 15C, in response to the input signal, as indicated by indicia 1550, the control unit 200 may display a second electronic document 1551 linked with the link object 1542 so that the second electronic document 1551 is inserted in the first electronic document 1511. Here, the second electronic document 1551 may be displayed according to the layout (layout 1532-1) selected in the state indicated by indicia 1530. For example, the title of the second electronic document 1551 may be displayed in the headline region 1551-1; at least one image thereof may be displayed in the image region 1551-2; and the text thereof may be displayed in the text region 1551-3. The control unit 200 may receive an input signal for selecting the close button 1552 for closing the second electronic document 1551 displayed on the screen. Here, the input signal may correspond to a user touch gesture 1553 on the close button 1552 detected by the touch panel 147.

In response to the input signal, as indicated by indicia 1560, the control unit 200 may close the second electronic document 1551 being displayed and redisplay the first electronic document 1511.

Figure 16A:
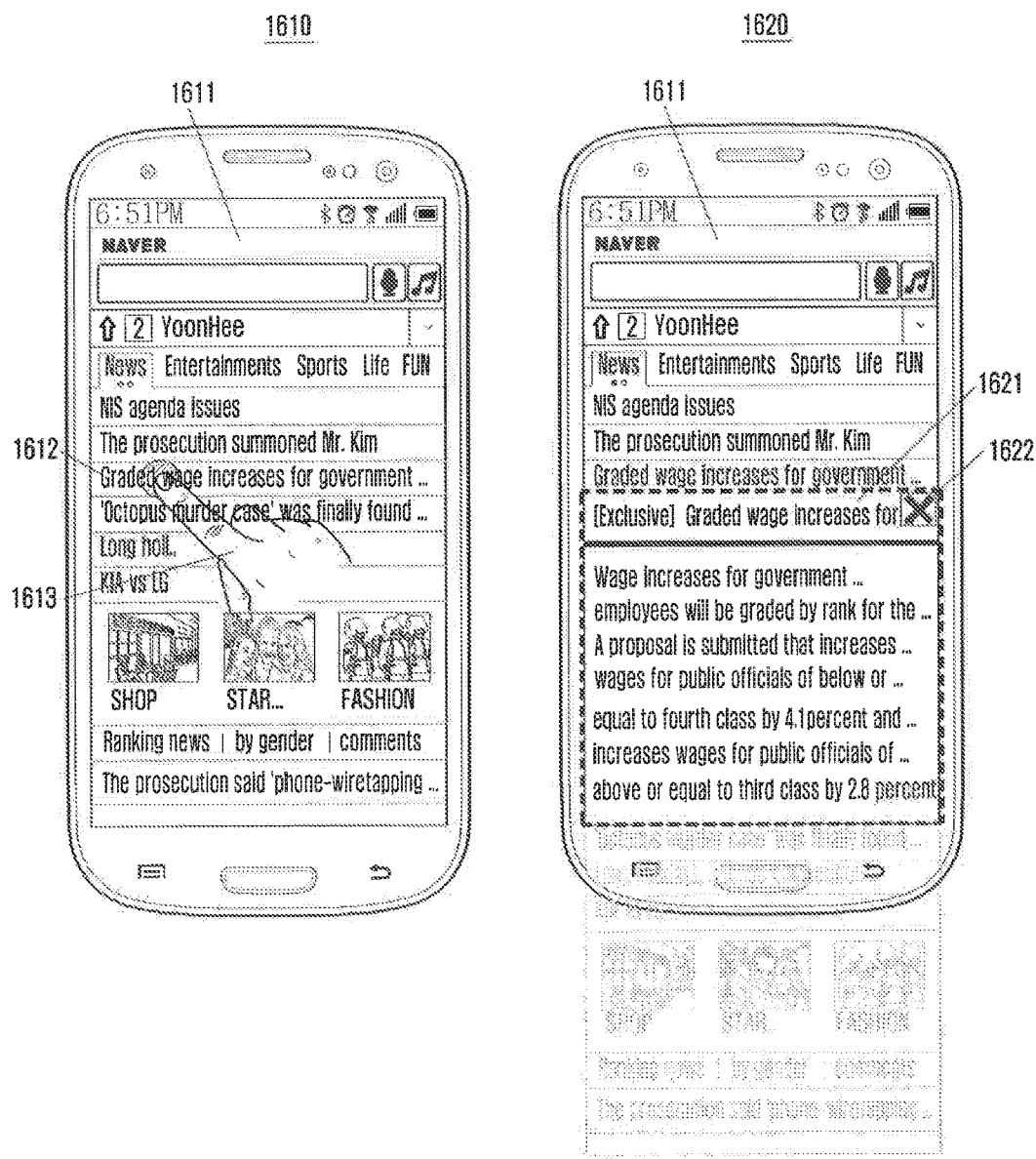
Figure 16B:
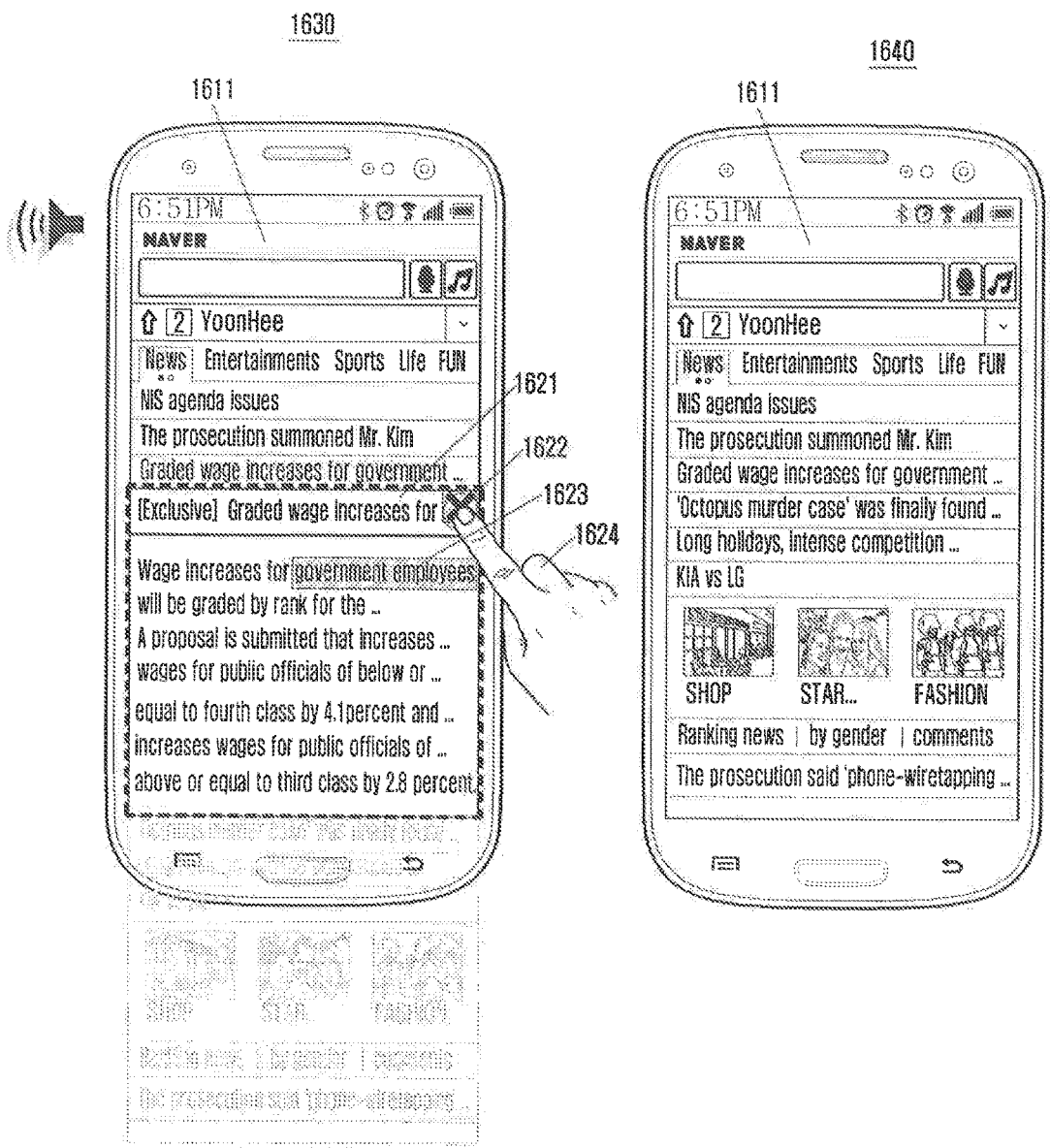

FIGS. 16A and 16B are screen representations for displaying electronic documents linked with link objects according to various embodiments of the present disclosure.

Referring to FIG. 16A, as indicated by indicia 1610, the control unit 200 may display a first electronic document 1611 having at least one link object 1612 on the screen. The control unit 200 may receive an input signal for selecting the link object 1612 on the screen. Here, the input signal may correspond to a user touch gesture 1613 on the link object 1612 detected by the touch panel 147.

In response to the input signal, indicated by indicia 1620, the control unit 200 may display a second electronic document 1621 linked with the link object 1612 so that the second electronic document 1621 is inserted in the first electronic document 1611. In this case, the control unit 200 may determine whether the second electronic document 1621 supports reading mode. If the second electronic document 1621 supports reading mode and display for reading mode is set in advance, the control unit 200 may arrange the text of the second electronic document 1621 on the screen using a layout suitable for reading mode. For example, the control unit 200 may display the second electronic document 1621 so that the text thereof is focused for readability with the exclusion of an advertisement, image or moving image. Here, the background color and text color may be selected so that the text is easy to read.

Referring to FIG. 16B, when the electronic device 100 supports speech output, as indicated by indicia 1630, the control unit 200 may output the text of the second electronic document 1621 as speech sound through text-to-speech conversion. Here, a highlight 1623 may be placed on a word or sentence being output so that the word or sentence being output may be visually distinguished from other words or sentences. The control unit 200 may receive an input signal for selecting the close button 1622 for closing the second electronic document 1621 displayed on the screen. Here, the input signal may correspond to a user touch gesture 1624 on the close button 1622 detected by the touch panel 147.

In response to the input signal, as indicated by indicia 1640, the control unit 200 may close the second electronic document 1621 being displayed and redisplay the first electronic document 1611.

Figure 17A:
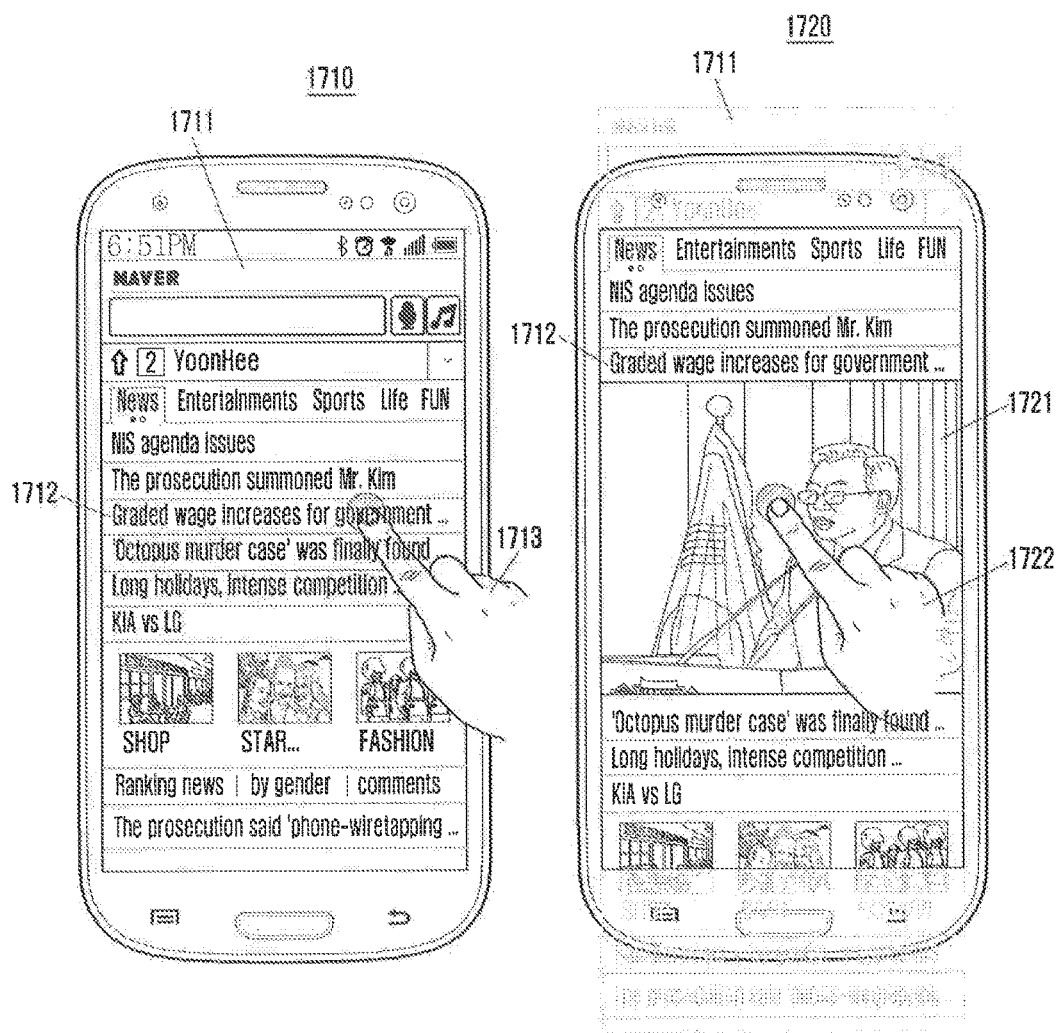
Figure 17B:
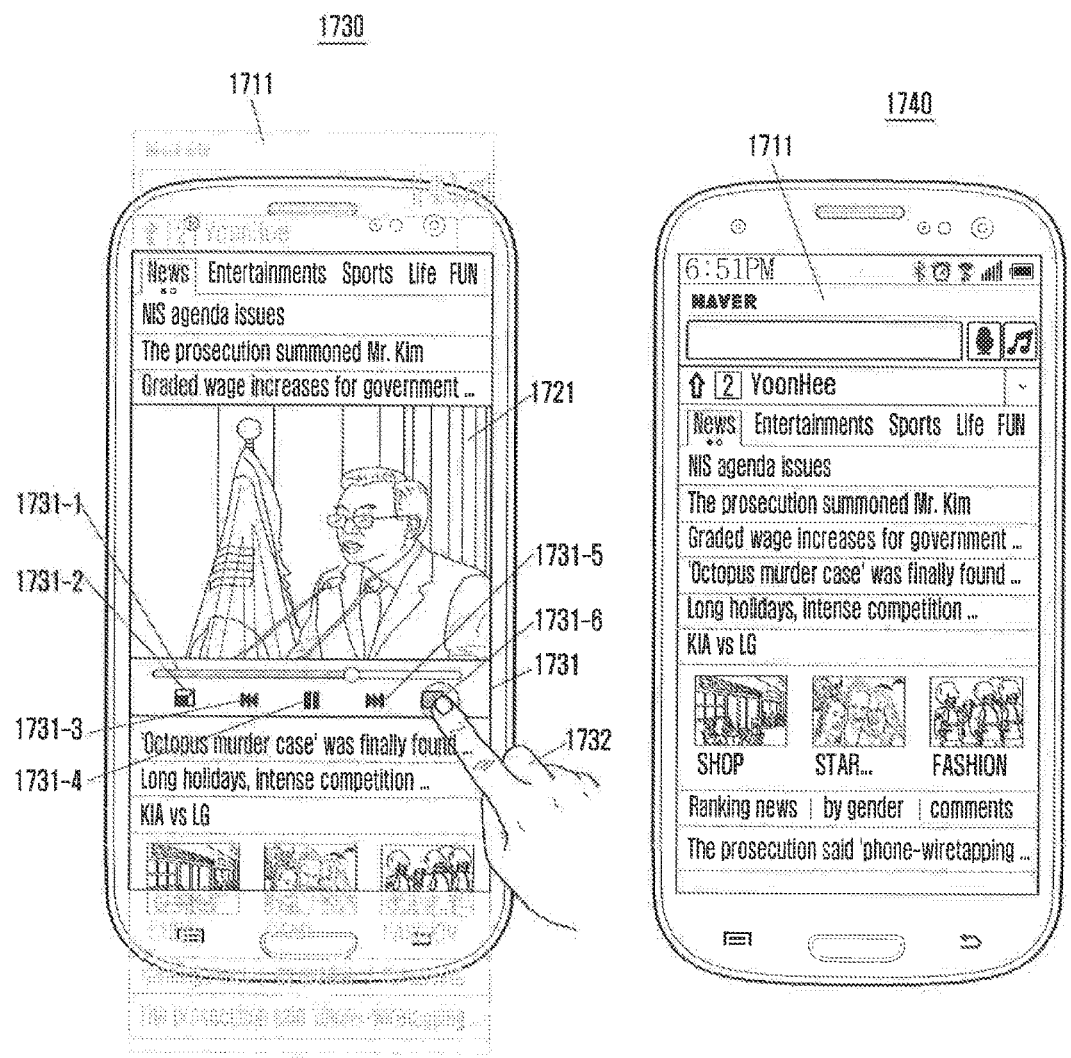

FIGS. 17A and 17B are screen representations for displaying electronic documents linked with link objects according to various embodiments of the present disclosure.

Referring to FIG. 17A, as indicated by indicia 1710, the control unit 200 may display a first electronic document 1711 having at least one link object 1712 on the screen. The control unit 200 may receive an input signal for selecting the link object 1712 on the screen. Here, the input signal may correspond to a user touch gesture 1713 on the link object 1712 detected by the touch panel 147.

In response to the input signal, as indicated by indicia 1720, the control unit 200 may display content 1721 linked with the link object 1712 so that the content 1721 is inserted in the first electronic document 1711. The content 1721 may be resized according to the screen size. The content 1721 may be placed below the corresponding link object 1712 of the first electronic document 1711. When the content 1721 is a moving image, it may be automatically played back. When the content 1721 is an image, it may be resized according to the screen size and displayed on the screen. When the content 1721 is audio data, it may be automatically output through the speaker 160. When the content 1721 is a result of an application running on the electronic device 100 or on an external device, the content 1721 may be inserted in the first electronic document 1711 and displayed. In the event that the content 1721 is a moving image, the control unit 200 may receive an input signal for selecting the moving image 1721 on the screen. Here, the input signal may correspond to a user touch gesture 1722 on the moving image 1721 detected by the touch panel 147.

Referring to FIG. 17B, in response to the input signal, as indicated by indicia 1730, the control unit 200 may display a control menu 1731 for controlling the moving image 1721 so that the control menu 1731 is inserted in the first electronic document 1711. For example, the control menu 1731 may include at least one of a progress bar 1731-1 indicating the progress of playback, an enlargement button 1731-2 for full screen display, a backward button 1731-3 for backward navigation, a pause button 1731-4 for pausing playback, a forward button 1731-5 for forward navigation, and a stop button 1731-6 for stopping playback. During playback of the moving image 1721, the control unit 200 may receive an input signal for selecting the stop button 1731-6 to stop playback. Here, the input signal may correspond to a user touch gesture 1732 on the stop button 1731-6 detected by the touch panel 147.

In response to the input signal, as indicated by indicia 1740, the control unit 200 may close the content 1721 being displayed and redisplay the first electronic document 1711.

Figure 18A:
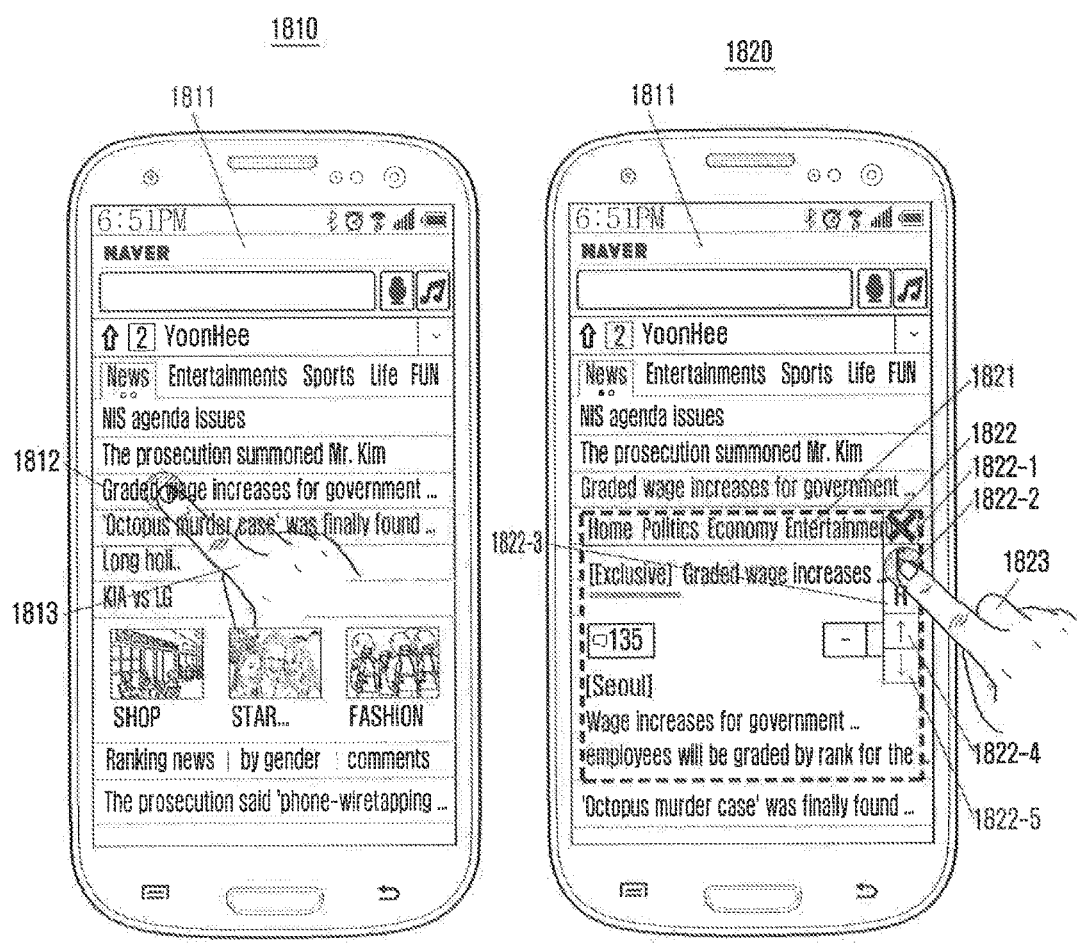
Figure 18B:
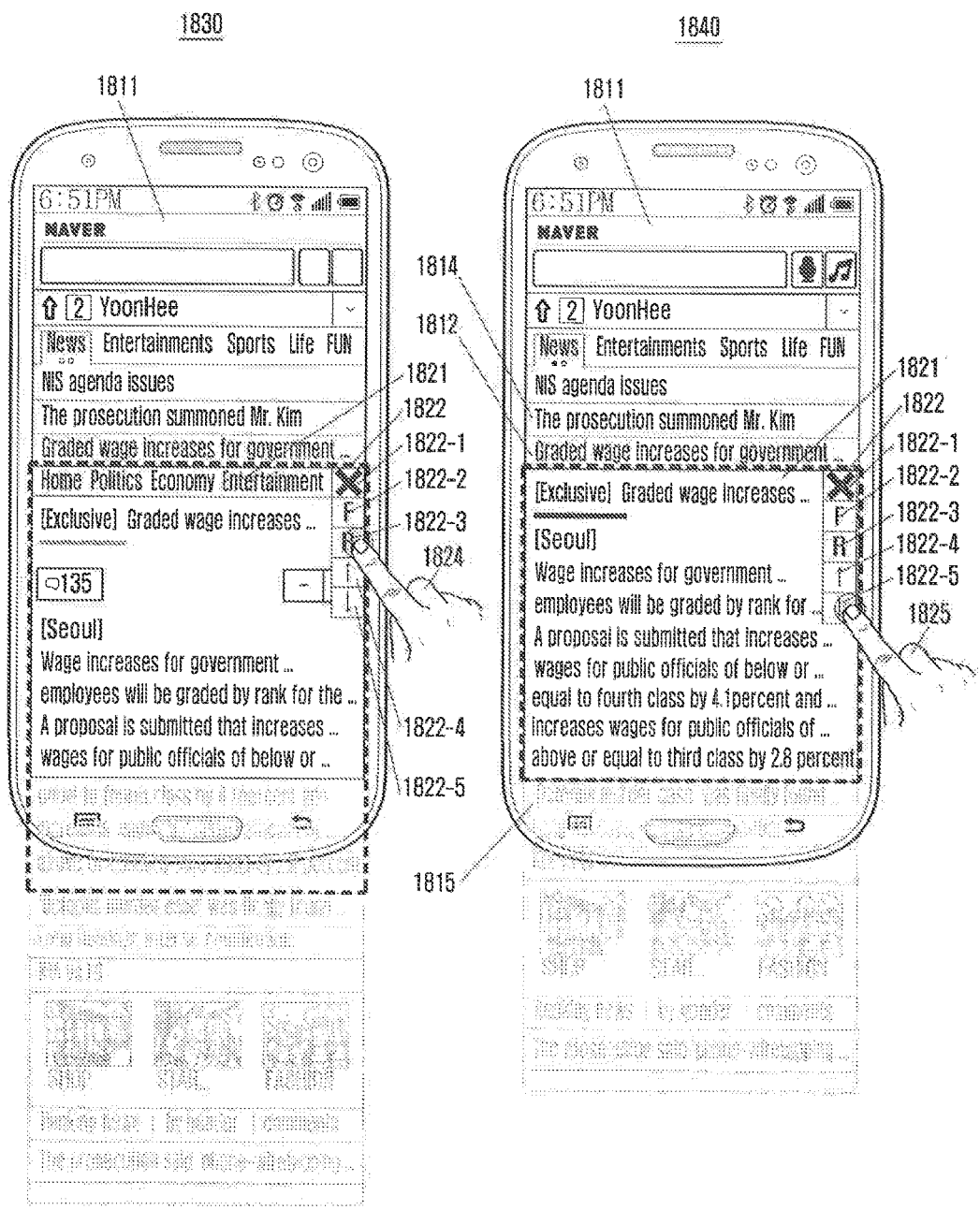
Figure 18C:
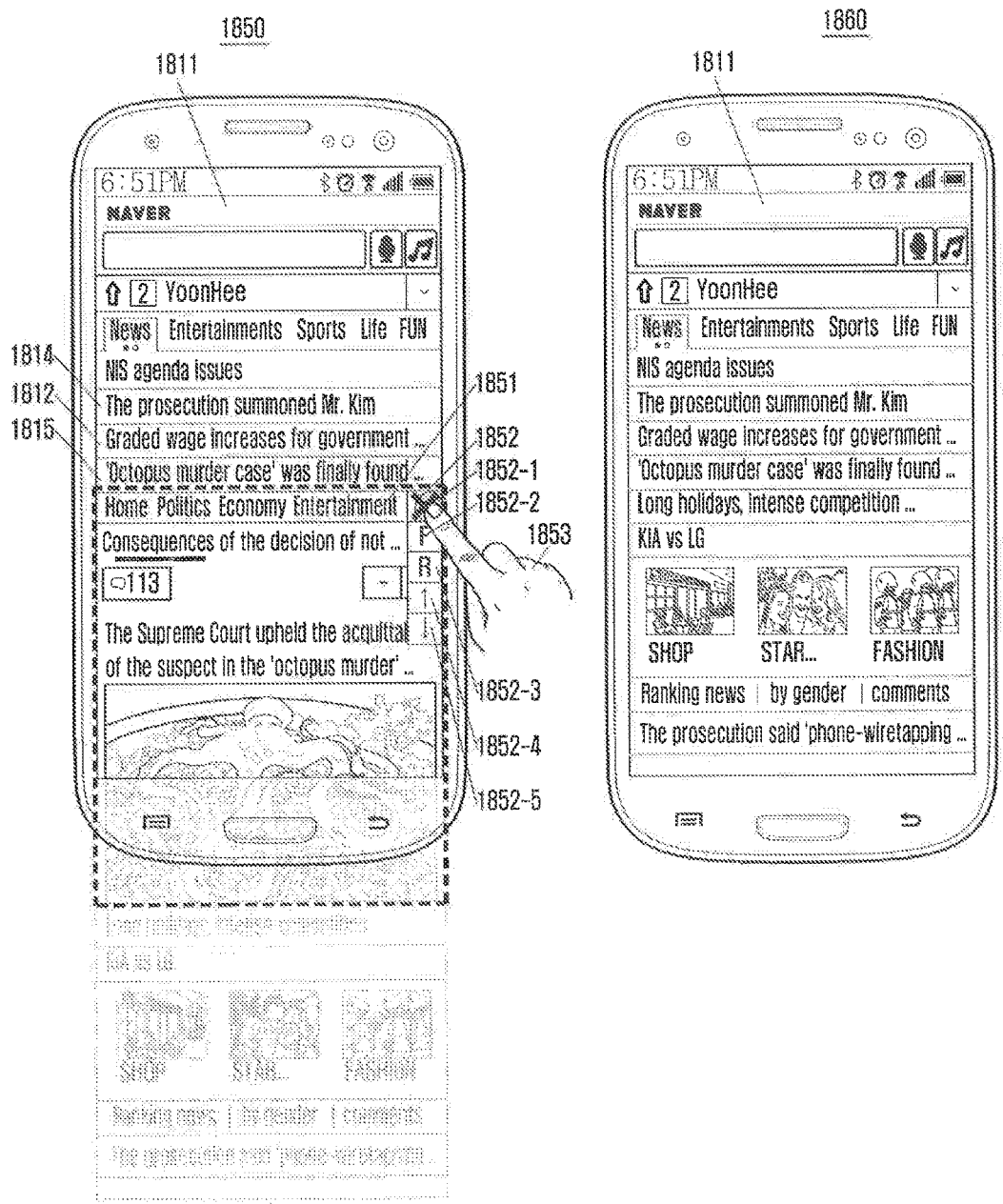

FIGS. 18A to 18C are screen representations for displaying electronic documents linked with link objects according to various embodiments of the present disclosure.

Referring to FIG. 18A, as indicated by indicia 1810, the control unit 200 may display a first electronic document 1811 having at least one link object 1812 on the screen. The control unit 200 may receive an input signal for selecting the link object 1812 on the screen. Here, the input signal may correspond to a user touch gesture 1813 on the link object 1812 detected by the touch panel 147.

In response to the input signal, as indicated by indicia 1820, the control unit 200 may display a second electronic document 1821 linked with the link object 1812 so that the second electronic document 1821 is inserted in the first electronic document 1811. Here, the second electronic document 1821 may be partially inserted in the first electronic document 1811 on the screen. In this case, a document control menu 1822 enabling the second electronic document to be controlled may be displayed on the second electronic document 1821 or in a region of the screen. The document control menu 1822 may include at least one of a close button 1822-1 to close the electronic document, a full-size button 1822-2 to display the second electronic document in full on the first electronic document, a reading mode button 1822-3 to display the second electronic document in a layout suitable for reading, a previous link button 1822-4 to display an electronic document linked with a link object immediately before the selected link object 1812, and a next link button 1822-5 to display an electronic document linked with a link object immediately after the selected link object 1812. The control unit 200 may receive an input signal for selecting the full-size button 1822-2 causing the second electronic document 1821 to be displayed in whole. Here, the input signal may correspond to a user touch gesture 1823 on the full-size button 1822-2 detected by the touch panel 147.

Referring to FIG. 18B, in response to the input signal, as indicated by indicia 1830, the control unit 200 may display the second electronic document 1821 in whole so that the second electronic document 1821 is inserted in the first electronic document 1811. Here, when the total height of the first electronic document 1811 and second electronic document 1821 is greater than the screen height, the second electronic document 1821 may be displayed in part on the screen.

The control unit 200 may receive an input signal for selecting the reading mode button 1822-3 to display the second electronic document 1821 in a layout suitable for reading. Here, the input signal may correspond to a user touch gesture 1824 on the reading mode button 1822-3 detected by the touch panel 147.

In response to the input signal, as indicated by indicia 1840, the control unit 200 may display the second electronic document 1821 in a layout suitable for reading so that the second electronic document 1821 is inserted in the first electronic document 1811. For example, the control unit 200 may arrange the text of the second electronic document 1821 in a layout suitable for reading on the screen.

The control unit 200 may receive an input signal for selecting the next link button 1822-5 to display an electronic document linked with a link object immediately after the selected link object 1812. Here, the input signal may correspond to a user touch gesture 1825 on the next link button 1822-5 detected by the touch panel 147.

Referring to FIG. 18C, in response to the input signal, as indicated by indicia 1850, the control unit 200 may display a third electronic document 1851 linked with a link object 1815 immediately after the link object 1812 so that the third electronic document 1851 is inserted in the first electronic document 1811. Here, a document control menu 1852 enabling the electronic document to be controlled may be displayed on the third electronic document 1851 or in a region of the screen. The document control menu 1852 may include at least one of a close button 1852-1, a full-size button 1852-2, a reading mode button 1852-3, a previous link button 1852-4, and a next link button 1852-5. The control unit 200 may receive an input signal for selecting the close button 1852-1 for closing the third electronic document 1851 displayed on the screen. Here, the input signal may correspond to a user touch gesture 1853 on the close button 1852-1 detected by the touch panel 147.

In response to the input signal, as indicated by indicia 1860, the control unit 200 may close the third electronic document 1851 being displayed and redisplay the first electronic document 1811.

Figure 19:
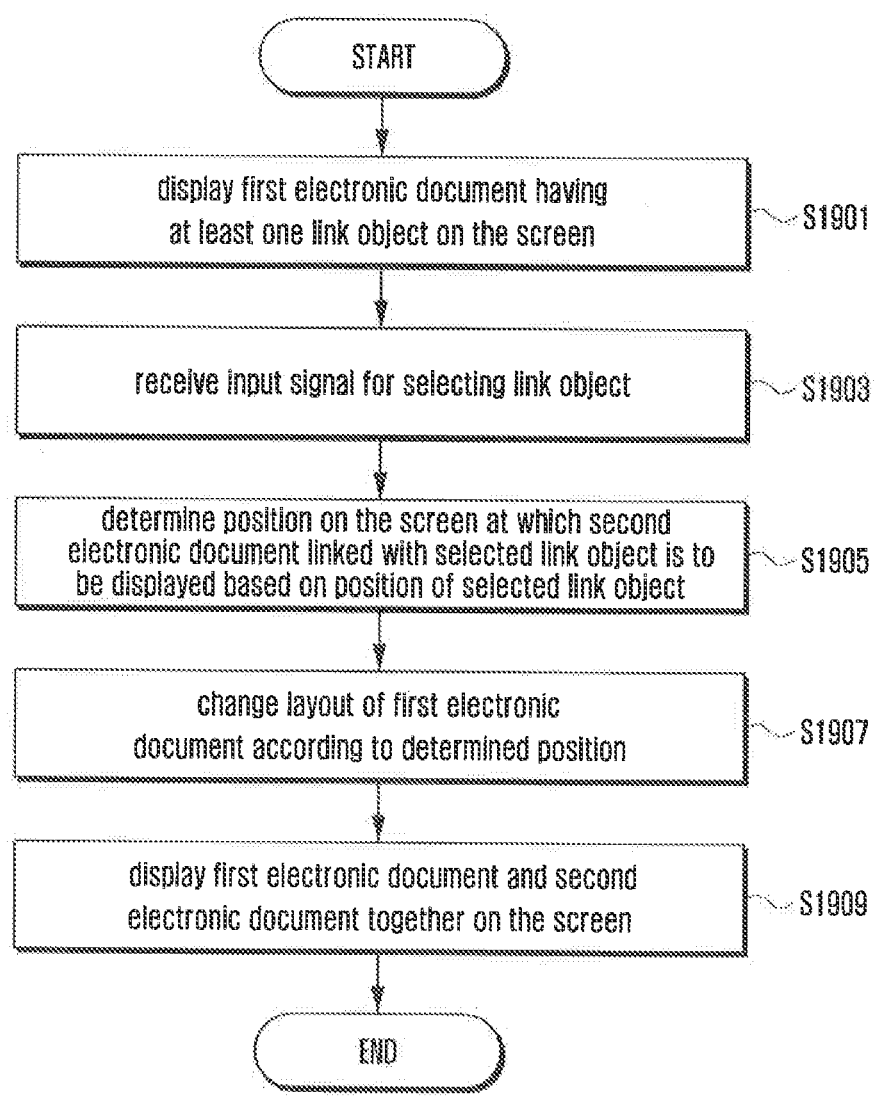
FIGS. 19 and 20 are flowcharts of a procedure for displaying electronic documents linked with link objects according to various embodiments of the present disclosure.

FIG. 19 is a flowchart of a procedure for displaying electronic documents linked with link objects according to an embodiment of the present disclosure.

Referring to FIG. 19, at operation 1901, the electronic device 100 displays a first electronic document having at least one link object on the screen. At operation 1903, the electronic device 100 receives an input signal for selecting a link object on the screen. In response to the input signal, at operation 1905, the electronic device 100 determines the position on the screen at which a second electronic document linked with the selected link object is to be displayed based on the position of the selected link object. For example, the electronic device 100 may determine the position of the second electronic document on the screen so that the second electronic document is placed below the selected link object. At operation 1907, the electronic device 100 changes the layout of the first electronic document according to the determined position. At operation 1909, the electronic device 100 displays the first electronic document with a changed layout and the second electronic document together on the screen. For example, the electronic device 100 may display the first electronic document and the second electronic document together on the screen so that the second electronic document is inserted in the first electronic document.

Figure 20:
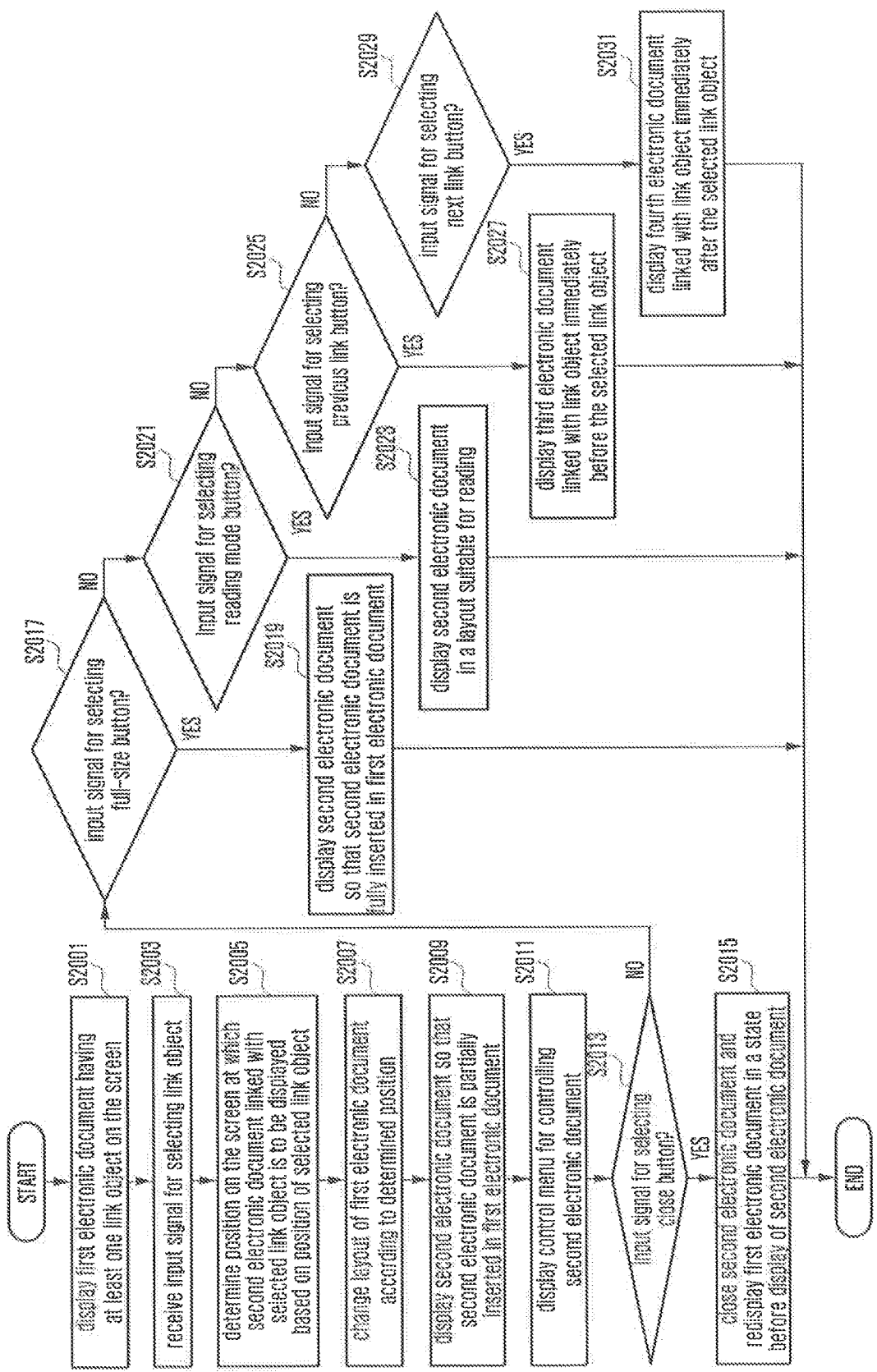

FIG. 20 is a flowchart of a procedure for displaying electronic documents linked with link objects according to another embodiment of the present disclosure.

Referring to FIG. 20, at operation 2001, the electronic device 100 displays a first electronic document having at least one link object on the screen. At operation 2003, the electronic device 100 receives an input signal for selecting a link object on the screen. In response to the input signal, at operation 2005, the electronic device 100 determines the position on the screen at which a second electronic document linked with the selected link object is to be displayed based on the position of the selected link object. At operation 2007, the electronic device 100 changes the layout of the first electronic document according to the determined position. At operation 2009, the electronic device 100 displays the second electronic document on the screen so that the second electronic document is partially inserted in the first electronic document. Upon reception of an input signal corresponding to a user gesture in a direction on the second electronic document, the electronic device 100 may move the second electronic document in the same direction independently of the first electronic document.

At operation 2011, the electronic device 100 displays a control menu for controlling the second electronic document on the screen. For example, the control menu may be placed in a region of the second electronic document on the screen. At operation 2013, the electronic device 100 checks whether an input signal for selecting the close button of the control menu is received. If an input signal for selecting the close button is received, at operation 2015, the electronic device 100 closes the second electronic document and redisplays the first electronic document in a state before display of the second electronic document.

At operation 2017, the electronic device 100 checks whether an input signal for selecting the full-size button of the control menu is received. If an input signal for selecting the full-size button is received, at operation 2019, the electronic device 100 displays the second electronic document on the screen so that the second electronic document is fully inserted in the first electronic document. Upon reception of an input signal corresponding to a user gesture in a direction on the first electronic document or second electronic document, the electronic device 100 may move the first electronic document and second electronic document at the same speed and in the same direction.

At operation 2021, the electronic device 100 checks whether an input signal for selecting the reading mode button of the control menu is received. If an input signal for selecting the reading mode button is received, at operation 2023, the electronic device 100 displays the second electronic document in a layout suitable for reading.

At operation 2025, the electronic device 100 checks whether an input signal for selecting the previous link button of the control menu is received. If an input signal for selecting the previous link button is received, at operation 2027, the electronic device 100 displays a third electronic document linked with a link object immediately before the link object corresponding to the second electronic document in display.

At operation 2029, the electronic device 100 checks whether an input signal for selecting the next link button of the control menu is received. If an input signal for selecting the next link button is received, at operation 2031, the electronic device 100 displays a fourth electronic document linked with a link object immediately after the link object corresponding to the second electronic document in display.

Figure 21:
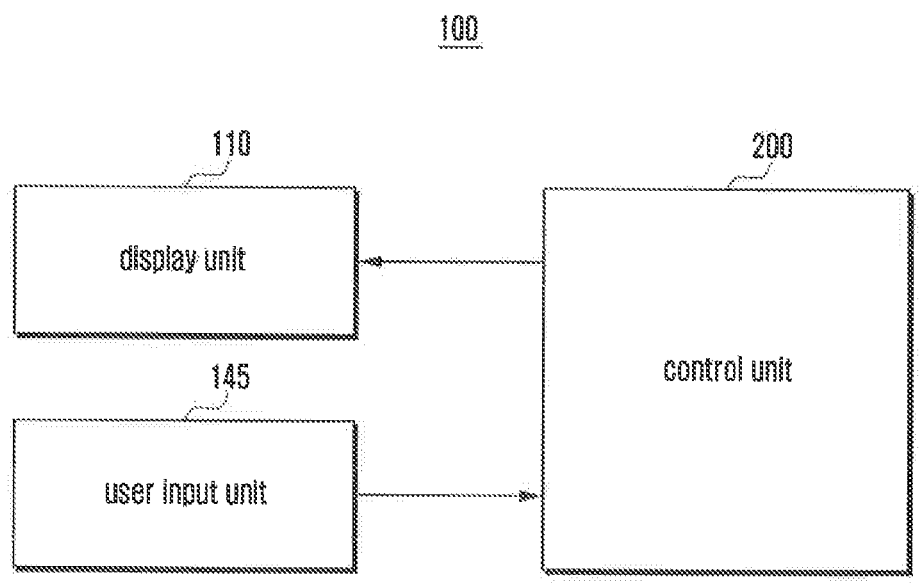
FIG. 21 is a block diagram of an electronic device according to another embodiment of the present disclosure.

FIG. 21 is a block diagram of an electronic device according to another embodiment of the present disclosure.

Referring to FIG. 21, an electronic device 100 may include a display unit 110, a user input unit 145, and a control unit 200. As hardware configurations of the display unit 110, user input unit 145, and control unit 200 are described before, a repeated description thereof is omitted.

The display unit 110 may display a first electronic document having link objects on the screen. The user input unit 145 may detect an input signal for selecting a link object on the screen of the display unit 110. When the user input unit 145 and the display unit 110 are combined in a layered structure to form a touchscreen, the touchscreen may be used to display a first electronic document having link objects on the screen and to detect an input signal for selecting a link object. The control unit 200 may determine the position at which a second electronic document linked with the selected link object is to be displayed based on the position of the selected link object and change the layout of the first electronic document according to the determined position. The control unit 200 may control the display unit 110 to display the first electronic document and the second electronic document together on the screen. For example, the first electronic document and the second electronic document may be displayed on the screen in a manner that the second electronic document is inserted in the first electronic document.

FIGS. 22A to 22D are screen representations for displaying electronic documents linked with link objects according to various embodiments of the present disclosure.

Figure 22A:
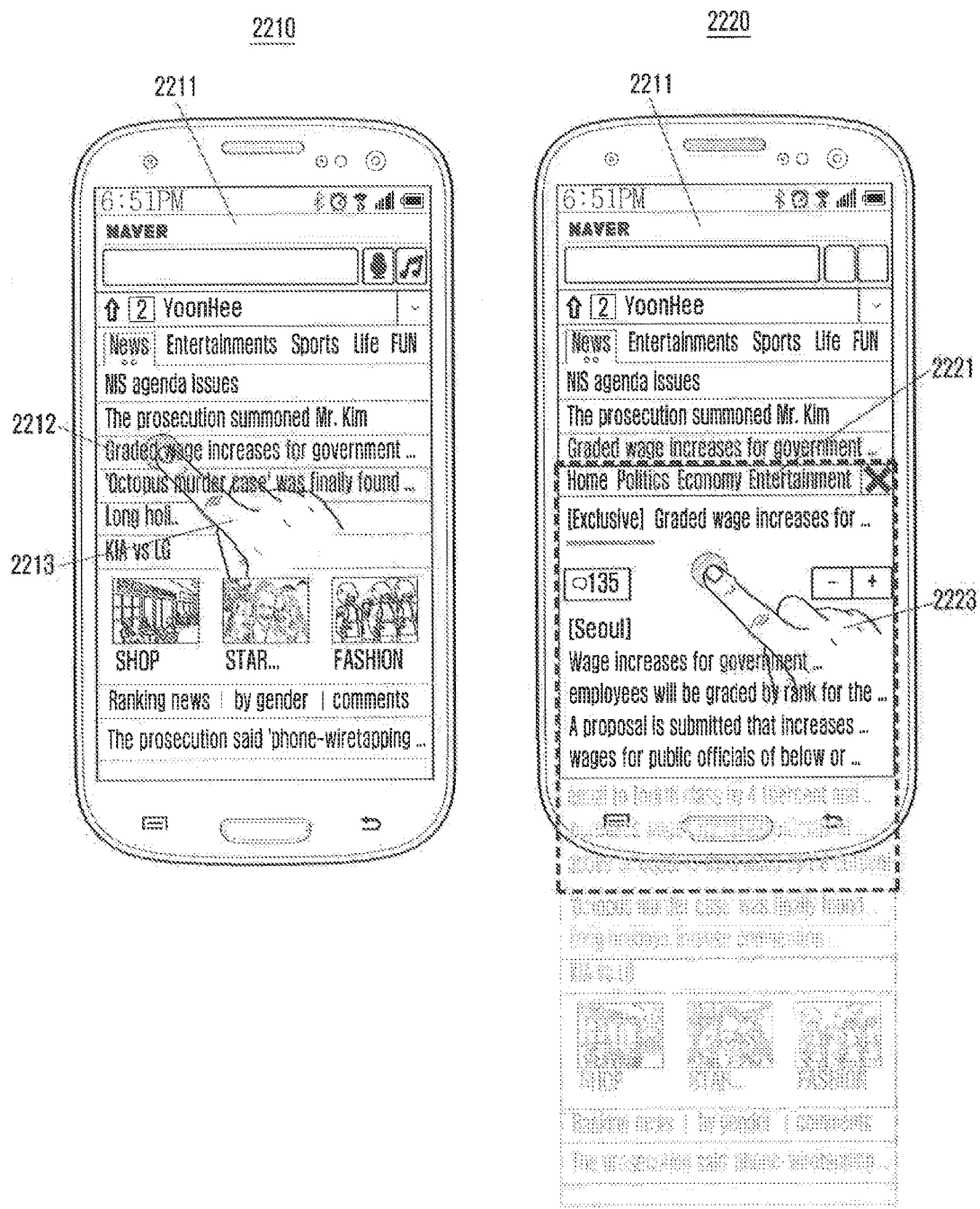
FIGS. 22A, 22B, 22C, 22D, 23A, 23B, 23C, and 23D are screen representations for displaying electronic documents linked with link objects according to various embodiments of the present disclosure.

Referring to FIG. 22A, as indicated by indicia 2210, the control unit 200 may display a first electronic document 2211 having at least one link object 2212 on the screen. The control unit 200 may receive an input signal for selecting the link object 2212 on the screen. Here, the input signal may correspond to a user touch gesture 2213 on the link object 2212 detected by the touch panel 147.

In response to the input signal, as indicated by indicia 1220, the control unit 200 may display a second electronic document 2221 linked with the link object 2212 so that the second electronic document 2221 is inserted in the first electronic document 2211. The control unit 200 may receive an input signal for selecting the second electronic document 2221 on the screen. Here, the input signal may correspond to a touch and hold gesture 2223 on the second electronic document 2221 detected by the touch panel 147.

Figure 22B:
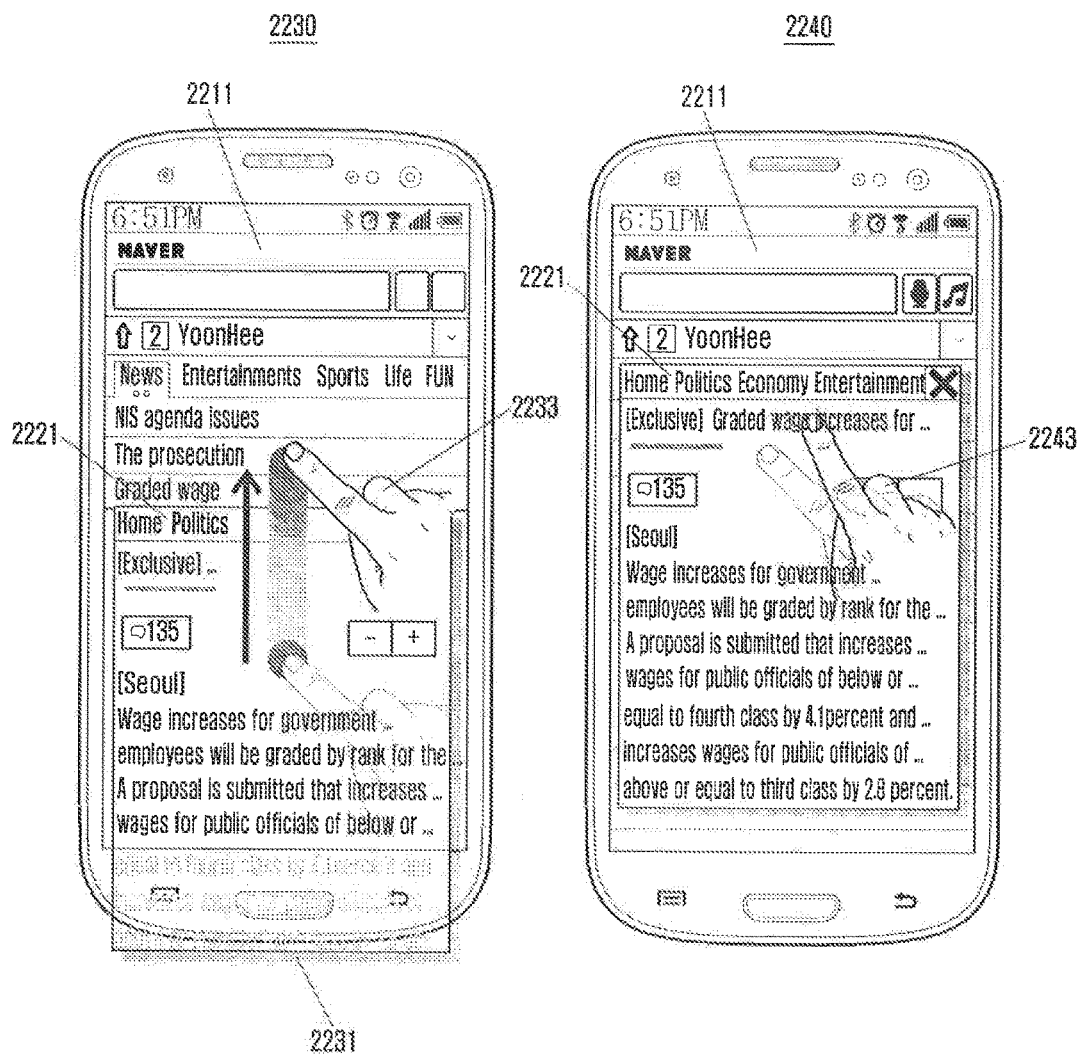

Referring to FIG. 22B, in response to the input signal, as indicated by indicia 2230, the control unit 200 may display the second electronic document 2221 so that it is distinguished from the first electronic document 2211. For example, the second electronic document 2221 may be displayed as having a shade effect 2231 or three-dimensional effect. The control unit 200 may receive an input signal for moving the second electronic document 2221. Here, the input signal may correspond to a drag gesture 2233 in a direction detected by the touch panel 147. The drag gesture 2233 may involve a touch and movement action without touch release.

In response to the input signal, as indicated by indicia 2240, the control unit 200 may move the second electronic document 2221 on the screen. Here, the second electronic document 2221 may be moved separately from the first electronic document 2211. The control unit 200 may receive an input signal for deselecting the second electronic document 2221. Here, the input signal may correspond to a touch release gesture 2243 on the second electronic document 2221 detected by the touch panel 147.

Figure 22C:
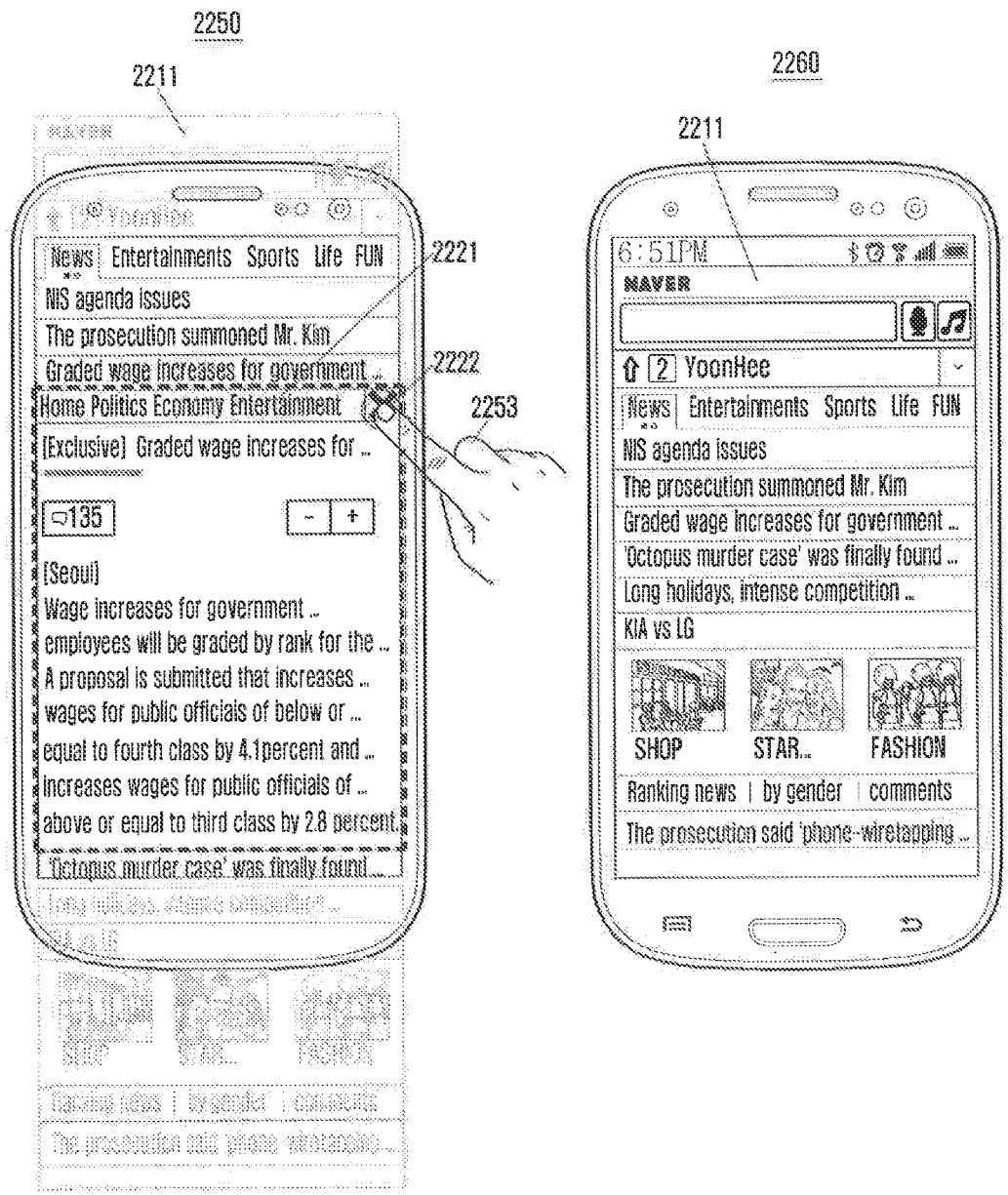

Referring to FIG. 22C, in response to the input signal, as indicated by indicia 2250, the control unit 200 may display the second electronic document 2221 at the moved position so that the second electronic document 2221 is inserted in the first electronic document 2211. The moved position of the second electronic document 2221 may be stored in the memory unit 120. For example, the control unit 200 may store information on the coordinates and size of the second electronic document 2221 on the screen in the memory unit 120. The control unit 200 may receive an input signal for selecting the close button 2222 for closing the second electronic document 2221 displayed on the screen. Here, the input signal may correspond to a user touch gesture 2253 on the close button 2222 detected by the touch panel 147.

In response to the input signal, as indicated by indicia 2260, the control unit 200 may close the second electronic document 2221 being displayed and redisplay the first electronic document 2211.

Figure 22D:
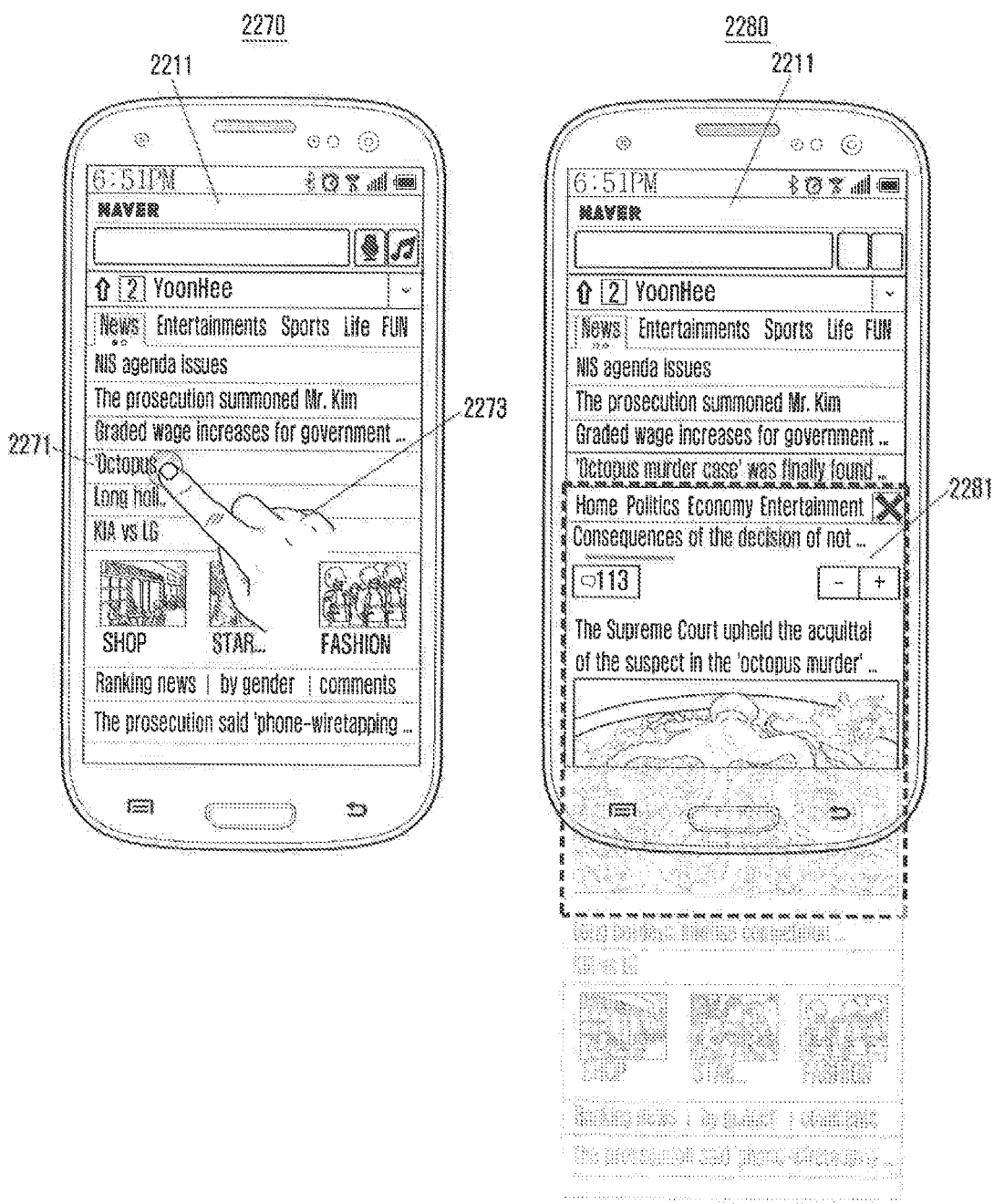

Referring to FIG. 22D, after redisplay of the first electronic document 2211, as indicated by indicia 2270, the control unit 200 may receive an input signal for selecting a link object 2271 of the first electronic document 2211. Here, the input signal may correspond to a user touch gesture 2273 on the link object 2271 detected by the touch panel 147.

In response to the input signal, as indicated by indicia 2280, the control unit 200 may display a third electronic document 2281 linked with the link object 2271 so that the third electronic document 2281 is inserted in the first electronic document 2211. Here, the position of the third electronic document 2281 on the screen may be the same as that of the second electronic document 2221 in the state indicated by indicia 2250. When the third electronic document 2281 has a size different from that of the second electronic document 2221, the third electronic document 2281 may be displayed so that the top left vertex of the third electronic document 2281 is placed at the same position as that of the second electronic document 2221.

FIGS. 23A to 23D are screen representations for displaying electronic documents linked with link objects according to various embodiments of the present disclosure.

Figure 23A:
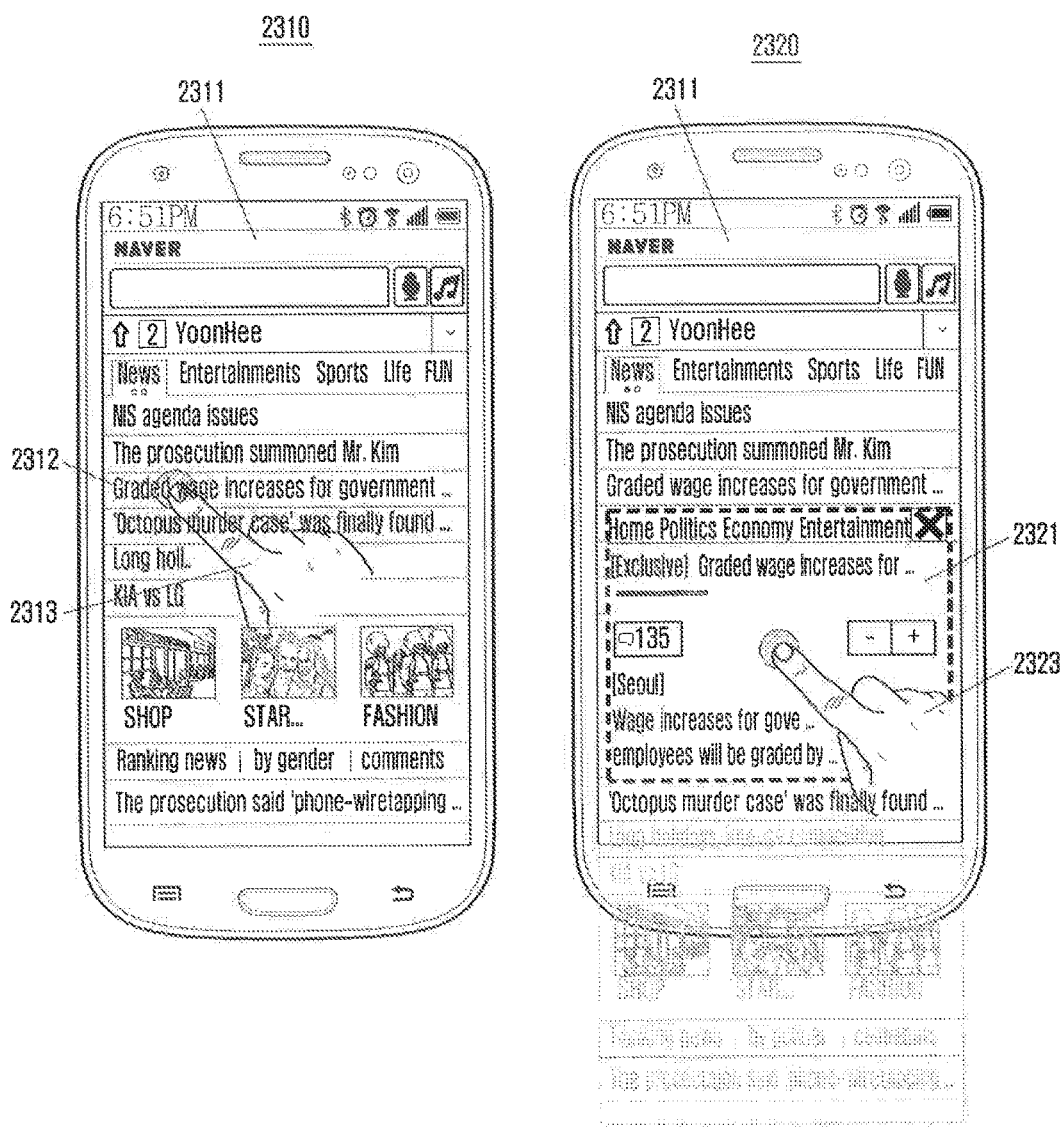

Referring to FIG. 23A, as indicated by indicia 2310, the control unit 200 may display a first electronic document 2311 having at least one link object 2312 on the screen. The control unit 200 may receive an input signal for selecting the link object 2312 on the screen. Here, the input signal may correspond to a user touch gesture 2313 on the link object 2312 detected by the touch panel 147.

In response to the input signal, as indicated by indicia 1320, the control unit 200 may display a second electronic document 2321 linked with the link object 2312 so that the second electronic document 2321 is inserted in the first electronic document 2311. Here, a part of the second electronic document 2321 may be displayed on the screen. As described in connection with FIG. 11, upon reception of an input signal for moving the second electronic document 2321 on the second electronic document 2321, another part of the second electronic document 2321 may be displayed on the screen. The control unit 200 may receive an input signal for moving the second electronic document 2321 on the second electronic document 2321. Here, the input signal may correspond to a touch and hold gesture 2323 on the second electronic document 2221 detected by the touch panel 147.

Figure 23B:
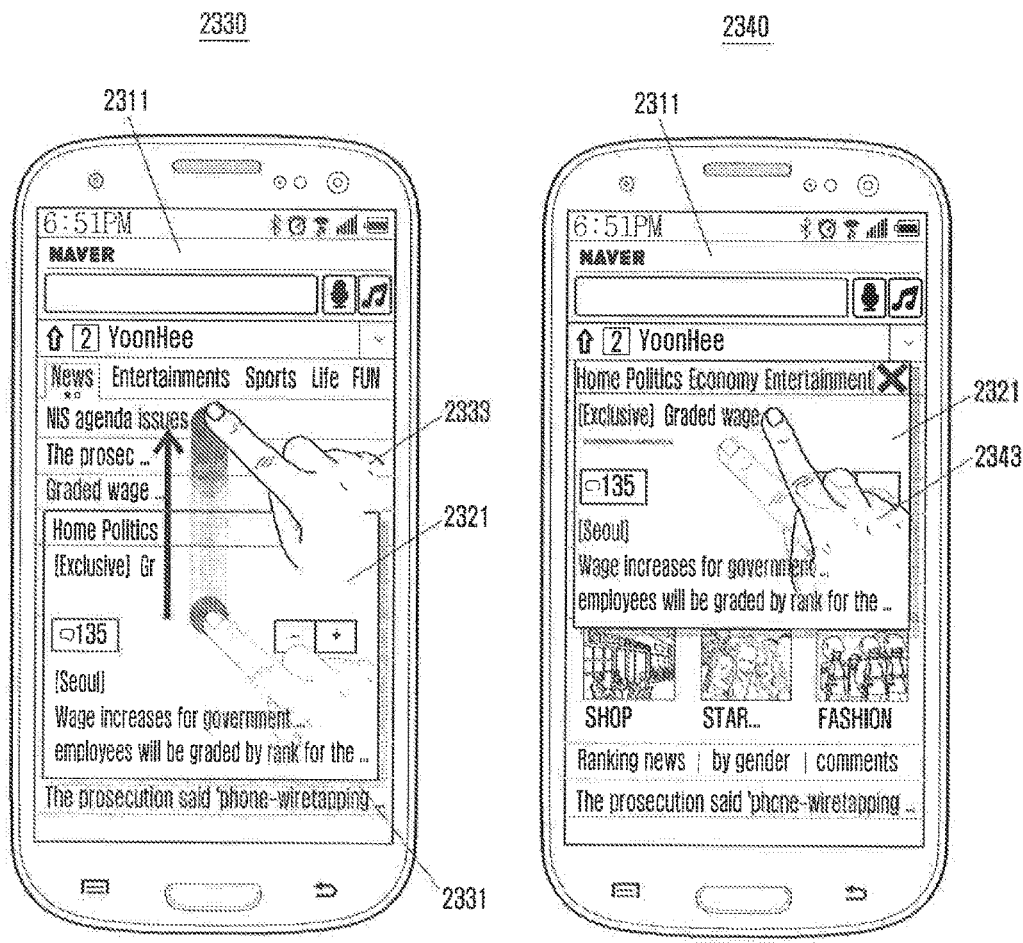

Referring to FIG. 23B, in response to the input signal, as indicated by indicia 2330, the control unit 200 may display the second electronic document 2321 so that it is distinguished from the first electronic document 2311. For example, the second electronic document 2321 may be displayed as having a shade effect 2331 or three-dimensional effect. The control unit 200 may receive an input signal for moving the second electronic document 2321. Here, the input signal may correspond to a drag gesture 2333 in a direction detected by the touch panel 147. The drag gesture 2333 may involve a touch and movement action without touch release.

In response to the input signal, as indicated by indicia 2340, the control unit 200 may move the second electronic document 2321 on the screen. Here, the second electronic document 2321 may be moved separately from the first electronic document 2311. The control unit 200 may receive an input signal for deselecting the second electronic document 2321. Here, the input signal may correspond to a touch release gesture 2343 on the second electronic document 2321 detected by the touch panel 147.

Figure 23C:
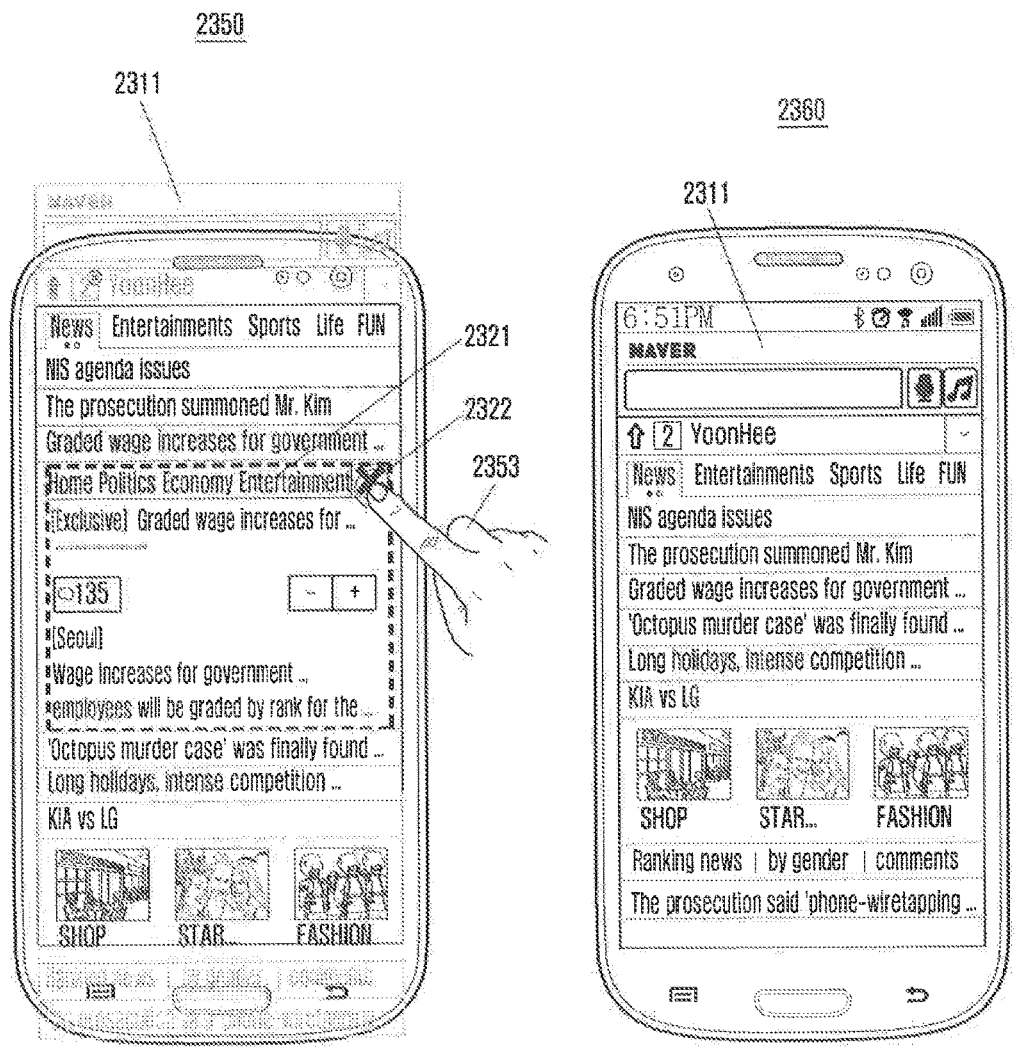

Referring to FIG. 23C, in response to the input signal, as indicated by indicia 2350, the control unit 200 may display the second electronic document 2321 at the moved position so that the second electronic document 2321 is inserted in the first electronic document 2311. The moved position of the second electronic document 2321 on the screen may be stored in the memory unit 120. For example, the control unit 200 may store information on the coordinates and size of the second electronic document 2321 on the screen in the memory unit 120. The control unit 200 may receive an input signal for selecting the close button 2322 for closing the second electronic document 2321 displayed on the screen. Here, the input signal may correspond to a user touch gesture 2353 on the close button 2322 detected by the touch panel 147.

In response to the input signal, as indicated by indicia 2360, the control unit 200 may close the second electronic document 2321 being displayed and redisplay the first electronic document 2311.

Figure 23D:
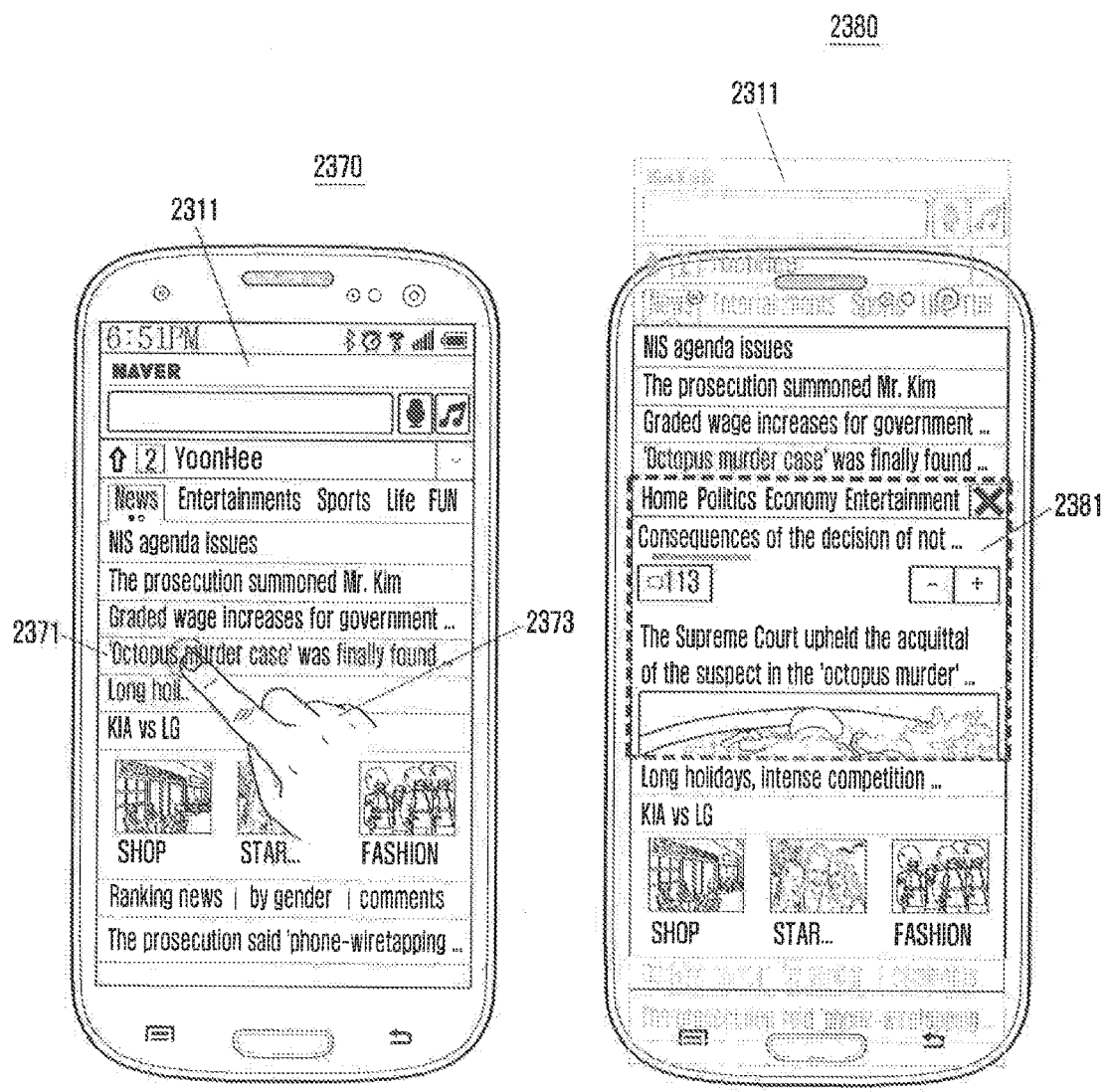

Referring to FIG. 23D, after redisplay of the first electronic document 2311, as indicated by indicia 2370, the control unit 200 may receive an input signal for selecting a link object 2371 of the first electronic document 2311. Here, the input signal may correspond to a user touch gesture 2373 on the link object 2371 detected by the touch panel 147.

In response to the input signal, as indicated by indicia 2380, the control unit 200 may display a third electronic document 2381 linked with the link object 2371 so that the third electronic document 2381 is inserted in the first electronic document 2311. Here, a part of the third electronic document 2381 may be displayed. The position of the third electronic document 2381 on the screen may be the same as that of the second electronic document 2321 in the state indicated by indicia 2350. When the third electronic document 2381 has a size different from that of the second electronic document 2321, the third electronic document 2381 may be displayed on the screen so that the top left vertex of the third electronic document 2281 is placed at the same position as that of the second electronic document 2321.

In a feature of the present disclosure, the method enables the user to view a first electronic document being displayed and a second electronic document linked with a link object in a continuous and consistent manner. Hence, the user may read electronic documents in a concentrated manner with minimal activities.

In addition, the method may reduce actions of an engine providing electronic documents (e.g., web engine), enabling the electronic device to minimize consumption of resources such as battery power and network data.

Meanwhile, various embodiments of the present disclosure may be realized in software, hardware, or a combination thereof. Such software may be stored in various machine or computer readable storage media, which may include volatile or nonvolatile memory devices such as a ROM, RAM and flash memory, magnetic media such as a hard disk and floppy disk, optical media such as a Compact Disc Read Only Memory (CD-ROM) and Digital Versatile Disc (DVD), and magneto-optical media such as a floptical disk.

The method of displaying electronic documents linked with link objects according to the present disclosure may be realized using a computer or electronic device including a control unit and a memory unit. Such a memory unit may be an example of machine readable storage media storing one or more programs implementing various embodiments of the present disclosure. The present disclosure may include programs realizing the apparatus or method described in the claims and machine readable storage media storing the programs. These programs may be electronically transferred as communication signals through wired or wireless connections, and the present disclosure may include their equivalents. In addition, the electronic device of the present disclosure may receive programs wiredly or wirelessly from a program providing apparatus and store the received programs. Furthermore, the user may selectively configure settings of the electronic device to limit operations of the various embodiments of the present disclosure within the electronic device or to extend the same to a server on a network for cooperation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying electronic documents for an electronic device, the method comprising:
   displaying, on a screen of the electronic device, a first electronic document having a plurality of link objects, wherein the plurality of link objects includes:
   a first link object,
   a second link object being positioned sequentially adjacent to, and before, the first link object, and
   a third link object being positioned sequentially adjacent to, and after, the first link object;
   in response to receiving a first input signal for selecting the first link object:
   displaying a second document linked with the first link object through a region located inside the first document, and
   displaying a link interface including a first button and a second button;
   in response to receiving a second input signal for selecting the first button, displaying a third document linked with the second link object through the region located inside the first document; and
   in response to receiving a third input signal for selecting the second button, displaying a fourth document linked with the third link object through the region located inside the first document.

2. The method of claim 1, wherein the region located inside the first document is placed below the first link object.

3. The method of claim 1, further comprising:
   receiving a fourth input signal for closing the second electronic document; and
   closing the second electronic document being displayed and displaying the at least the part of the first electronic document on the screen.

4. The method of claim 1, wherein the region located inside the first document is a central region of the screen.

5. The method of claim 1, further comprising:
   detecting a user gesture moving in a direction on one of the first electronic document or the second electronic document; and
   moving the first electronic document and the second electronic document on the screen at the same speed and in the same direction in response to the detected user gesture.

6. The method of claim 1, further comprising:
   detecting a user gesture moving in a direction on the second electronic document; and moving the second electronic document on the screen in the direction independently of the first electronic document in response to the detected user gesture.

7. The method of claim 1, further comprising:
displaying a menu containing an item for split view mode causing the first electronic document and the second electronic document to be displayed together; and
displaying, when the item for split view mode is selected from the menu, the first electronic document and the second electronic document together on the screen.

8. The method of claim 1, further comprising:
receiving a fourth input signal for selecting a third screen layout for the second electronic document; and
displaying the first electronic document and the second electronic document together on the screen based on the third screen layout.

9. The method of claim 1, further comprising:
checking whether the second electronic document supports a reading mode; and
changing, when the second electronic document supports the reading mode, a screen layout of the second electronic document according to a reading layout.

10. An electronic device capable of displaying electronic documents, the electronic device comprising:
a display having a screen; and
at least one processor configured to:
display a first electronic document having a plurality of link objects, wherein the plurality of link objects includes:
a first link object,
a second link object being positioned sequentially adjacent to, and before, the first link object, and
a third link object being positioned sequentially adjacent to, and after, the first link object;
in response to receiving a first input signal for selecting the first link object:
display a second document linked with the first link object through a region located inside the first document, and
display a link interface including a first button and a second button;
in response to receiving a second input signal for selecting the first button, display a third document linked with the second link object through the region located inside the first document; and
in response to receiving a third input signal for selecting the second button, display a fourth document linked with the third link object through the region located inside the first document.

11. The electronic device of claim 10, further comprising a user input device configured to receive an input signal.

12. The electronic device of claim 11,
wherein the user input device is further configured to detect a user gesture moving in a direction on one of the first electronic document or the second electronic document, and
wherein the at least one processor is further configured to move the first electronic document and the second electronic document on the screen at the same speed and in the same direction in response to the detected user gesture.

13. The electronic device of claim 12, wherein the detected user gesture comprises a flick gesture in a downward direction.

14. The electronic device of claim 11,
wherein the user input device is further configured to detect a user gesture moving in a direction on the second electronic document, and
wherein the at least one processor is further configured to move the second electronic document on the screen in the direction independently of the first electronic document in response to the detected user gesture.

15. The electronic device of claim 11,
wherein the user input device is further configured to receive a fourth input signal for selecting a third screen layout for the second electronic document, and
wherein the at least one processor is further configured to control the display to display the first electronic document and the second electronic document together on the screen based on the third screen layout.

16. The electronic device of claim 10, wherein the at least one processor is further configured to determine the position of the region located inside the first document so that the region located inside the first document is placed below the first link object.

17. The electronic device of claim 10, wherein the at least one processor is further configured to determine the position of the region located inside the first document so that the region located inside the first document is a central region of the screen.

18. A non-transitory storage medium configured to store one or more computer programs including instructions that, when executed by at least one processor of an electronic device, cause the at least one processor to control for:
displaying, on a screen of the electronic device, a first electronic document having a plurality of link objects, wherein the plurality of link objects includes:
a first link object,
a second link object being positioned sequentially adjacent to, and before, the first link object, and
a third link object being positioned sequentially adjacent to, and after, the first link object;
in response to receiving a first input signal for selecting the first link object:
displaying a second document linked with the first link object through a region located inside the first document, and
displaying a link interface including a first button and a second button;
in response to receiving a second input signal for selecting the first button, displaying a third document linked with the second link object through the region located inside the first document; and
in response to receiving a third input signal for selecting the second button, displaying a fourth document linked with the third link object through the region located inside the first document.

* * * * *